(12) United States Patent
Takano

(10) Patent No.: US 9,244,257 B2
(45) Date of Patent: Jan. 26, 2016

(54) PROJECTION OPTICAL SYSTEM AND PROJECTOR APPARATUS

(71) Applicant: Yohei Takano, Kanagawa (JP)

(72) Inventor: Yohei Takano, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 80 days.

(21) Appl. No.: 14/203,646

(22) Filed: Mar. 11, 2014

(65) Prior Publication Data

US 2014/0268073 A1    Sep. 18, 2014

(30) Foreign Application Priority Data

Mar. 13, 2013 (JP) .................................. 2013-051055
Feb. 19, 2014 (JP) .................................. 2014-029911
Mar. 3, 2014 (JP) .................................. 2014-040214

(51) Int. Cl.
  *G03B 21/14* (2006.01)
  *G02B 13/00* (2006.01)
  *G02B 17/08* (2006.01)

(52) U.S. Cl.
  CPC ............ *G02B 13/0065* (2013.01); *G02B 17/08* (2013.01); *G02B 17/0852* (2013.01); *G02B 17/0896* (2013.01); *G02B 17/0848* (2013.01)

(58) Field of Classification Search
  CPC .................... G02B 17/0852; G02B 17/0848
  USPC .............. 353/30, 31, 37, 38, 94, 98, 99, 102; 359/366, 656; 348/743–747; 349/5, 349/7–9

See application file for complete search history.

(56) References Cited

U.S. PATENT DOCUMENTS

| 2004/0263955 A1* | 12/2004 | Ulrich et al. ................. 359/366 |
| 2007/0184368 A1 | 8/2007 | Nishikawa et al. |
| 2007/0216316 A1 | 9/2007 | Hirano et al. |
| 2008/0068563 A1 | 3/2008 | Abe et al. |

(Continued)

FOREIGN PATENT DOCUMENTS

| CN | 1376949 A | 10/2002 |
| CN | 1479131 A | 3/2004 |

(Continued)

OTHER PUBLICATIONS

Extended European Search Report issued May 26, 2014 in Patent Application No. 14158667.7.

(Continued)

*Primary Examiner* — Sultan Chowdhury
(74) *Attorney, Agent, or Firm* — Oblon, McClelland, Maier & Neustadt, L.L.P.

(57) ABSTRACT

A projection optical system comprises an image forming unit that forms an image; a refractive optical system including a plurality of lenses that enlarges and projects the image on a screen; and a reflecting surface, wherein an intermediate image is formed between the refractive optical system and the reflecting surface, and the projection optical system satisfies conditions of "0.6<D/Did<0.8" and "2.5<Did/F<6", where "Did" represents a maximum paraxial image height of the intermediate image in a focusing state in which a projection image is maximum, "D" represents a maximum value of a distance between an optical axis and an intersection of a paraxial image surface and a light beam passing center of an aperture stop of the refractive optical system, and "F" represents a focal length of the refractive optical system in a focusing state in which the projection image is maximum.

9 Claims, 63 Drawing Sheets

(56) References Cited

U.S. PATENT DOCUMENTS

| | | |
|---|---|---|
| 2008/0158439 A1 | 7/2008 | Nishikawa |
| 2008/0204608 A1 | 8/2008 | Takano et al. |
| 2009/0059358 A1* | 3/2009 | Epple .......................... 359/366 |
| 2009/0231690 A1 | 9/2009 | Nishikawa et al. |
| 2010/0097582 A1 | 4/2010 | Nagase et al. |
| 2010/0238565 A1 | 9/2010 | Takano et al. |
| 2011/0002047 A1 | 1/2011 | Takano et al. |
| 2011/0002048 A1 | 1/2011 | Takano et al. |
| 2011/0299049 A1 | 12/2011 | Yatsu et al. |
| 2012/0008216 A1 | 1/2012 | Takano et al. |
| 2012/0236419 A1 | 9/2012 | Atsuumi et al. |
| 2012/0307375 A1 | 12/2012 | Takano et al. |
| 2013/0033759 A1 | 2/2013 | Takano et al. |
| 2013/0135751 A1 | 5/2013 | Atsuumi et al. |
| 2013/0222922 A1 | 8/2013 | Atsuumi et al. |

FOREIGN PATENT DOCUMENTS

| | | |
|---|---|---|
| EP | 1 806 612 A1 | 7/2007 |
| EP | 1 901 106 A2 | 3/2008 |
| JP | 2007-079524 | 3/2007 |
| JP | 2008-250296 | 10/2008 |
| JP | 2009-251457 | 10/2009 |
| JP | 2010-197837 | 9/2010 |
| JP | 2011-253024 | 12/2011 |

OTHER PUBLICATIONS

Chinese Office Action issued in Patent Application No. 20040092948.4 on Oct. 26, 2015 (w/ English translation).

* cited by examiner

PROJECTION OPTICAL SYSTEM AND PROJECTOR APPARATUS

CROSS-REFERENCE TO RELATED APPLICATIONS

The present application claims priority to and incorporates by reference the entire contents of Japanese Patent Application No. 2013-051055 filed in Japan on Mar. 13, 2013, Japanese Patent Application No. 2014-029911 filed in Japan on Feb. 19, 2014, and Japanese Patent Application No. 2014-040214 filed in Japan on Mar. 3, 2014.

BACKGROUND OF THE INVENTION

1. Field of the Invention

The present invention relates to a projection optical system and a projector apparatus.

2. Description of the Related Art

Recently, there has been widely used an image display device that generates an image with a digital mirror device (DMD) or a liquid crystal panel and projects it on a screen. Particularly, there is an increasing demand for a front projection type projector having an ultra-short projection distance that achieves a large screen with a short projection distance. Moreover, in addition to an ultra-short projection distance, the downsizing of an apparatus is demanded.

The projection optical system disclosed in Japanese Patent Application Laid-open No. 2008-250296 forms an intermediate image with a refractive optical system and performs enlarged projection thereof using a concave surface mirror. Thus, it is possible to downsize the apparatus by reducing the size of the mirror and achieve an ultra-short projection distance.

In the projection optical system disclosed in Japanese Patent Application Laid-open No. 2008-250296, a size of an intermediate image is not optimized, and thus the mirror is not sufficiently reduced in size. Moreover, in the projection optical system disclosed in Japanese Patent Application Laid-open No. 2008-250296, the projection distance is not sufficiently short. Furthermore, the projection optical system disclosed in Japanese Patent Application Laid-open No. 2008-250296 has a problem that the size of a housing is increased because the mirror is not sufficiently reduced in size.

In view of the above aspects, there is a need to provide a small-sized high-performance projection optical system and a projector apparatus.

SUMMARY OF THE INVENTION

It is an object of the present invention to at least partially solve the problems in the conventional technology.

According to the present invention, there is provided a projection optical system comprising in this order: an image forming unit that forms an image; a refractive optical system including a plurality of lenses that enlarges and projects the image on a screen; and a reflecting surface, wherein an intermediate image is formed between the refractive optical system and the reflecting surface, and the projection optical system satisfies conditions of "0.6<D/Did<0.8" and "2.5<Did/F<6", where "Did" represents a maximum paraxial image height of the intermediate image in a focusing state in which a projection image is maximum, "D" represents a maximum value of a distance between an optical axis and an intersection of a paraxial image surface and a light beam passing center of an aperture stop of the refractive optical system, and "F" represents a focal length of the refractive optical system in a focusing state in which the projection image is maximum.

The present invention also provides a projector apparatus comprising the projection optical system mentioned above.

The above and other objects, features, advantages and technical and industrial significance of this invention will be better understood by reading the following detailed description of presently preferred embodiments of the invention, when considered in connection with the accompanying drawings.

Figure 50:
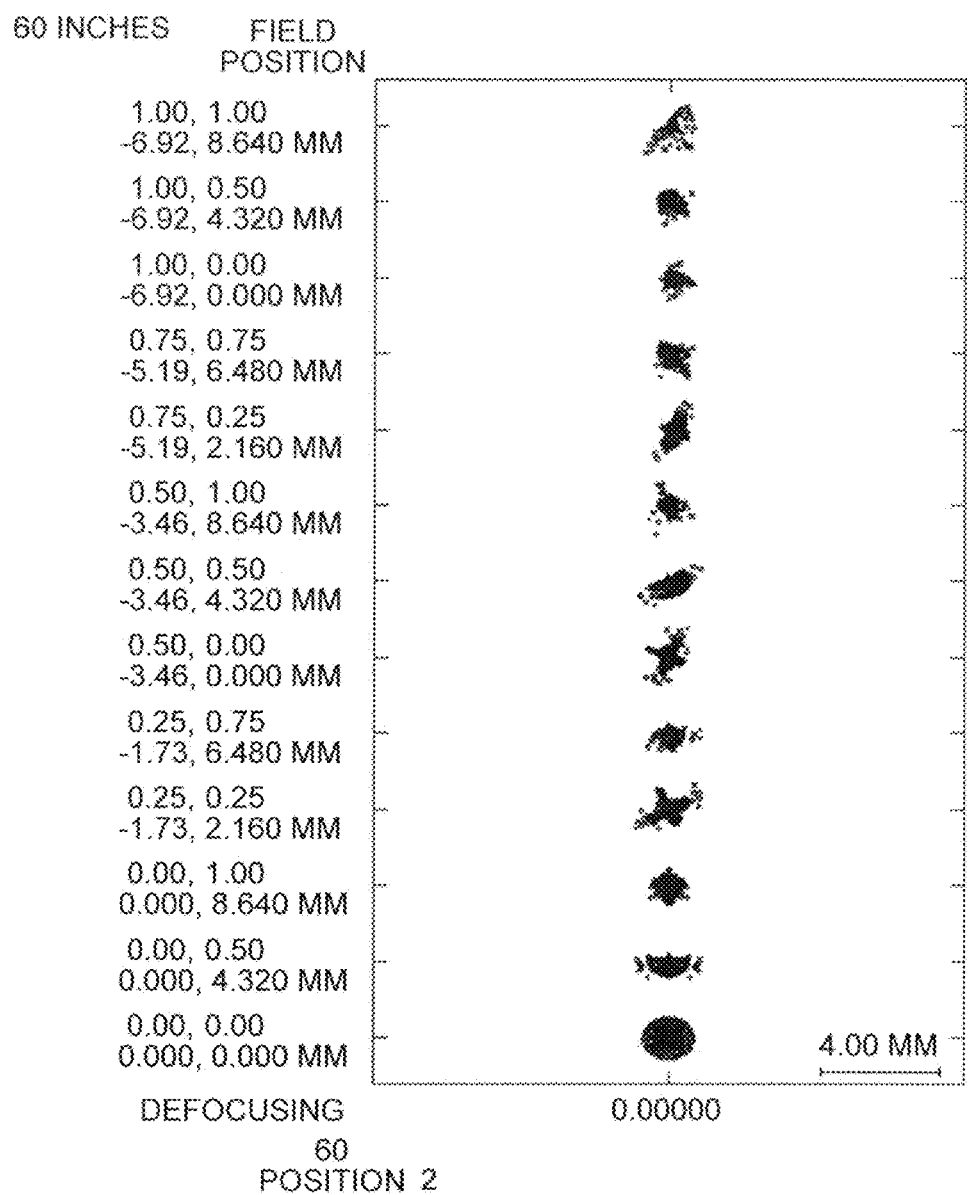
Figure 51:
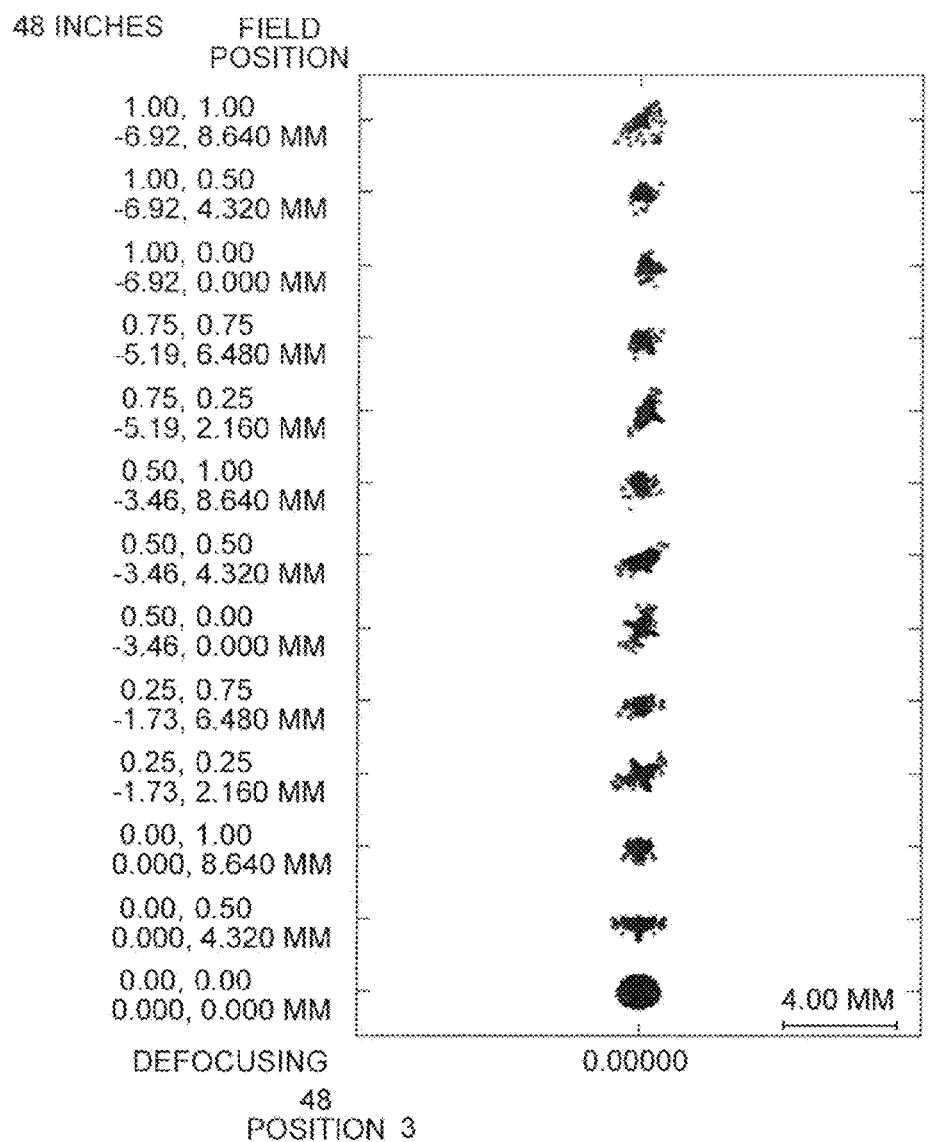
Figure 52:
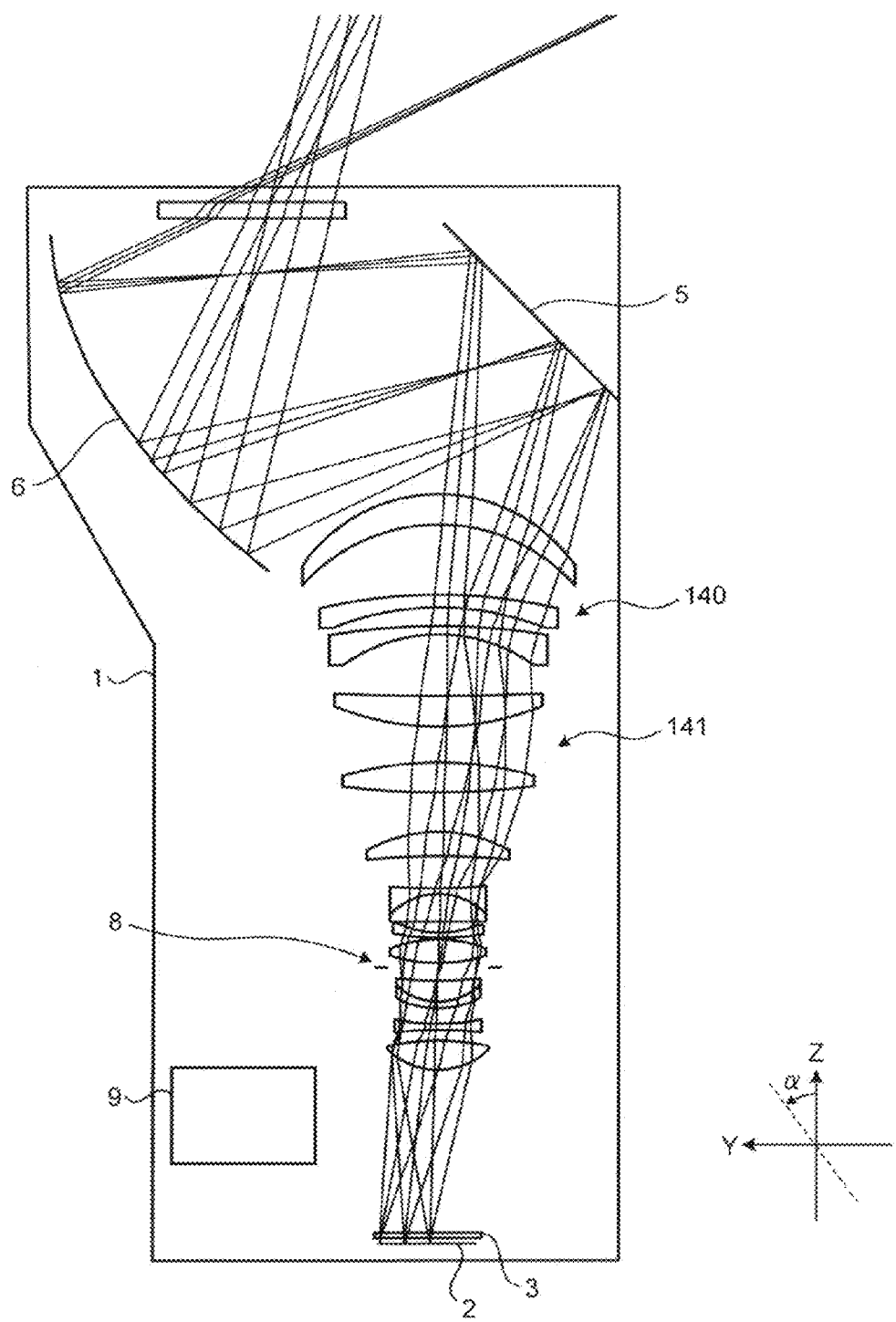
Figure 53:
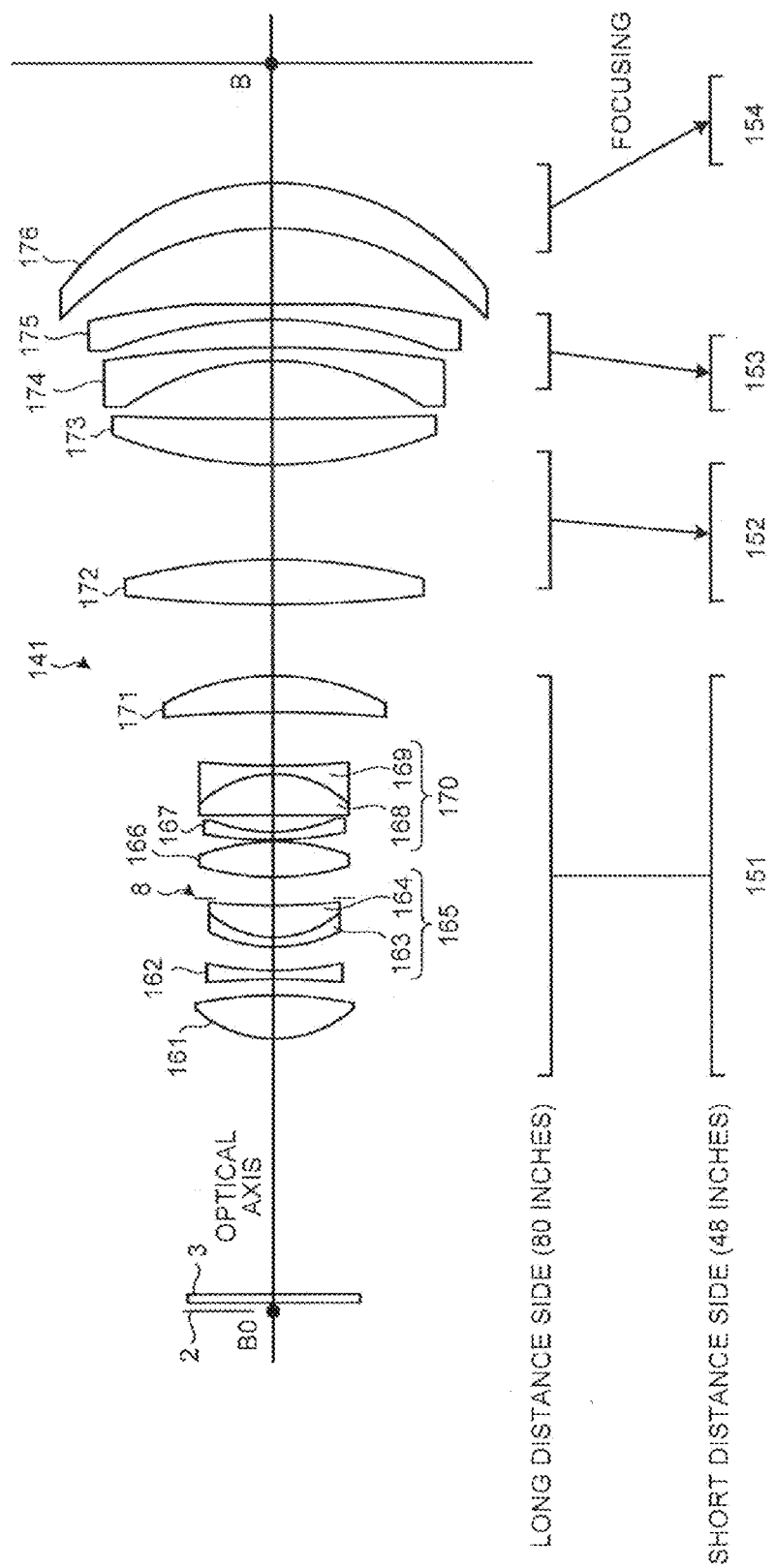
Figure 54:
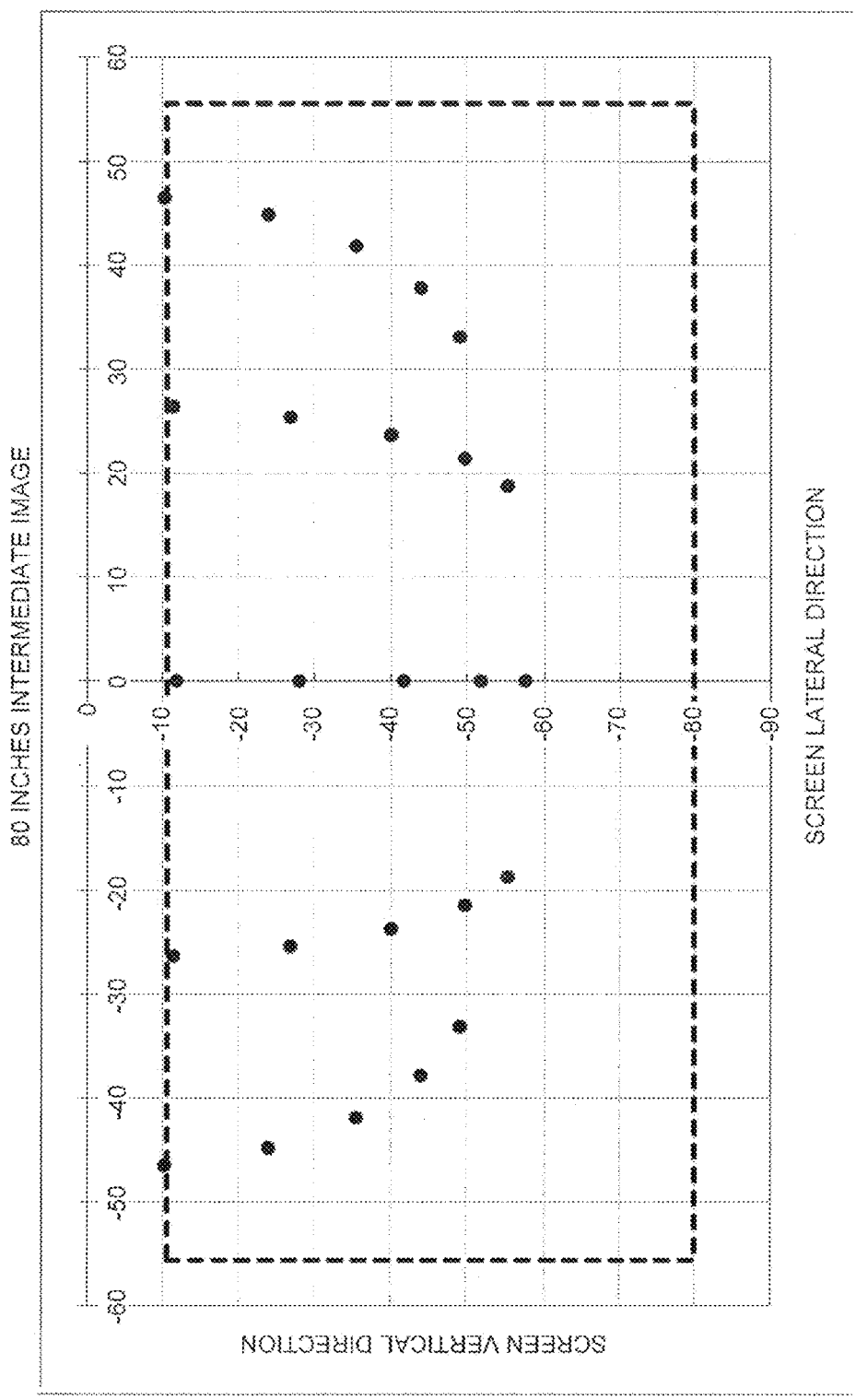
Figure 55:
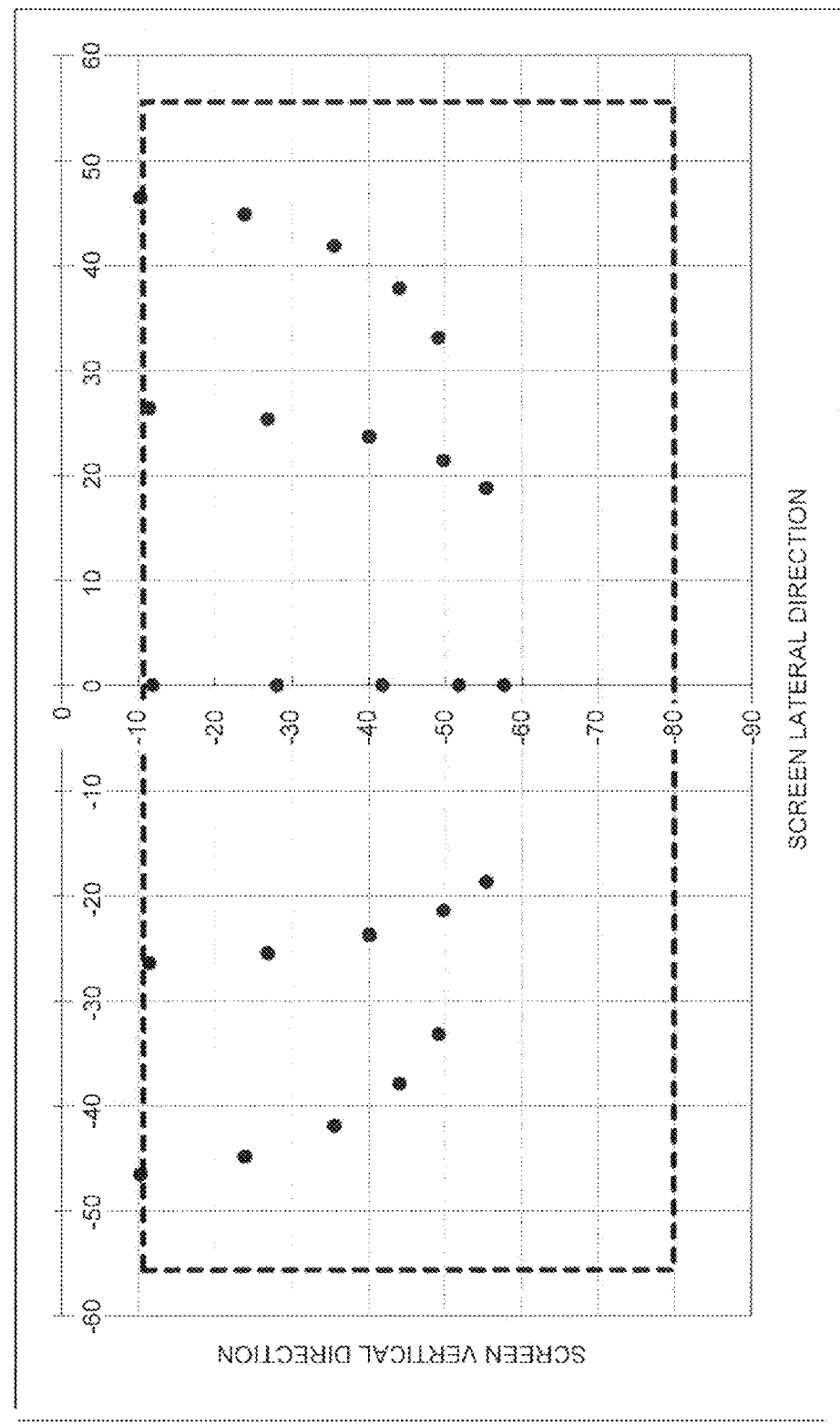
Figure 56:
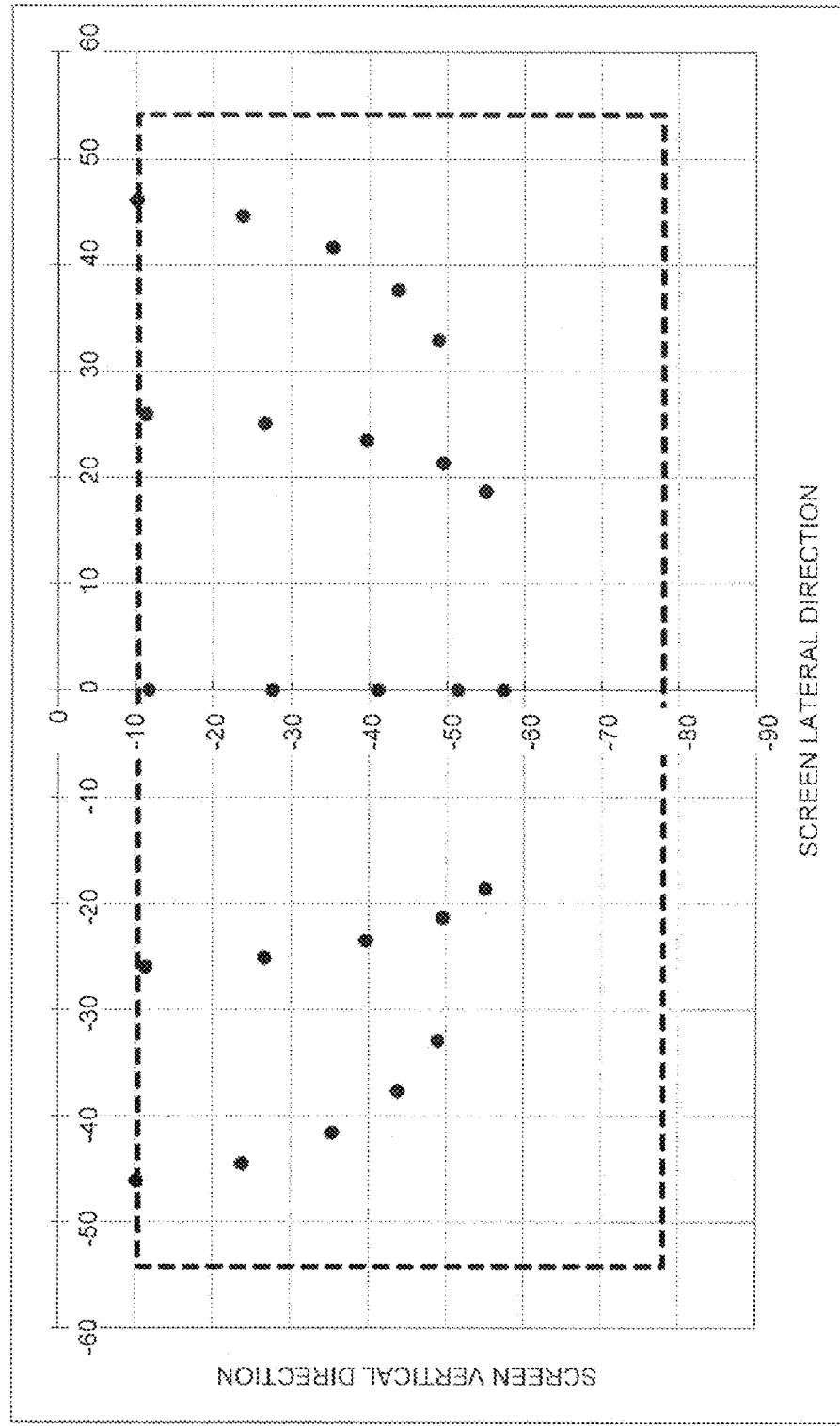
Figure 57:
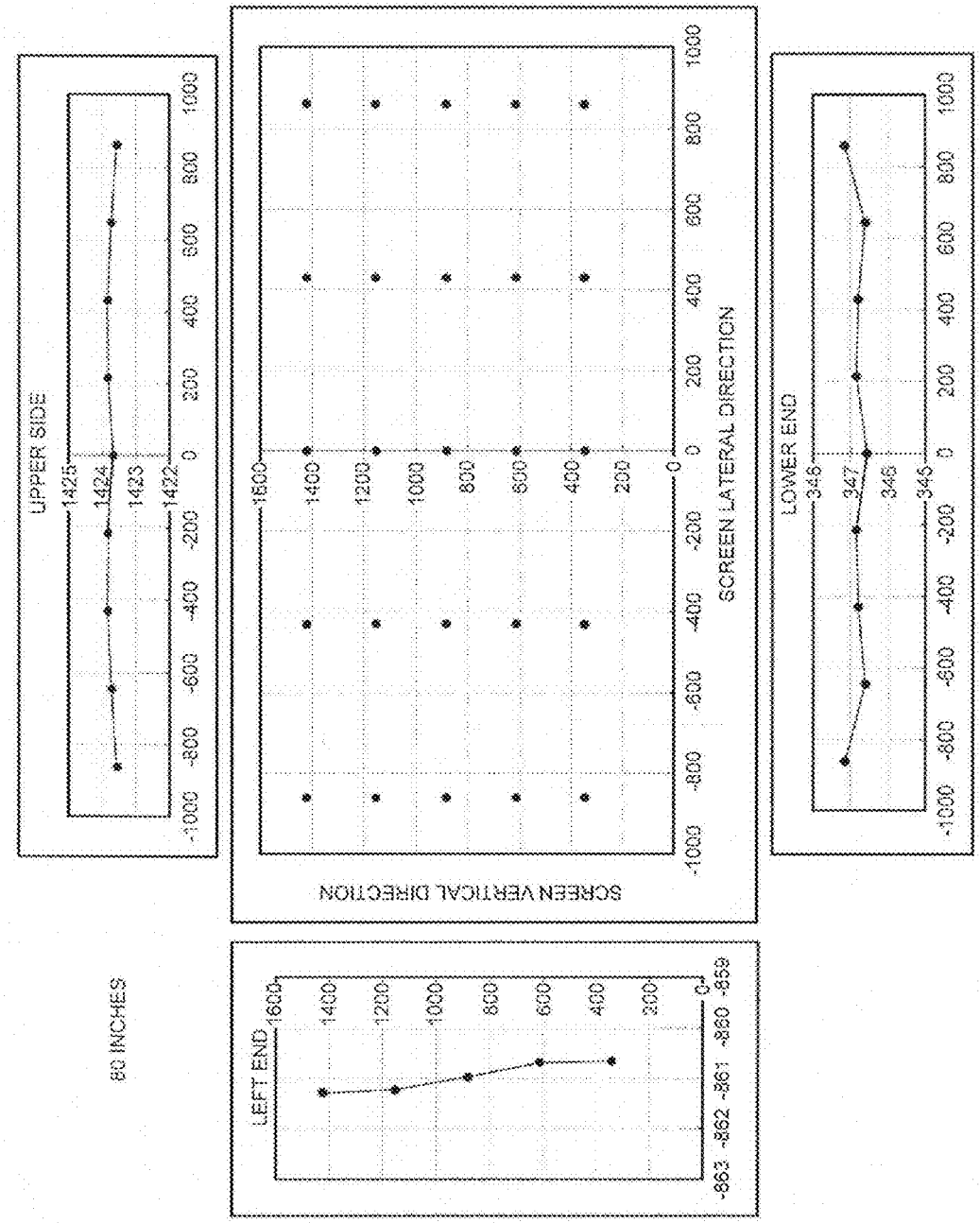
Figure 58:
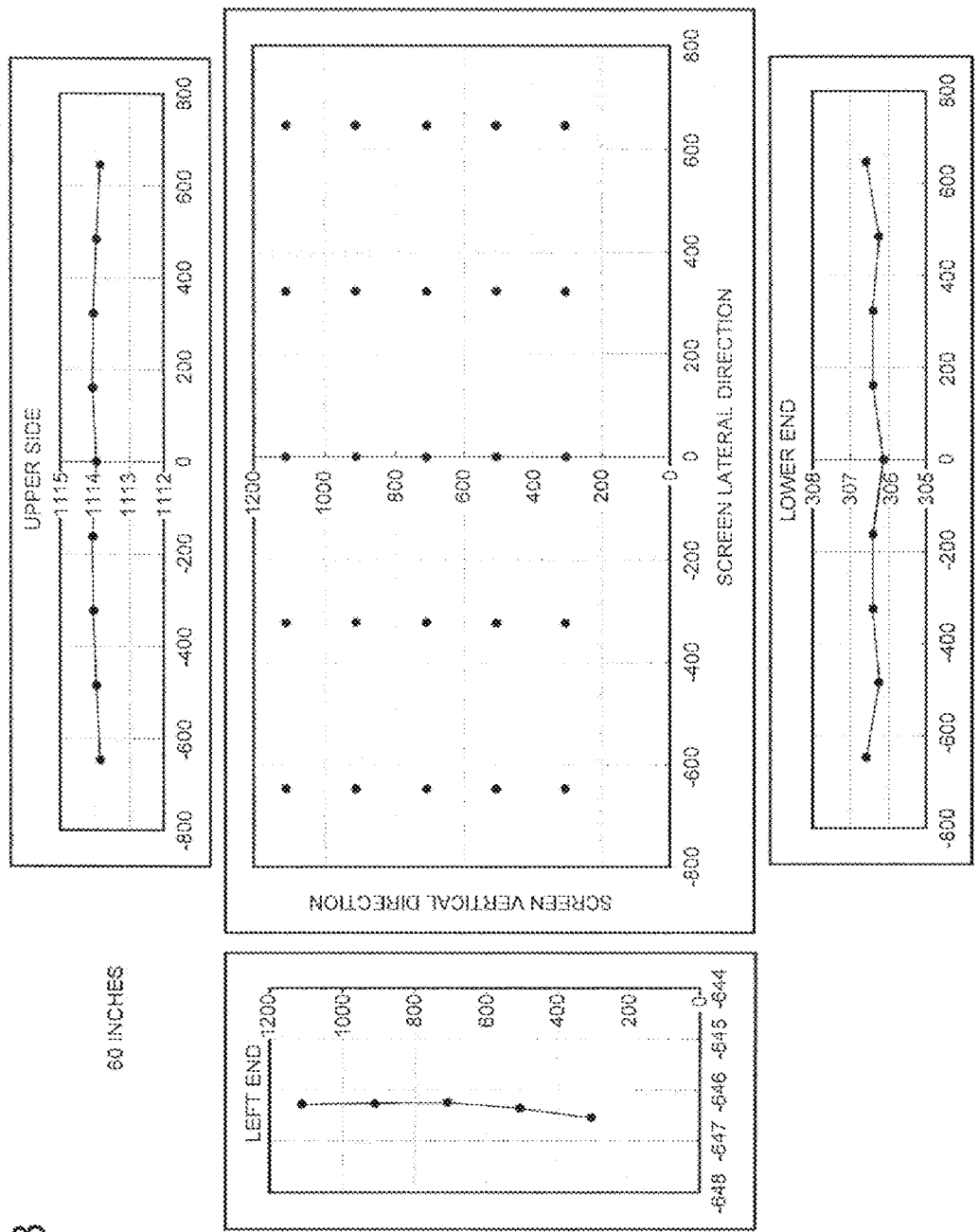
Figure 59:
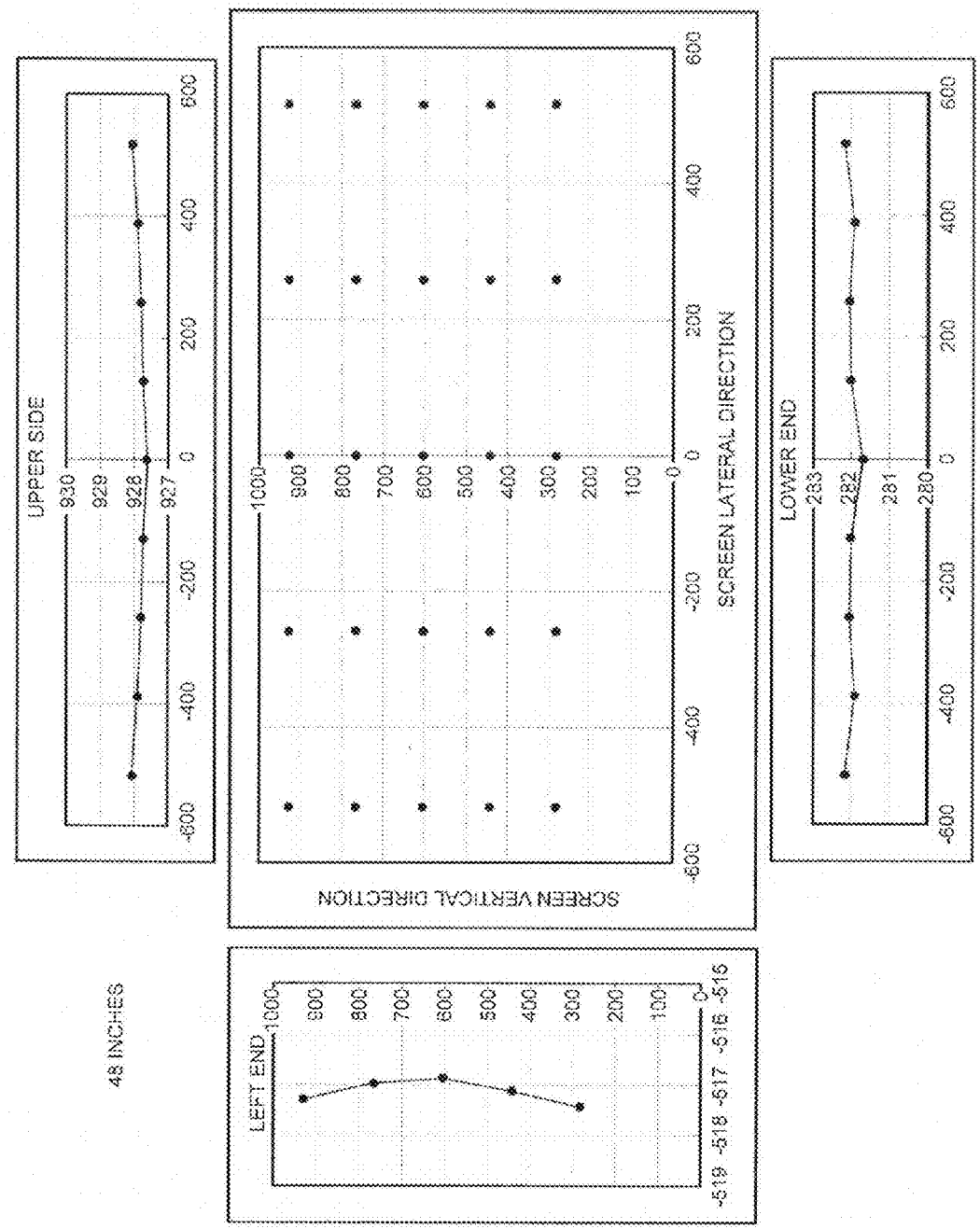
Figure 60:
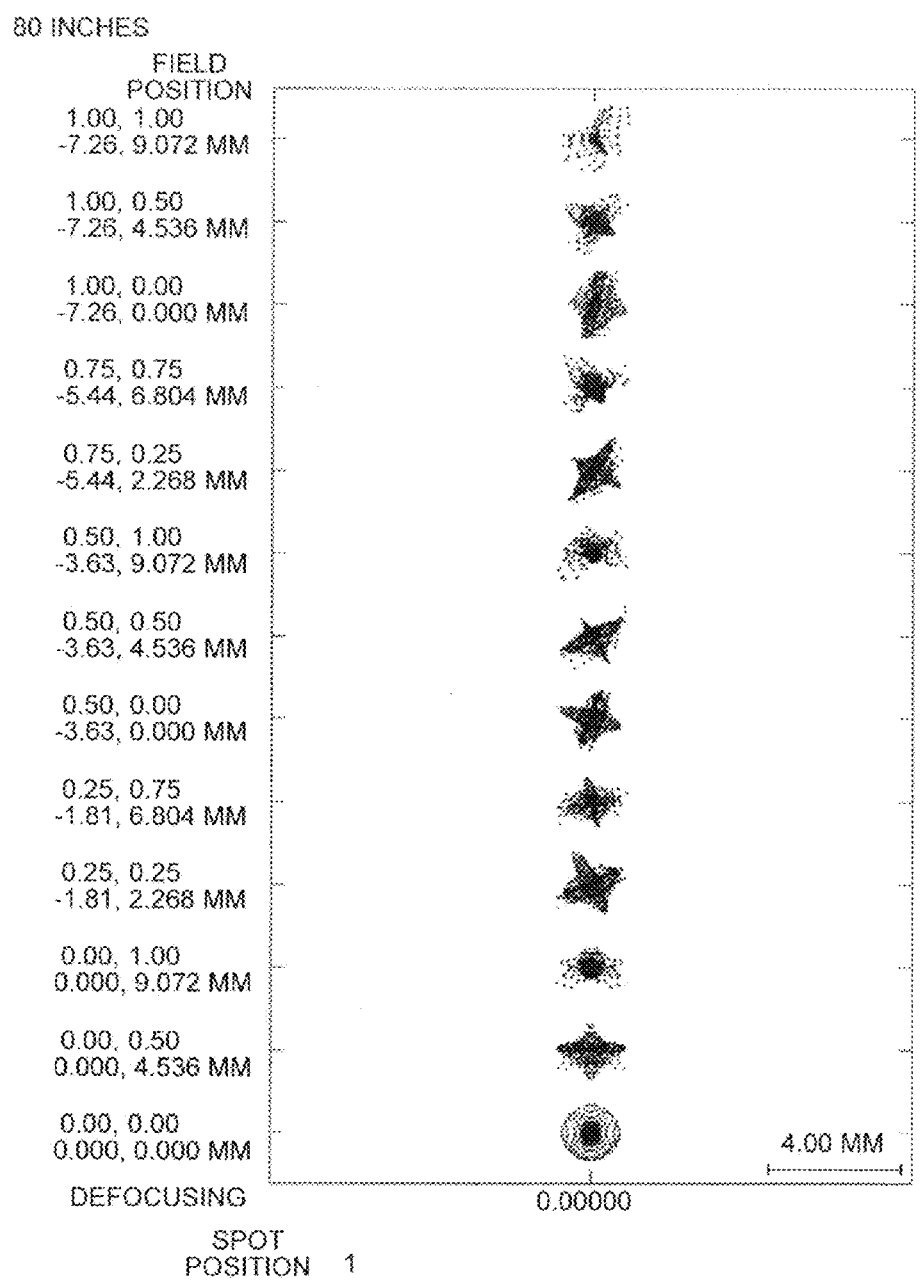
Figure 61:
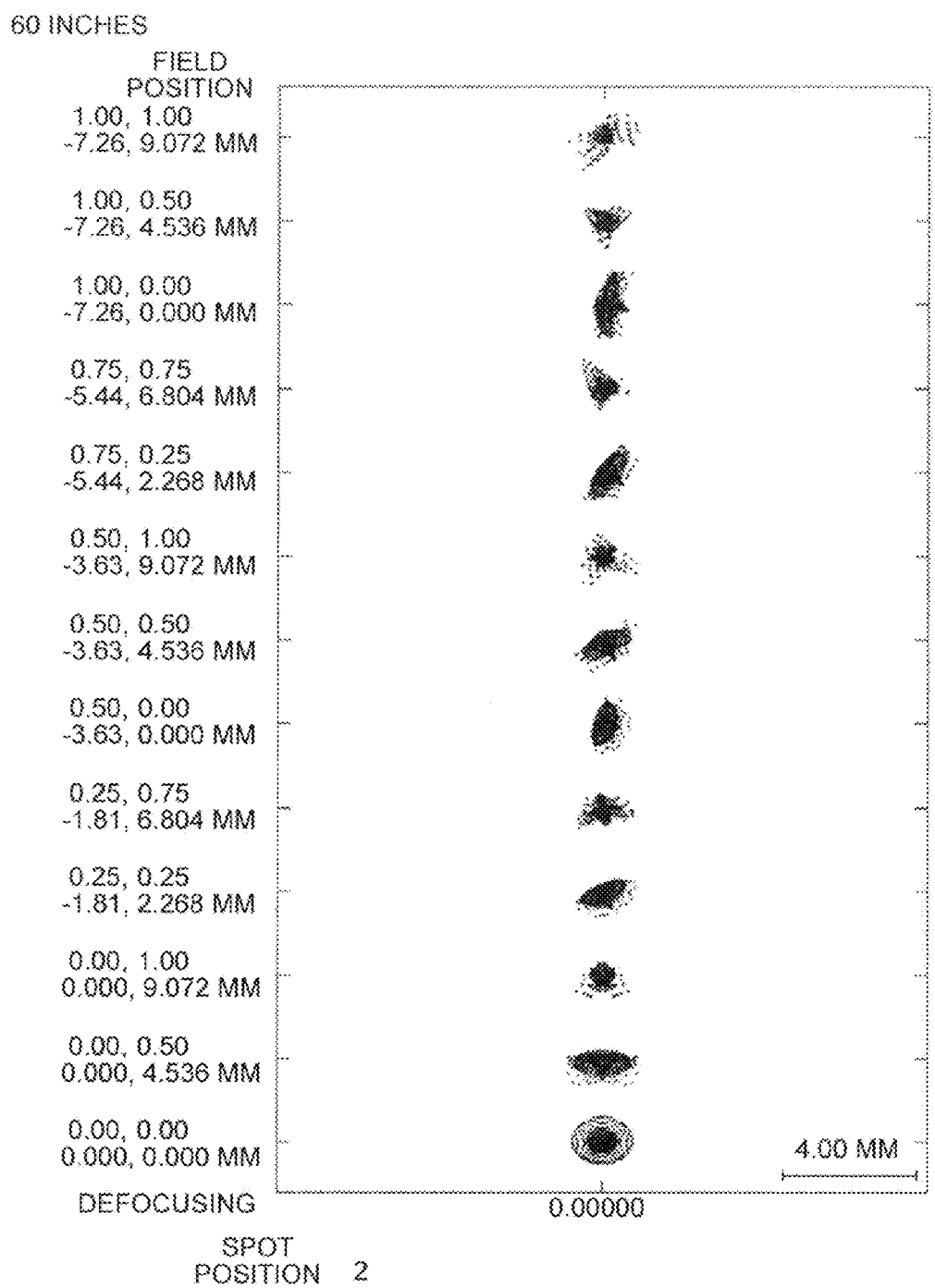
Figure 62:
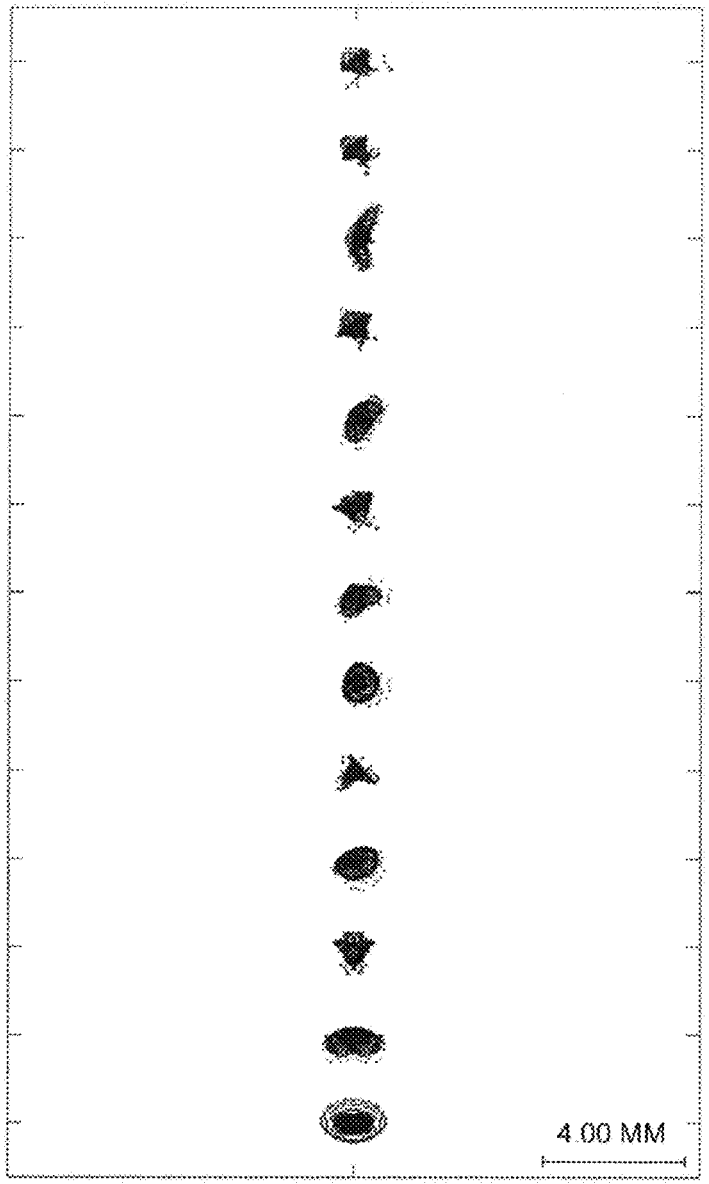
Figure 63:
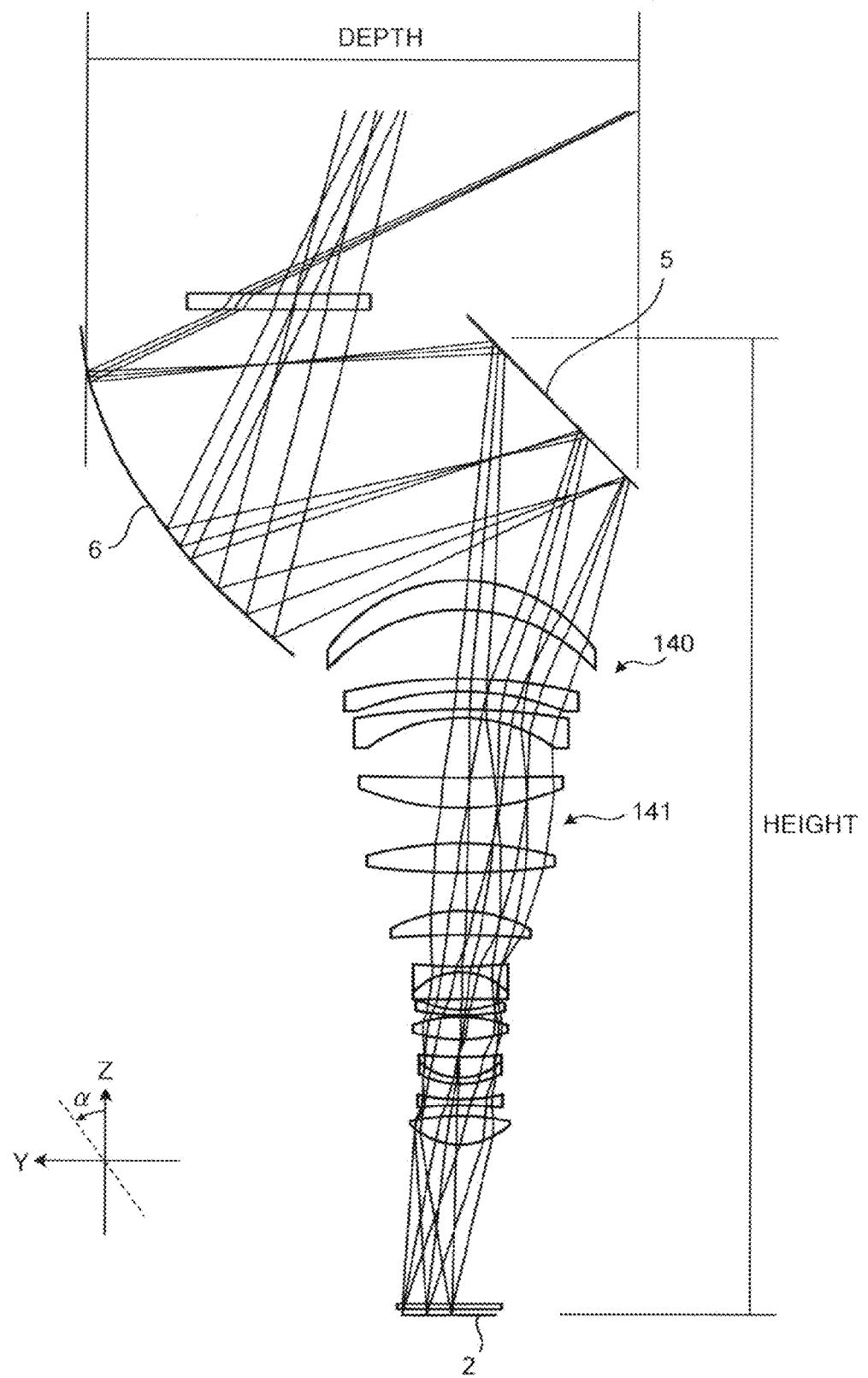
Figure 64:
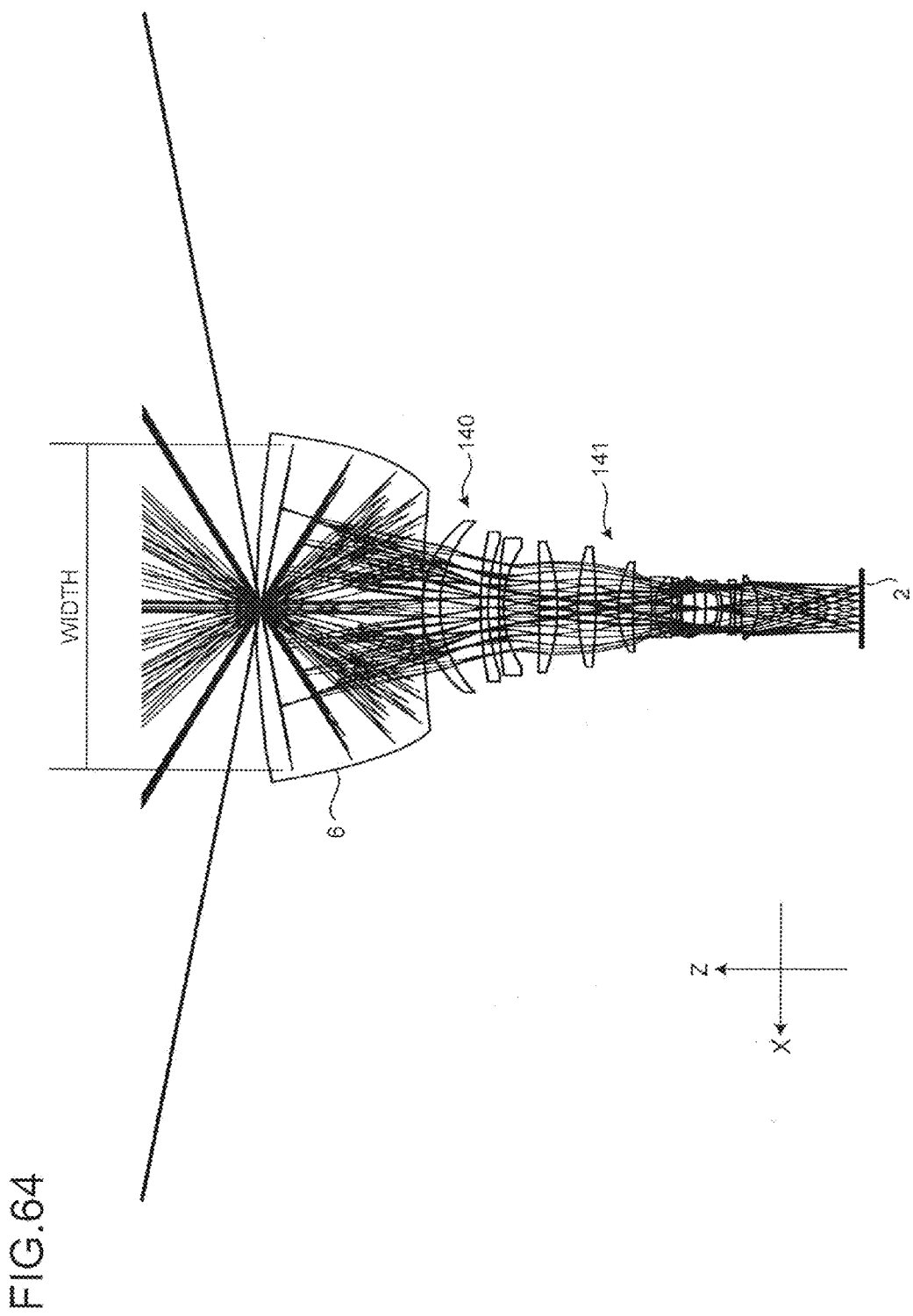

FIG. 50 is a spot diagram illustrating imaging characteristics (mm) on a screen surface regarding a wavelength of 625 nm (red), a wavelength of 550 nm (green), and a wavelength of 425 nm (blue) with a medium projection distance (60 inches) of the projector apparatus according to the fourth embodiment;

FIG. 51 is a spot diagram illustrating imaging characteristics (mm) on a screen surface regarding a wavelength of 625 nm (red), a wavelength of 550 nm (green), and a wavelength of 425 nm (blue) with a short projection distance (48 inches) of the projector apparatus according to the fourth embodiment;

FIG. 52 is a cross section of a projector apparatus according to a fifth embodiment of the present invention;

FIG. 53 is a diagram illustrating a lens configuration of a refractive optical system provided in a projection optical system of the projector apparatus according to the fifth embodiment;

FIG. 54 is a diagram illustrating plotted intersections of a paraxial image plane and a main light beam with a long distance (80 inches) of the projector apparatus according to the fifth embodiment;

FIG. 55 is a diagram illustrating plotted intersections of a paraxial image plane and a main light beam with a medium distance (60 inches) of the projector apparatus according to the fifth embodiment;

FIG. 56 is a diagram illustrating plotted intersections of a paraxial image plane and a main light beam with a short distance (48 inches) of the projector apparatus according to the fifth embodiment;

FIG. 57 is a diagram illustrating spotted positions (wavelength: 550 nm) of respective angles of view on a screen with a long projection distance (80 inches) of the projector apparatus according to the fifth embodiment;

FIG. 58 is a diagram illustrating spotted positions (wavelength: 550 nm) of respective angles of view on a screen with a medium projection distance (60 inches) of the projector apparatus according to the fifth embodiment;

FIG. 59 is a diagram illustrating spotted positions (wavelength: 550 nm) of respective angles of view on a screen with a short projection distance (48 inches) of the projector apparatus according to the fifth embodiment;

FIG. 60 is a spot diagram illustrating imaging characteristics (mm) on a screen surface regarding a wavelength of 625 nm (red), a wavelength of 550 nm (green), and a wavelength of 425 nm (blue) with a long projection distance (80 inches) of the projector apparatus according to the fifth embodiment;

FIG. 61 is a spot diagram illustrating imaging characteristics (mm) on a screen surface regarding a wavelength of 625 nm (red), a wavelength of 550 nm (green), and a wavelength of 425 nm (blue) with a medium projection distance (60 inches) of the projector apparatus according to the fifth embodiment;

FIG. 62 is a spot diagram illustrating imaging characteristics (mm) on a screen surface regarding a wavelength of 625 nm (red), a wavelength of 550 nm (green), and a wavelength of 425 nm (blue) with a short projection distance (48 inches) of the projector apparatus according to the fifth embodiment;

FIG. 63 is a diagram illustrating the "height" and the "depth" of the projection optical system of the projector apparatus in each embodiment; and FIG. 64 is a diagram illustrating the "width" of the projection optical system of the projector apparatus in each embodiment.

DETAILED DESCRIPTION OF THE PREFERRED EMBODIMENTS

Outline

Figure 1:
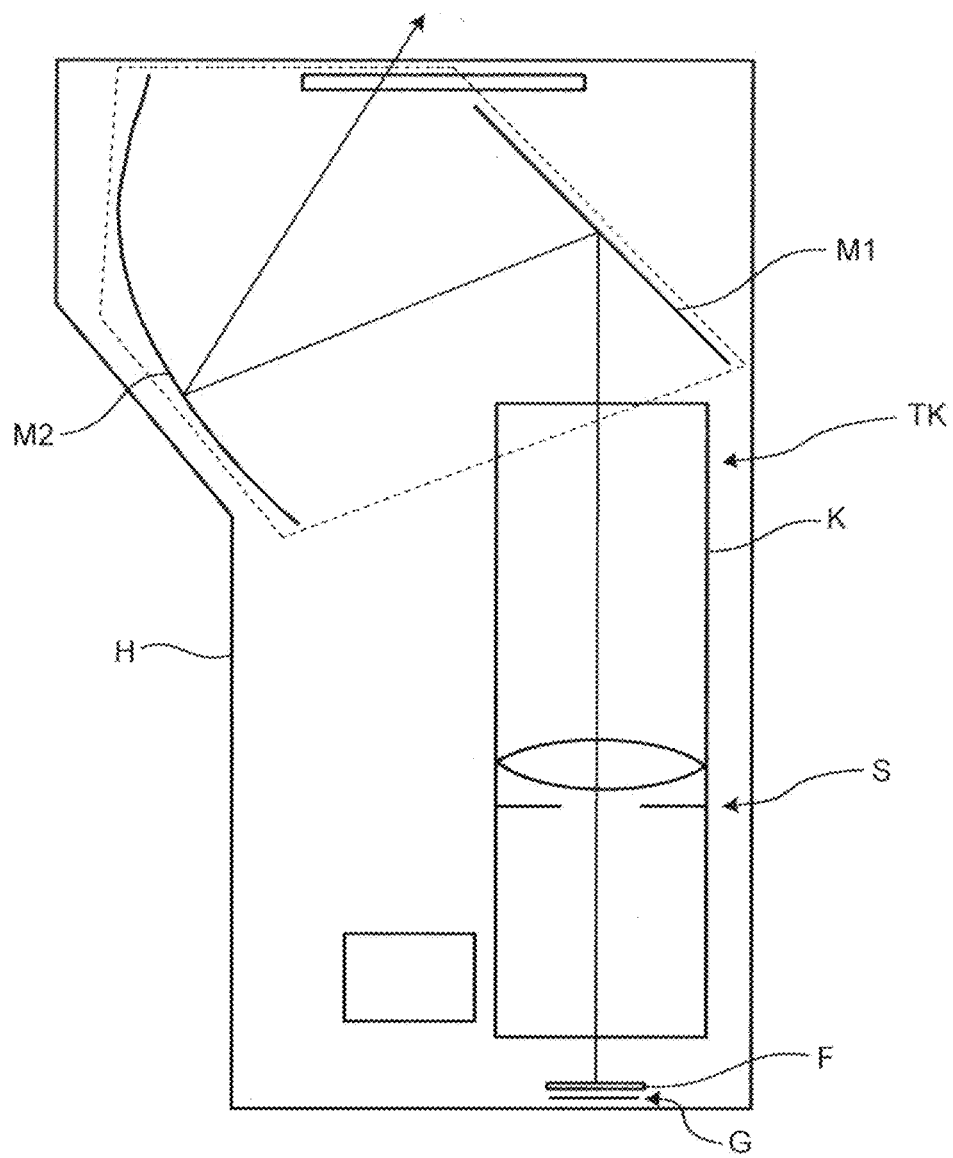
FIG. 1 is a cross section of a common projector apparatus.

First, the outline of the projector apparatus of embodiments of the present invention will be described with reference to FIGS. 1 to 4. FIG. 1 is a cross section of a common projector apparatus. The cross section in FIG. 1 illustrates only a main part of the projector apparatus. In FIG. 1, the projector apparatus has, in a housing H, a projection optical system TK including an image forming unit G, a parallel plate F, a refractive optical system K, a reflecting plane mirror M1, and a concave surface mirror M2. The refractive optical system K is provided with an aperture stop S.

Figure 2:
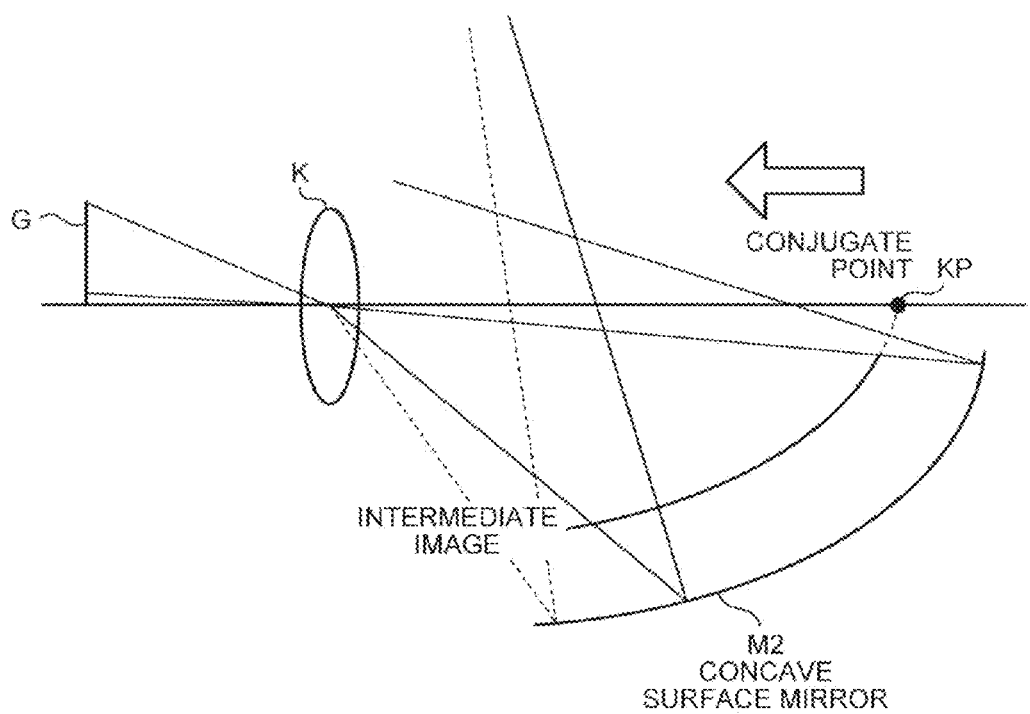
FIG. 2 is a diagram for explaining a problem that occurs in a downsized straight projection optical system.

For downsizing the projection optical system TK, it is important to reduce a size of space between the reflecting plane mirror M1 and the concave surface mirror M2. The space is surrounded by a dotted line in FIG. 1. FIG. 2 is a diagram for explaining a problem that occurs in a downsized straight projection optical system, which reflects an image formed with the image forming unit G once by the concave surface mirror M2 and projects it on a screen, etc. As illustrated in FIG. 2, in the straight projection optical system, the projector apparatus can be downsized in a total length direction by shortening a conjugate point KP, that is, by shortening the focal length of a lens (widening an angle), for example. Such a method can downsize the projector apparatus in a total length direction. However, the projector apparatus is not sufficiently downsized because the wider angle increases an angle of emergence, thus increasing the size of the concave surface mirror M2.

Figure 3:
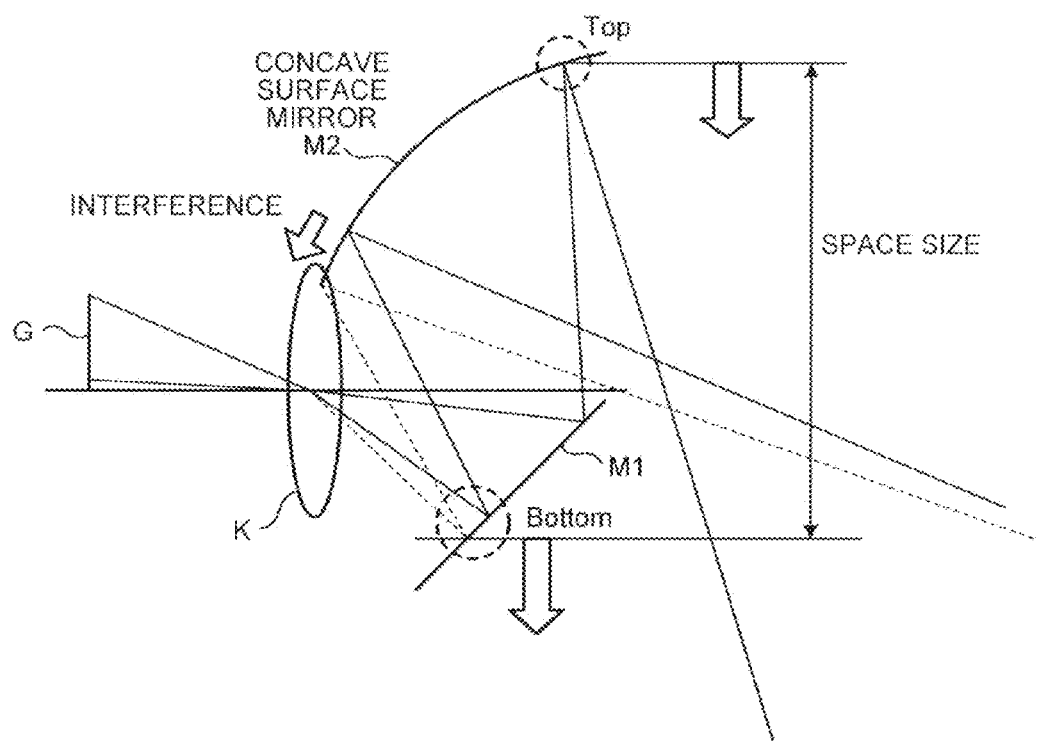
FIG. 3 is a diagram for explaining a problem that occurs in a downsized reflecting projection optical system.

FIG. 3 is a diagram for explaining a problem that occurs in a downsized typical reflecting projection optical system, which reflects an image formed with the image forming unit G twice by the reflecting plane mirror M1 and the concave surface mirror 2 and projects it on a screen, etc. When a focal length is simply shortened in the reflecting projection optical system illustrated in FIG. 3, as is performed in the straight projection optical system, the angle becomes wider, and the top portion of the concave surface mirror M2 is lowered. However, at the same time, the bottom portion of the reflecting plane mirror M1 is also lowered. Thus, the space size between the reflecting plane mirror M1 and the concave surface mirror M2 is not reduced. The wider angle increases the mirror size of the concave surface mirror M2, which causes interference between the concave surface mirror M2 and lenses of the refractive optical system K.

Figure 4:
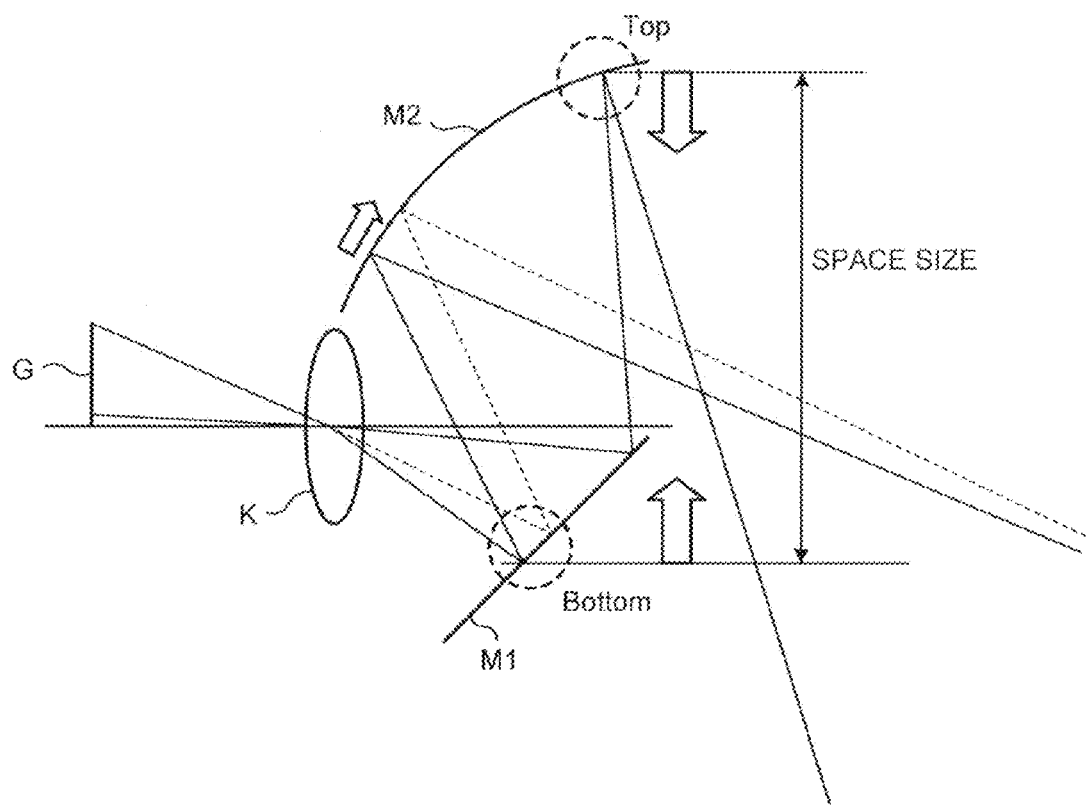
FIG. 4 is a diagram for explaining an outline of a projector apparatus according to a first embodiment of the present invention.

FIG. 4 is a diagram for explaining an outline of the projector apparatus according to the first embodiment. The projector apparatus of the first embodiment achieves reduction of the focal length of the refractive optical system K and forms an intermediate image having negative distortion (barrel form distortion). Thus, in the projector apparatus of the first embodiment, the top portion of the concave surface mirror M2 is lowered while the bottom portion of the reflecting plane mirror M1 is raised, as illustrated in FIG. 4. Consequently, the projector apparatus of the first embodiment can reduce the space size between the reflecting plane mirror M1 and the concave surface mirror M2. Moreover, the projector apparatus of the first embodiment can reduce in size (compress) an intermediate image by causing barrel form distortion on the intermediate image. Thus, it is possible to reduce the size of the concave surface mirror M2 and downsize the projector apparatus. The reduction of the size of the concave surface mirror M2 prevents interference between the concave surface mirror M2 and the lenses of the refractive optical system K.

First Embodiment

Figure 5:
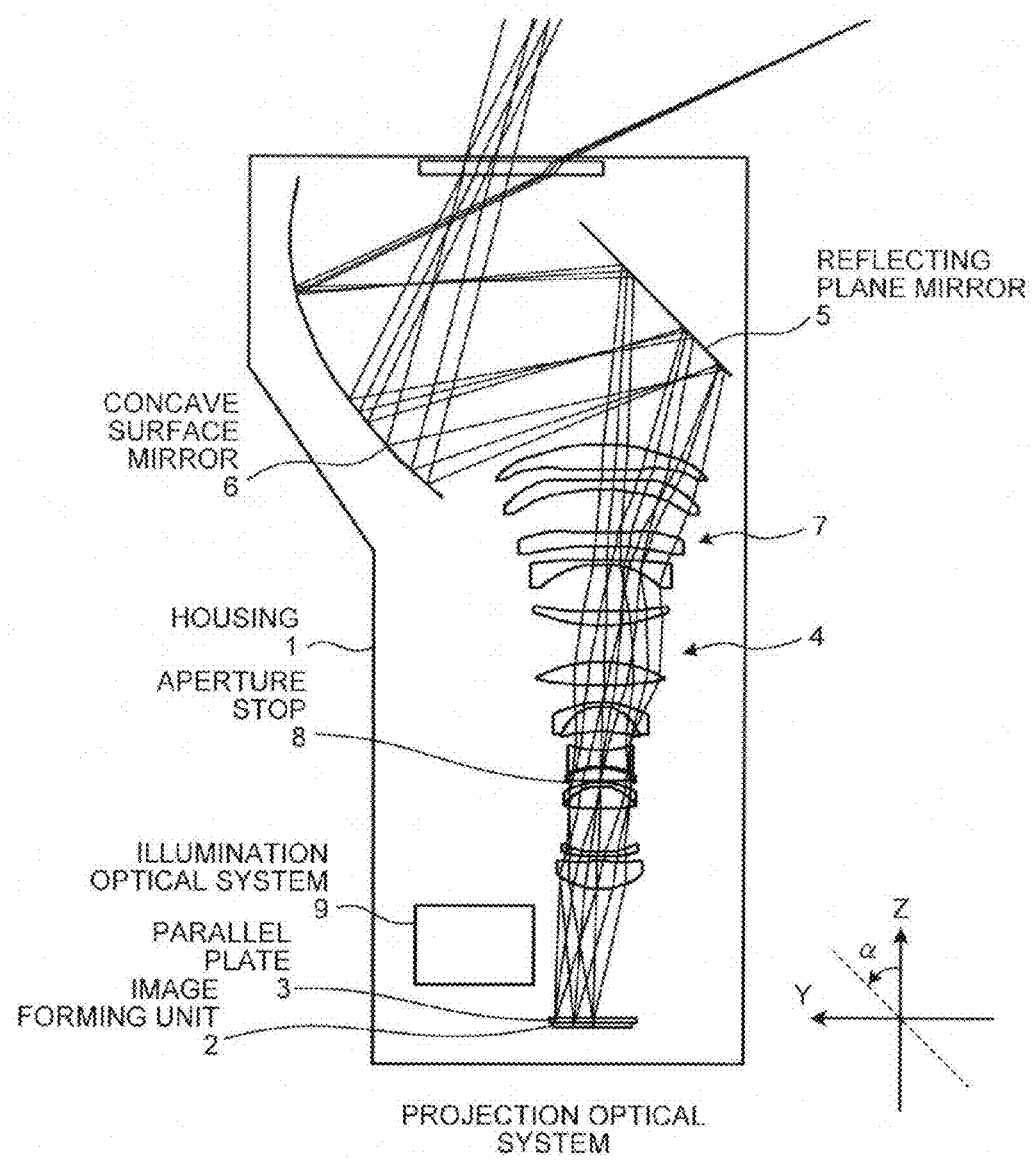
FIG. 5 is a cross section of the projector apparatus according to the first embodiment.

The projector apparatus of the first embodiment will be described in the following. FIG. 5 is a cross section of the projector apparatus of the first embodiment. The cross section in FIG. 5 illustrates only a main part of the projector apparatus of the first embodiment. In FIG. 5, the projector apparatus includes, in a housing 1, a projection optical system 7 including an image forming unit 2, a parallel plate 3, a refractive optical system 4, a reflecting plane mirror 5 (one example of reflecting mirrors), and a concave surface mirror 6 (one example of reflecting surfaces). The refractive optical system 4 is provided with an aperture stop 8.

As the image forming unit 2, a light valve such as a DMD, a transmissive liquid crystal panel, and a reflecting liquid crystal panel can be used. When the image forming unit 2 does not have a function of spontaneous light emission, the image forming unit 2 is irradiated with illumination light from an illumination optical system 9 to form a projection image. The illumination optical system 9 preferably has a function of efficiently illuminating the image forming unit 2. As the illumination optical system 9, a rod integrator or a fly-eye integrator can be used, for example, so as to further equalize illumination. As a light source of the illumination, a white light source such as an ultra-high pressure mercury lamp, a xenon lamp, a halogen lamp, and a light emitting diode (LED) can be used. Moreover, a monochromatic light source such as a monochromatic light emitting LED and a laser diode (LD) can be also used. The projector apparatus of the first embodiment is an example of a case in which the DMD is used as the image forming unit 2. The parallel plate 3 arranged in the vicinity of the image forming unit 2 is a cover glass (sealing glass) of the image forming unit 2.

The following represents symbols used in the description of the first embodiment, and the second to the fourth embodiment described later.
f: focal distance of whole system
NA: numerical aperture (aperture efficiency)
ω: half angle of view (deg)
R: curvature radius (paraxial curvature radius for aspheric surface)
D: spacing
Nd: refractive index
vd: Abbe number
K: conic constant of aspheric surface
Ai: i-order aspheric surface constant
Cj: free curved surface coefficient The aspheric surface form is defined as the following Expression (1) using a reciprocal of a paraxial curvature radius (paraxial curvature): C, a height from an optical axis: H, a conic constant: K, and an aspheric surface coefficient of each order, and supposing an aspheric surface amount X in an optical axis direction. The aspheric surface form is specified by providing a paraxial curvature radius, a conic constant, and an aspheric surface coefficient.

$$X = \frac{C \cdot H^2}{1 + \sqrt{(1 - (1+K) \cdot C^2 \cdot H^2)}} + \sum_{i=1} Ai \cdot H^i \quad (1)$$

The free curved surface form is defined as the following Expression (2) using a reciprocal of a paraxial curvature radius (paraxial curvature): C, a height from an optical axis: H, a conic constant: K, and the above free curved surface coefficient, and supposing a free curved surface amount X in an optical axis direction. The free curved surface is specified by providing a paraxial curvature radius, a conic constant, and a free curved surface coefficient. A direction perpendicular to the optical axis on a surface including a light beam connecting the center of the aperture stop 8 and the center of a projection image is regarded as a Y direction.

$$X = \frac{C \cdot H^2}{1 + \sqrt{(1 - (1+K) \cdot C^2 \cdot H^2)}} + \sum_{j=1} Cj \cdot x^m y^n \quad (2)$$

In the above expression (2), the "j" satisfies the condition of the following Expression (3).

$$j = \frac{(m+n)^2 + m + 3n}{2} + 1 \quad (3)$$

The paths indicated by continuous lines illustrated in FIG. 5 illustrate paths respectively corresponding to different focusing of the refractive optical system 4. As illustrated in FIG. 5, it is supposed that an optical axis direction corresponds to a Z axis, and a direction perpendicular to the optical axis on a surface including a light beam passing the center of an image, the center of a stop, and the center of a screen corresponds to a Y axis. It is also supposed that the rotation from the +Z direction to the +Y direction on a surface including a light beam passing the center of an image, the center of a stop, and the center of a screen is rotation +α.

A light flux subjected to two-dimensional intensity modulation with the image forming unit 2 (DMD, for example) based on image information becomes a projection light flux as an object light. The projection light flux from the image forming unit 2 becomes an image-forming light flux through the refractive optical system 4 including at least one aspheric surface lens, the reflecting plane mirror 5, and the concave surface mirror 6. That is, an image formed on the image forming unit 2 is enlarged and projected with the projection optical system 7 on the screen as a projection image.

Figure 6:
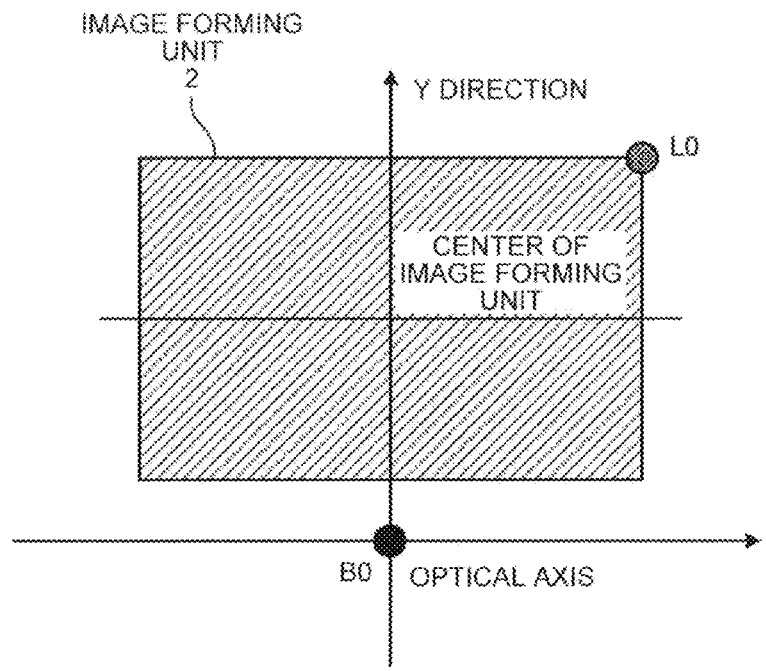
FIG. 6 is a diagram for explaining positional relation between an optical axis and an image forming unit in the projector apparatus according to the first embodiment.
Figure 7:
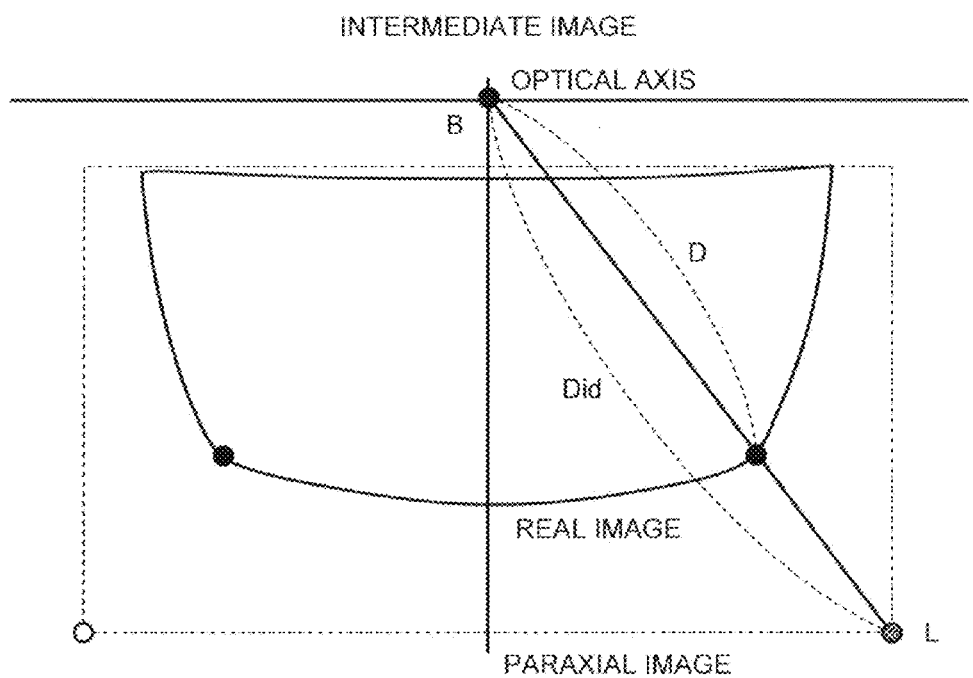
FIG. 7 is a diagram for explaining each condition of conditional expressions used to design a projection optical system of the projector apparatus according to the first embodiment.

Here, FIG. 6 is a diagram illustrating positional relation between an optical axis and the image forming unit 2. FIG. 7 is a diagram for explaining each condition of conditional expressions used to design the projection optical system. A surface on which the image forming unit 2 forms an image is an image forming surface. The optical elements of the refractive optical system 4 share the optical axis, and the image forming unit 2 is provided shifted in the Y direction relative to the optical axis, as illustrated in FIG. 6. When B0 is an intersection of a plane surface including an image forming surface of the image forming unit 2 and the optical axis, the symbol "B" represents a conjugate point of the intersection B0 for the refractive optical system 4. A surface that includes the conjugate point B and is perpendicular to the optical axis is a paraxial image plane. As illustrated in FIG. 7, the symbol "D" represents a maximum distance between the intersection B of the optical axis and the paraxial image plane and an intersection of the paraxial image plane and the light beam passing the center of the stop (hereinafter, referred to as a main light beam). A result obtained by multiplying a point at which the distance between the optical axis and an end of the image forming unit 2 is maximum (the symbol "L0" in FIG. 6) by a paraxial magnification of the refractive optical system 4 is a maximum paraxial image height Did.

In the first embodiment, the refractive optical system 4 and one concave surface mirror 6 constitute the projection optical system 7. The number of mirrors of the projection optical system 7 may be increased to provide power to the reflecting plane mirror 5.

The light passing through the refractive optical system 4 forms an intermediate image which is a space image conjugate to the image information formed with the image forming unit 2 on a near side to the image forming unit 2 relative to the reflecting plane mirror 5. The intermediate image is not necessarily formed as a flat image. The refractive optical system 4 is provided with at least one aspheric surface lens. Excessive correction of the aspheric surface lens forms an intermediate image having barrel form distortion. In the first embodiment, and the other embodiments described later, the intermediate image is formed as such a curved image. The intermediate image is enlarged and projected on the screen with the free curved surface concave surface mirror 6 arranged on the most magnification side. Although the intermediate image has image surface curvature (barrel form distortion), the image surface curvature and the barrel form distortion are corrected at the same time using the free curved surface concave surface mirror 6. Thus, it is possible to obtain a high-quality projection image. Moreover, the size of the intermediate image can be reduced by causing barrel form distortion thereon. Consequently, the necessary mirror size of the concave surface mirror 6 can be reduced, thus downsizing the projector apparatus. The image surface curvature and the barrel form distortion occurring on the intermediate image are corrected with the free curved surface concave surface mirror 6. Thus, the degree of freedom of the design of the refractive optical system 4 and the projection optical system can be increased, which remarkably contributes to the downsizing of the projector apparatus, etc. For example, the balancing of the image surface curvature and the barrel form distortion by the refractive optical system can decrease a load on the free curved surface concave surface mirror 6, thus further downsizing the projector apparatus.

Figure 8:
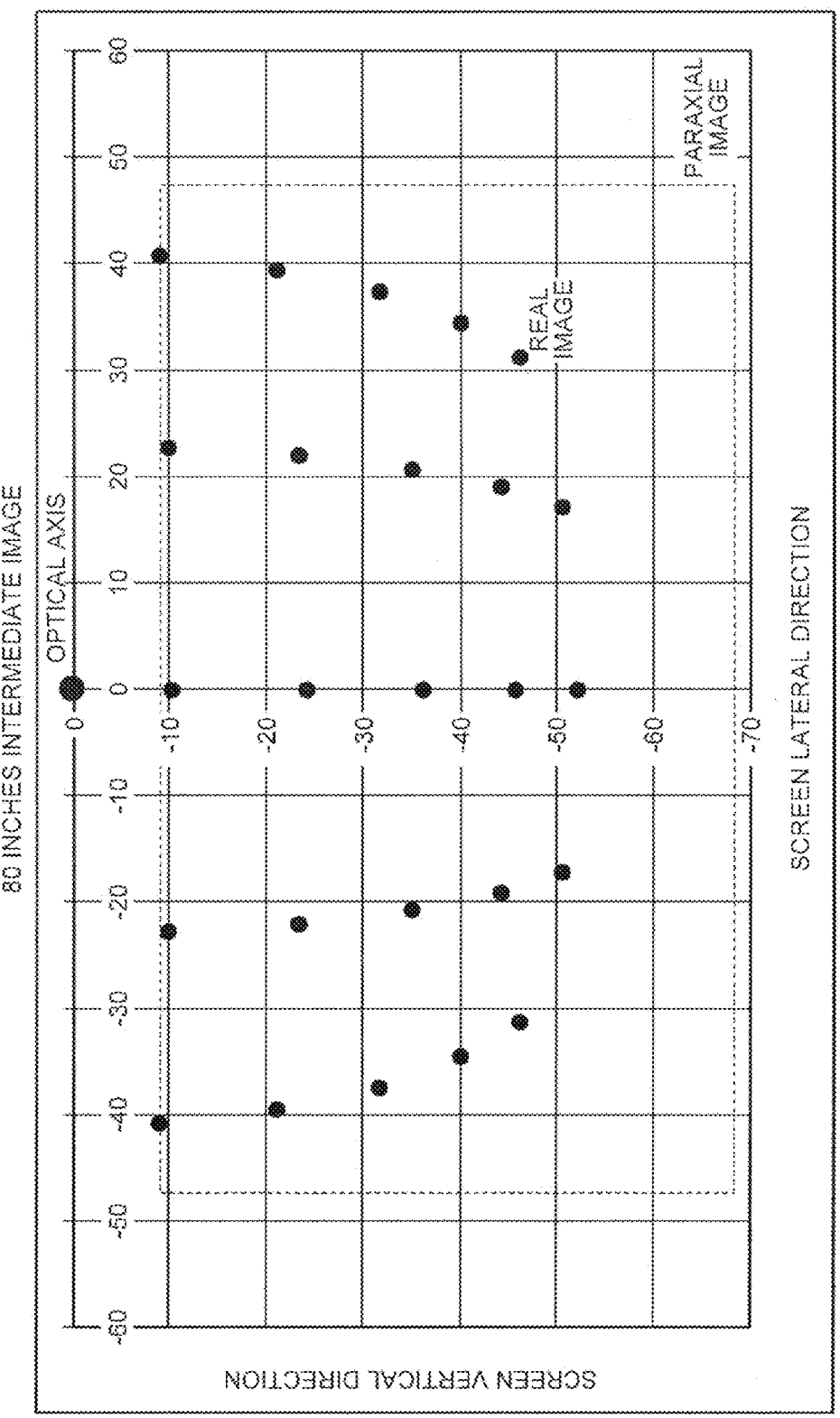
FIG. 8 is a diagram illustrating plotted intersections of a paraxial image plane and a main light beam with a long distance (80 inches) of the projector apparatus according to the first embodiment.
Figure 9:
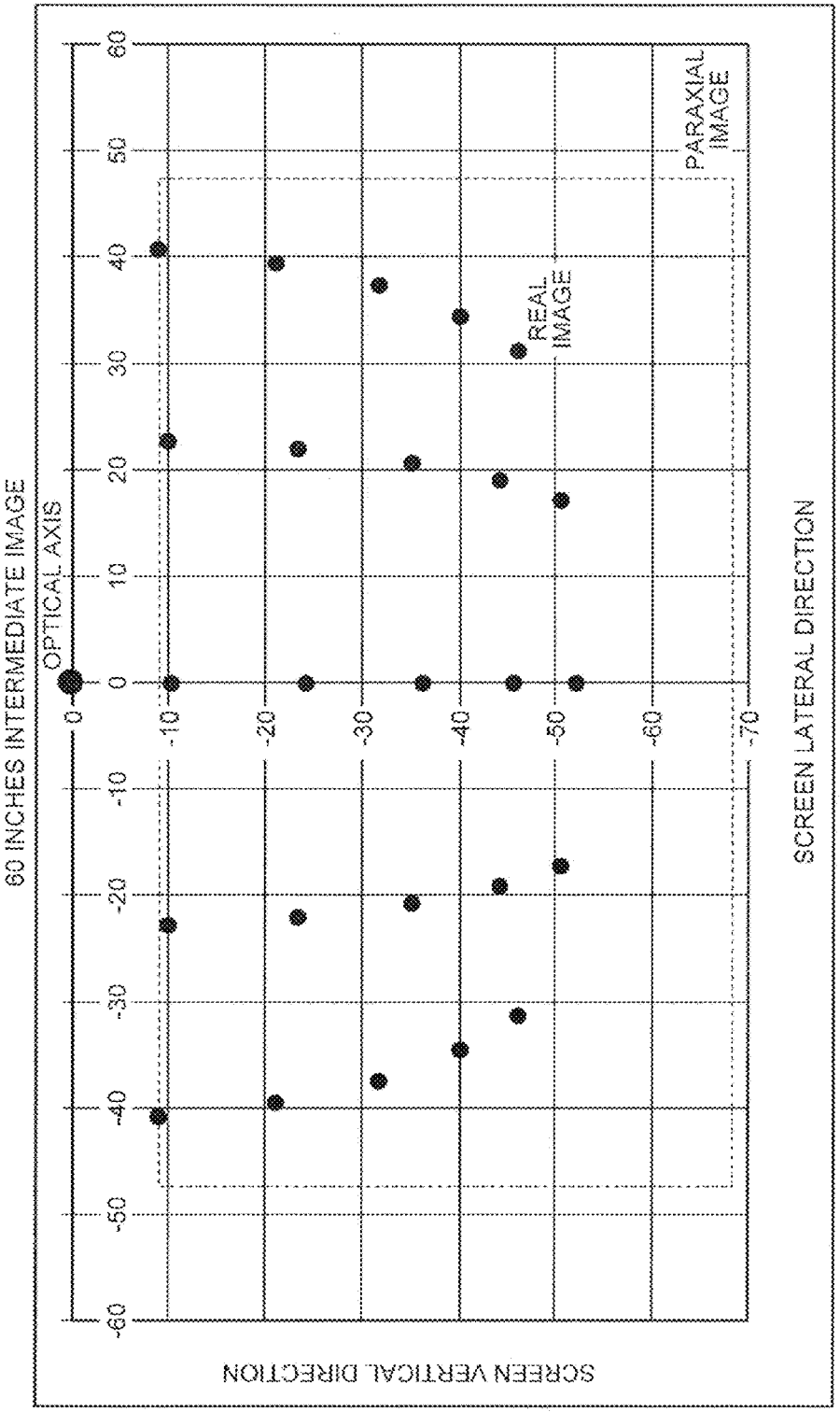
FIG. 9 is a diagram illustrating plotted intersections of a paraxial image plane and a main light beam with a medium distance (60 inches) of the projector apparatus according to the first embodiment.
Figure 10:
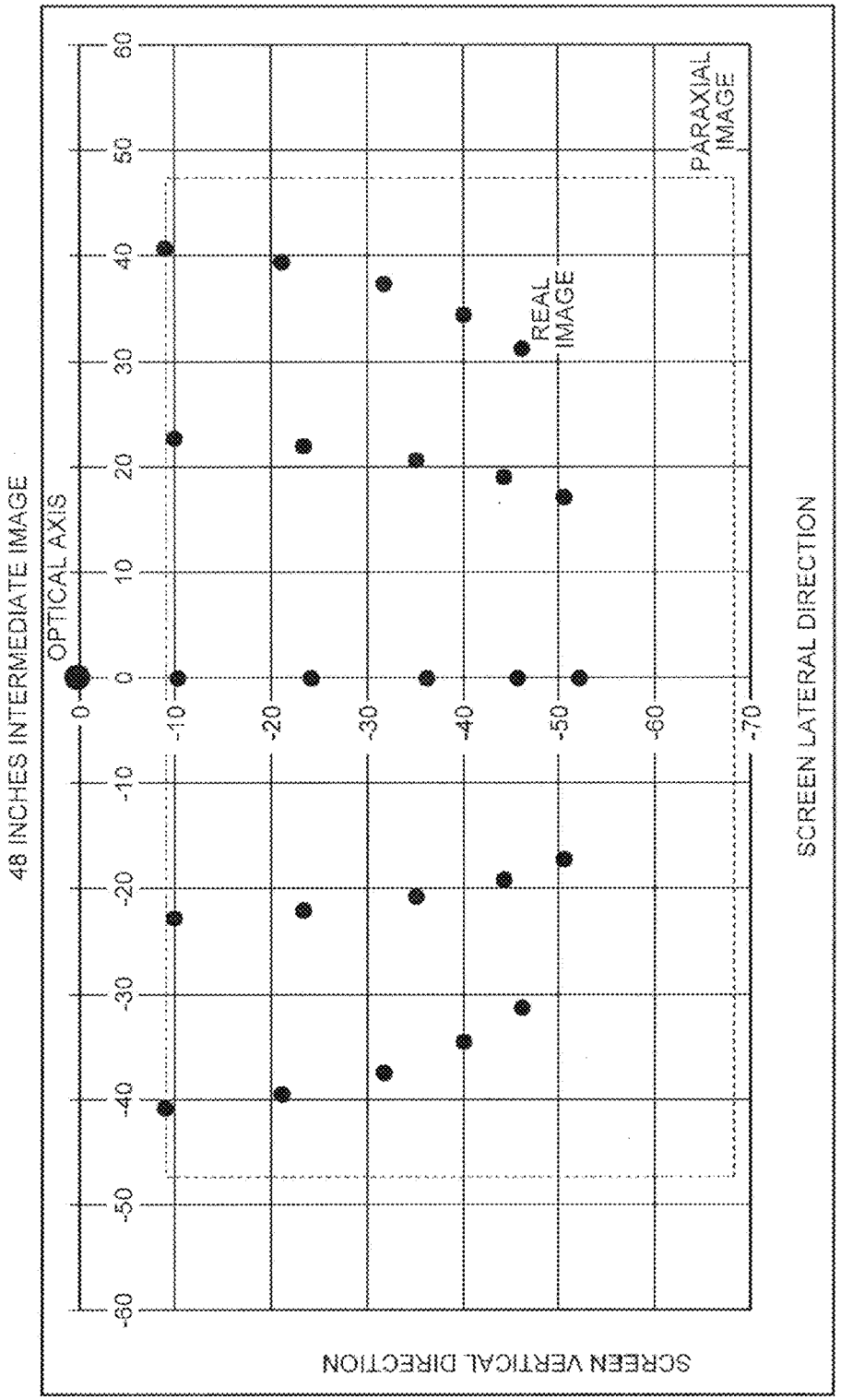
FIG. 10 is a diagram illustrating plotted intersections of a paraxial image plane and a main light beam with a short distance (48 inches) of the projector apparatus according to the first embodiment.

FIGS. 8, 9, and 10 are diagrams illustrating plotted intersections of the main light beam and the paraxial image plane regarding a long distance (80 inches), a medium distance (60 inches), and a short distance (48 inches), respectively. In FIGS. 8, 9, and 10, black points indicate coordinates of intersections of the main light beam and the paraxial image plane with several angles of view, and a dotted line indicates the paraxial image. According to FIGS. 8, 9, and 10, the barrel form distortion occurs in each screen size. That is, this indicates that the intermediate image is compressed and reduced in size. The reduction of the size of the intermediate image can reduce the size of the free curved surface concave surface mirror 6. Therefore, it is possible to downsize the projector apparatus and thus reduce costs of the projector apparatus.

Figure 11:
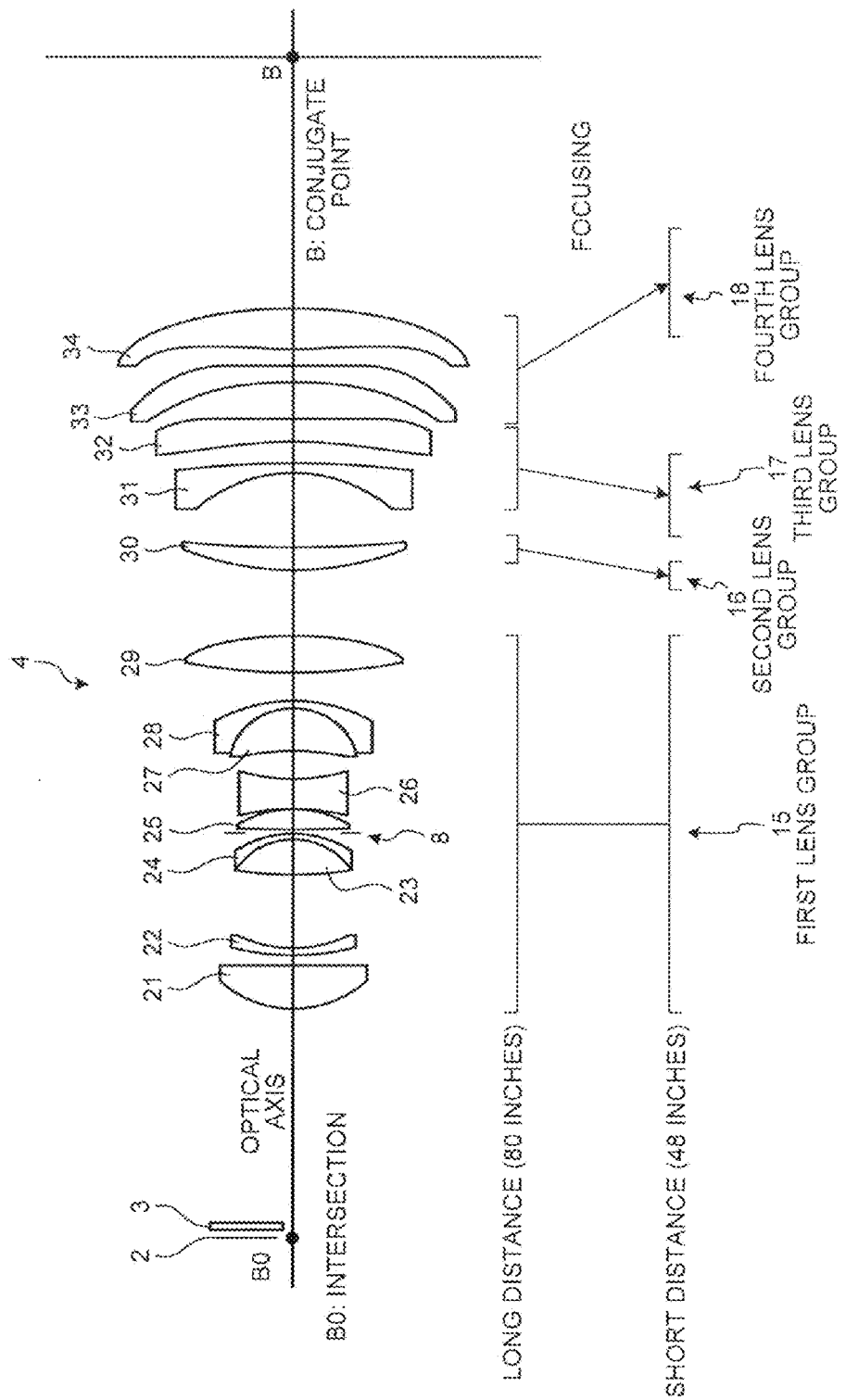
FIG. 11 is a diagram illustrating a lens configuration of a refractive optical system provided in the projector apparatus according to the first embodiment.

In the first embodiment, in the focusing from a long distance side to a short distance side, a positive lens group of the refractive optical system 4 (=a first lens group 15 in FIG. 11), the reflecting plane mirror 5, and the free curved surface concave surface mirror 6 are fixed relative to the image forming surface of the image forming unit 2, whereas, a positive lens group of the refractive optical system 4 a second lens group 16 in FIG. 11) and a negative lens group thereof (=a third lens group 17 in FIG. 11) are moved toward the image forming unit 2. A positive lens group of the refractive optical system 4 (a fourth lens group 18 in FIG. 11) is moved to the magnification side. That is, a process called a floating focus is performed in the focusing from a long distance side to a short distance side. Therefore, the projector apparatus of the first embodiment can highly control image surface curvature and distortion aberration. In the projector apparatus of the first embodiment, the aspheric surface lenses are used in the lens groups moving in the above manner, and the excessive correction of the aspheric surface lenses causes barrel form distortion on the intermediate image, whereby the size of the intermediate image is reduced.

FIG. 11 is a diagram illustrating a lens configuration of the refractive optical system 4. As illustrated in FIG. 11, the refractive optical system 4 includes the first lens group 15 having positive refractive power and the second lens group 16 having positive refractive power in this order from the image forming unit 2 to the magnification side. The refractive optical system 4 also includes the third lens group 17 having negative refractive power with one aspheric surface lens and the fourth lens group 18 having positive refractive power with two aspheric surface lenses. Moreover, the refractive optical system 4 includes the reflecting plane mirror 5, and the free curved surface concave surface mirror 6 arranged at the most magnification side. In the focusing from a long distance side to a short distance side with the variation of the projection distance, the refractive optical system 4 moves the positive second lens group 16 and the negative third lens group 17 toward the image forming unit 2, and moves the positive fourth lens group 18 to the magnification side.

The first lens group 15 includes, in the order from the image forming unit 2, a both surface aspheric biconvex lens 21 with the stronger convex surface directed to the image forming unit 2 and a negative meniscus lens 22 with the convex surface directed to the image forming unit 2. Moreover, the first lens group 15 includes a biconvex lens 23 with the stronger convex surface directed to the magnification side, a cemented lens 24 of a negative meniscus lens with the convex surface directed to the magnification side, and a biconvex lens 25 with the stronger convex surface directed to the magnification side. Furthermore, the first lens group 15 includes a biconcave lens 26 with the stronger concave surface directed to the magnification side, a positive meniscus lens 27 with the convex surface directed to the magnification side, a cemented lens 28 of a negative meniscus lens with the convex surface directed to the screen side, and a biconvex lens 29 with the stronger convex surface directed to the magnification side.

The second lens group 16 includes a positive meniscus lens 30 with the convex surface directed to the image forming unit 2. The third lens group 17 includes a negative meniscus lens 31 with the convex surface directed to the magnification side and a both surface aspheric biconcave lens 32 with the stronger concave surface directed to the image forming unit 2. The fourth lens group 18 includes a both surface aspheric biconcave lens 33 with the stronger concave surface directed to the image forming unit 2 and a both surface aspheric biconvex lens 34 with the stronger convex surface directed to the magnification side.

The following tables 1 to 5 show data of the refractive optical system 4 provided in the projector apparatus of the first embodiment. The "i" in the table 1 represents the i-th surface (prism surface, lens surface, stop surface, reflecting surface) when counted from the image forming unit 2.

Numerical Aperture

TABLE 1

| Numerical aperture: 0.195 | | | | |
|---|---|---|---|---|
| i | R | D | Nd | Vd |
| 1 | ∞ | 1.00 | | |
| 2 | ∞ | 1.00 | 1.51680 | 64.2000 |

TABLE 1-continued

Numerical aperture: 0.195

| i | R | D | Nd | Vd |
|---|---|---|---|---|
| 3 | ∞ | 28.00 | | |
| 4* | 14.232 | 5.85 | 1.48749 | 70.4412 |
| 5* | −82.606 | 1.03 | | |
| 6 | 28.360 | 1.00 | 1.84666 | 23.7779 |
| 7 | 17.723 | 9.48 | | |
| 8 | 54.064 | 4.83 | 1.54814 | 45.7843 |
| 9 | −9.762 | 0.80 | 1.90366 | 31.3150 |
| 10 | −15.549 | 0.10 | | |
| stop | ∞ | 0.3 | | |
| 11 | 102.973 | 2.68 | 1.48749 | 70.4412 |
| 12 | −16.673 | 0.10 | | |
| 13 | −29.387 | 3.99 | 1.83481 | 42.7218 |
| 14 | 23.734 | 3.83 | | |
| 15 | −34.163 | 5.47 | 1.53172 | 48.8407 |
| 16 | −9.107 | 0.90 | 1.80400 | 46.5834 |
| 17 | −21.305 | 3.69 | | |
| 18 | 72.991 | 5.05 | 1.63980 | 34.4664 |
| 19 | −32.929 | variable A | | |
| 20 | 41.387 | 2.83 | 1.69895 | 30.1279 |
| 21 | 111.113 | variable B | | |
| 22 | −20.391 | 1.00 | 1.90366 | 31.3150 |
| 23 | −154.612 | 3.04 | | |
| 24* | −47.793 | 2.76 | 1.53046 | 55.8000 |
| 25* | 64.889 | variable C | | |
| 26* | −75.133 | 2.19 | 1.53046 | 55.8000 |
| 27* | 118.861 | 2.18 | | |
| 28* | 95.608 | 5.47 | 1.53046 | 55.8000 |
| 29* | −48.685 | variable D | | |
| 30 | ∞ | −68.57 | reflecting surface | |
| 31* | ∞ | variable E | reflecting surface | |

Focusing

TABLE 2

| | short distance | standard | long distance |
|---|---|---|---|
| screen size | 48 inches | 60 inches | 80 inches |
| variable A | 8.19 | 8.53 | 8.47 |
| variable B | 10.24 | 10.04 | 10.01 |
| variable C | 9.34 | 7.37 | 4.86 |
| variable D | 43.42 | 45.26 | 47.86 |
| variable E | 240.88 | 292.74 | 378.87 |

Aspheric Surface Coefficient

TABLE 3

| | K | A4 | A6 | A8 | A10 | A12 |
|---|---|---|---|---|---|---|
| 4th surface | −0.6086 | −2.0495E−07 | 2.6808E−07 | −8.9454E−10 | 2.4766E−11 | |
| 5th surface | 0.0000 | 7.7240E−05 | 9.9601E−08 | 2.4227E−09 | 1.1000E−11 | |
| 24th surface | 2.5635 | 2.1612E−05 | −8.0809E−09 | −2.3562E−12 | 2.4255E−14 | |
| 25th surface | −89.5733 | −3.7358E−05 | 5.4039E−08 | −8.4950E−11 | 6.3554E−14 | |
| 26th surface | 0.0000 | −3.0637E−05 | 5.4069E−08 | −7.1309E−11 | −1.9333E−14 | 1.6204E−16 |
| 27th surface | 21.8336 | −4.2214E−05 | −1.1300E−08 | 7.8769E−11 | −2.3214E−13 | 2.9588E−16 |
| 28th surface | −99.0000 | −7.5596E−06 | −3.4189E−08 | 6.3468E−11 | −9.6075E−14 | |
| 29th surface | 2.4863 | −2.6426E−06 | 3.1525E−08 | −4.7602E−11 | −1.0050E−14 | |

Free Curved Surface Coefficient

TABLE 4

| K | 0 |
|---|---|
| C4 | 1.2660E−02 |
| C6 | 9.5211E−03 |
| C8 | 1.7134E−05 |
| C10 | −1.2972E−04 |

TABLE 4-continued

| K | 0 |
|---|---|
| C11 | −1.3398E−06 |
| C13 | 1.8186E−06 |
| C15 | −2.0112E−06 |
| C17 | −2.9636E−08 |
| C19 | 1.0972E−07 |
| C21 | 1.3390E−08 |
| C22 | 5.2749E−10 |
| C24 | −8.1285E−10 |
| C26 | 1.5367E−09 |
| C28 | 5.5051E−10 |
| C30 | 1.0513E−11 |
| C32 | −3.3882E−11 |
| C34 | −1.4158E−11 |
| C36 | 5.0848E−15 |
| C37 | −1.1671E−13 |
| C39 | 1.8650E−13 |
| C41 | −2.4957E−13 |
| C43 | −2.7201E−13 |
| C45 | −5.2890E−14 |
| C47 | −1.1336E−15 |
| C49 | 6.6744E−15 |
| C51 | 7.4842E−15 |
| C53 | 2.6273E−15 |
| C55 | 2.0300E−16 |
| C56 | 1.2438E−17 |
| C58 | 9.8405E−18 |
| C60 | 8.4606E−17 |
| C62 | 1.0066E−16 |
| C64 | 4.5295E−17 |
| C66 | 6.0515E−18 |

DMD Size
Dot size: 10.8 μm
Lateral length: 13.824 mm
Vertical length: 8.64 mm
From optical axis to center of device: 5.63 mm The following table 5 shows the position coordinates of the reflecting plane mirror 5 and the free curved surface concave surface mirror 6 from a vertex in the focusing state in which a projection image by a lens nearest to the reflecting surface is maximum. The rotation is indicated with an angle between a surface normal and the optical axis.

TABLE 5

| | Y axis | Z axis | α |
|---|---|---|---|
| 30th surface | 0.00 | 47.86 | −45.00 |
| 31st surface | 68.57 | 53.26 | −95.52 |

Figure 12:
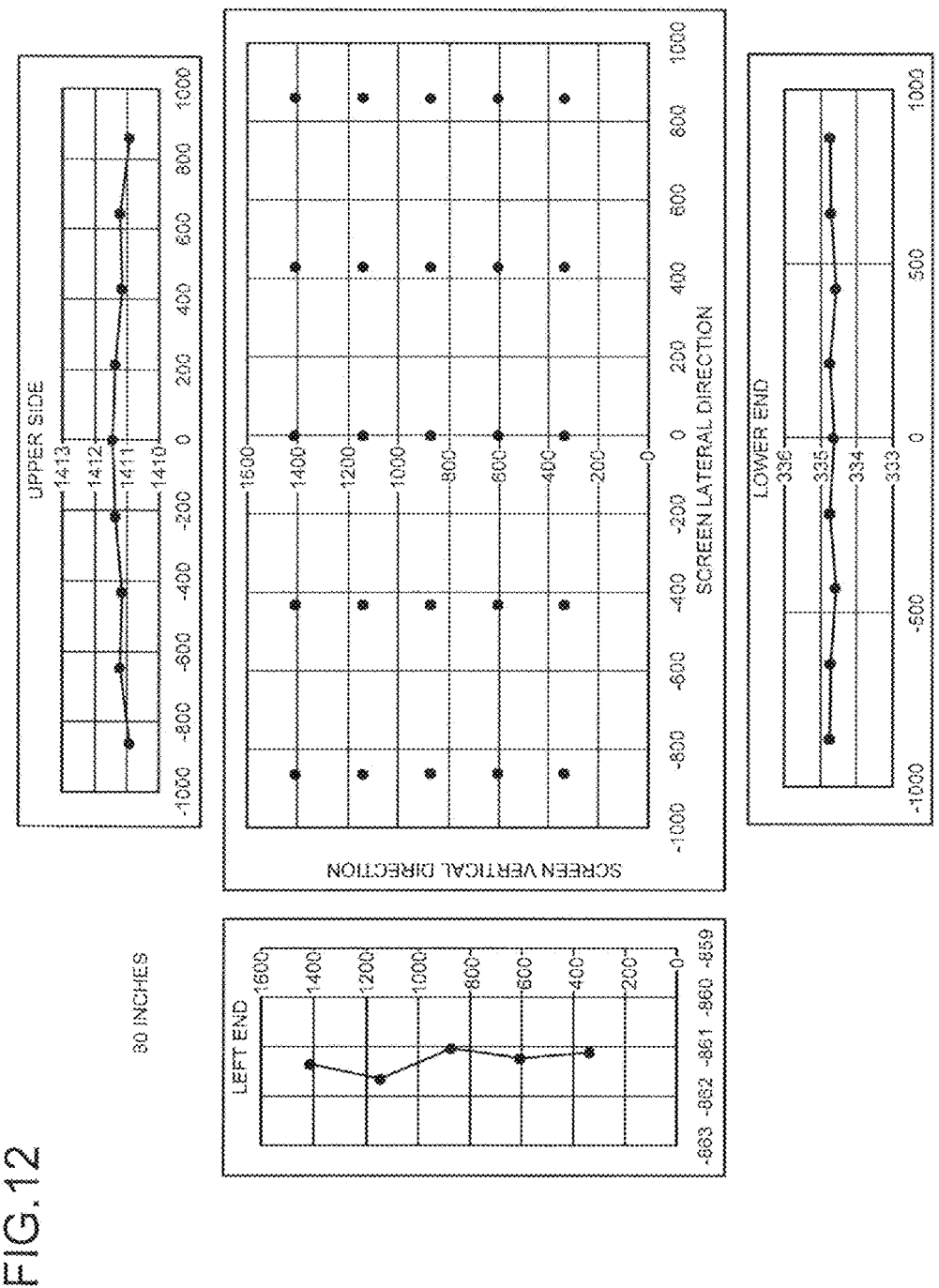
FIG. 12 is a diagram illustrating spotted positions of respective angles of view on a screen with a long projection distance (80 inches) of the projector apparatus according to the first embodiment.
Figure 13:
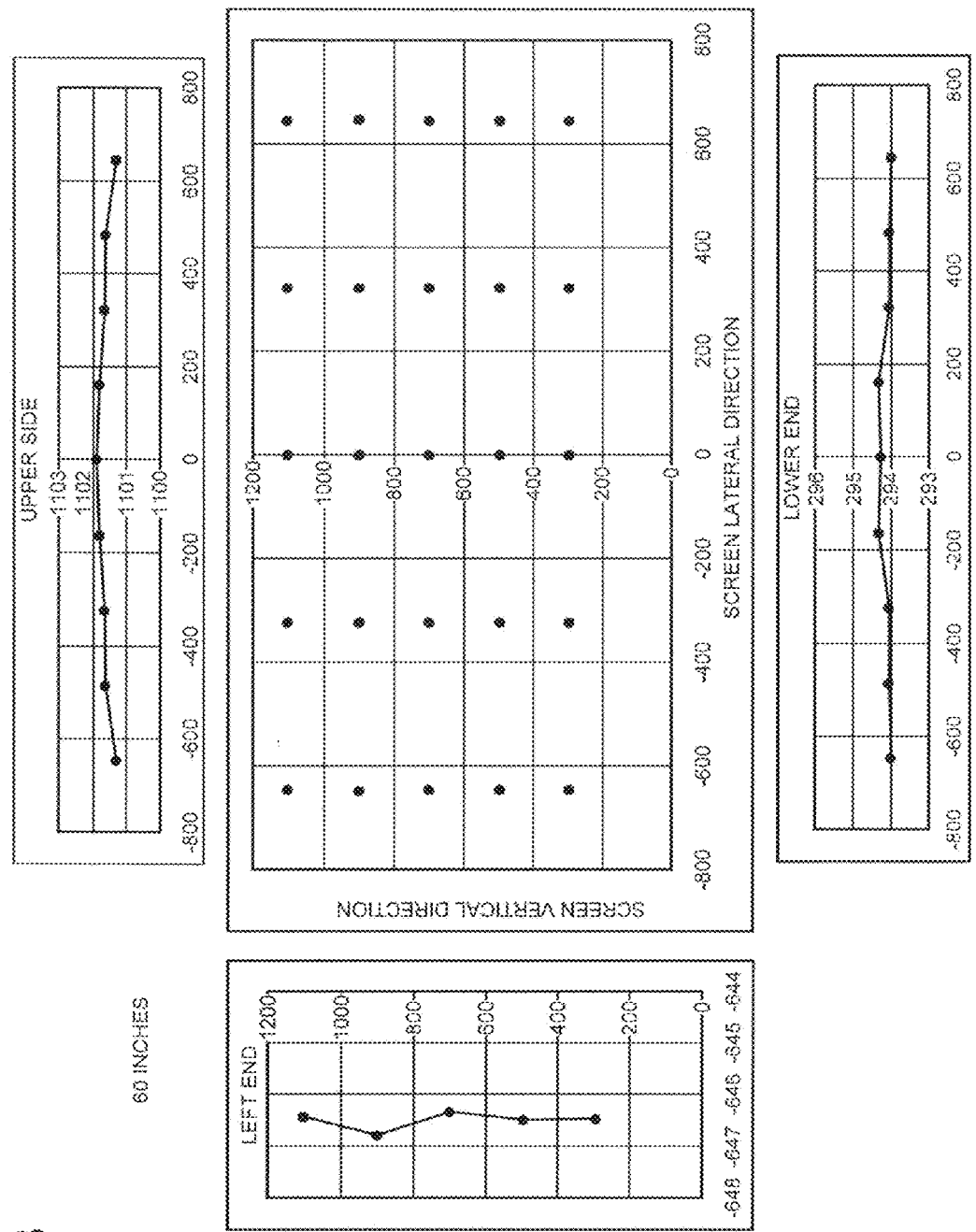
FIG. 13 is a diagram illustrating spotted positions of respective angles of view on a screen with a medium projection distance (60 inches) of the projector apparatus according to the first embodiment.
Figure 14:
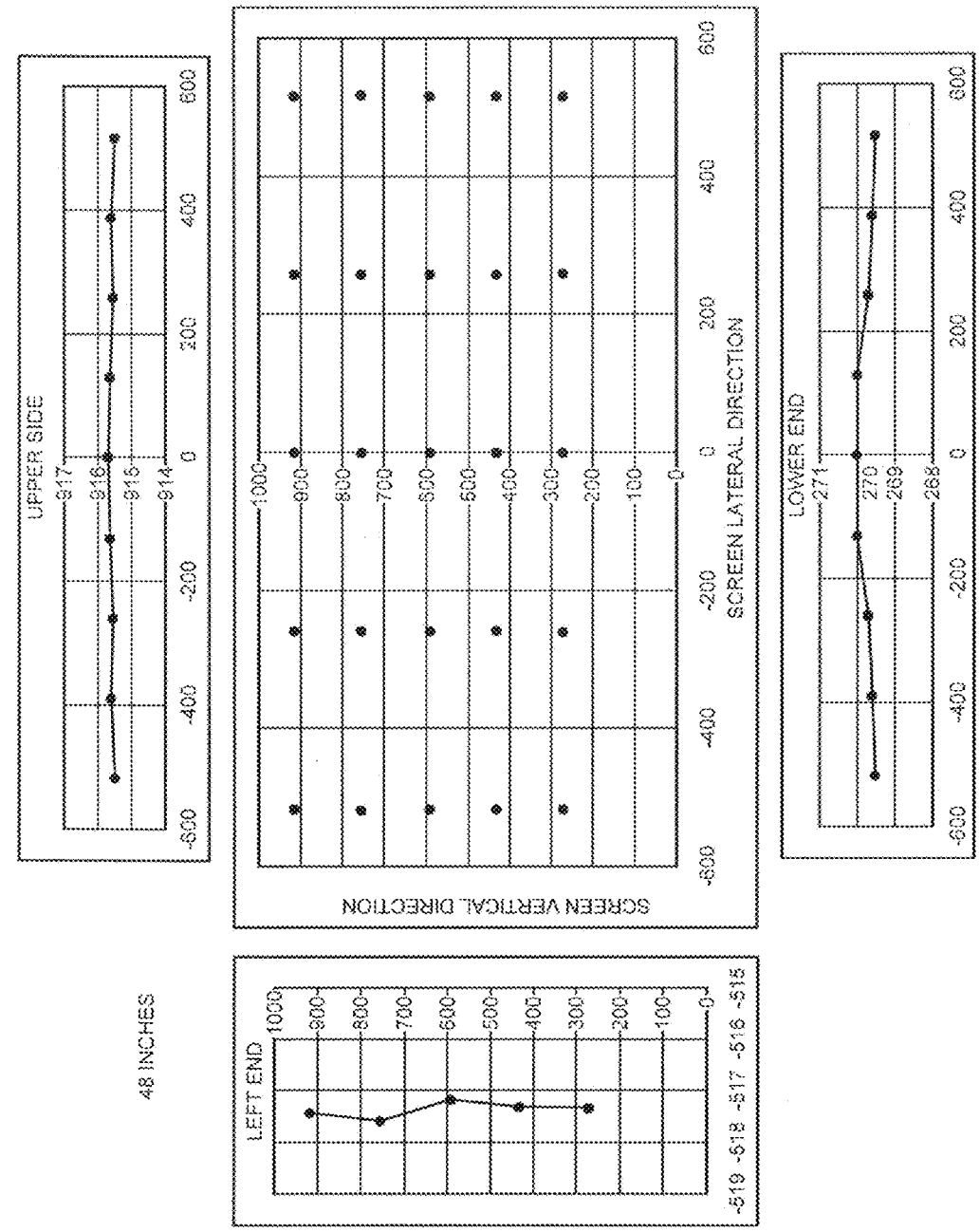
FIG. 14 is a diagram illustrating spotted positions of respective angles of view on a screen with a short projection distance (48 inches) of the projector apparatus according to the first embodiment.
Figure 15:
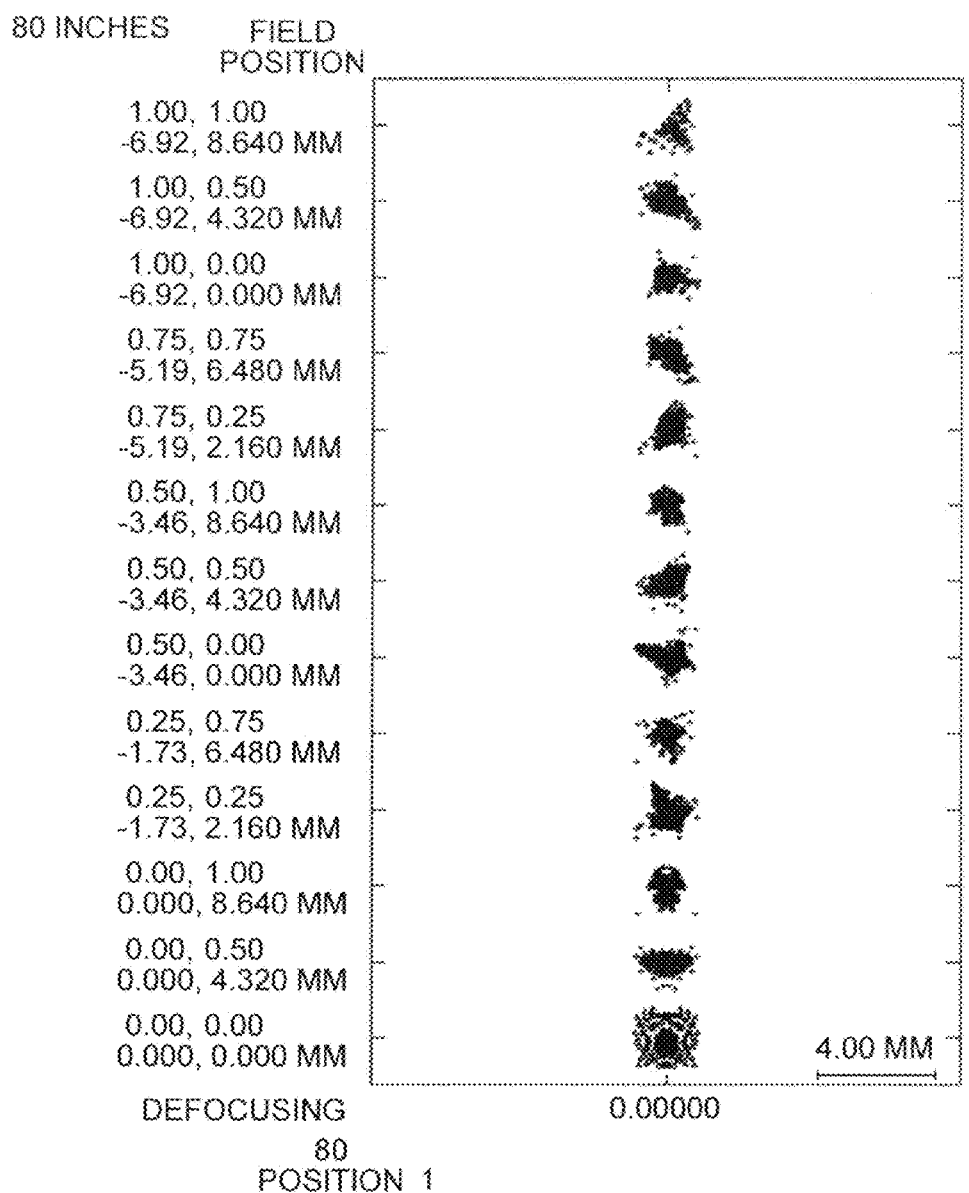
FIG. 15 is a spot diagram illustrating imaging characteristics (mm) on a screen surface regarding a wavelength of 625 nm (red), a wavelength of 550 nm (green), and a wavelength of 425 nm (blue) with a long projection distance (80 inches) of the projector apparatus according to the first embodiment.
Figure 16:
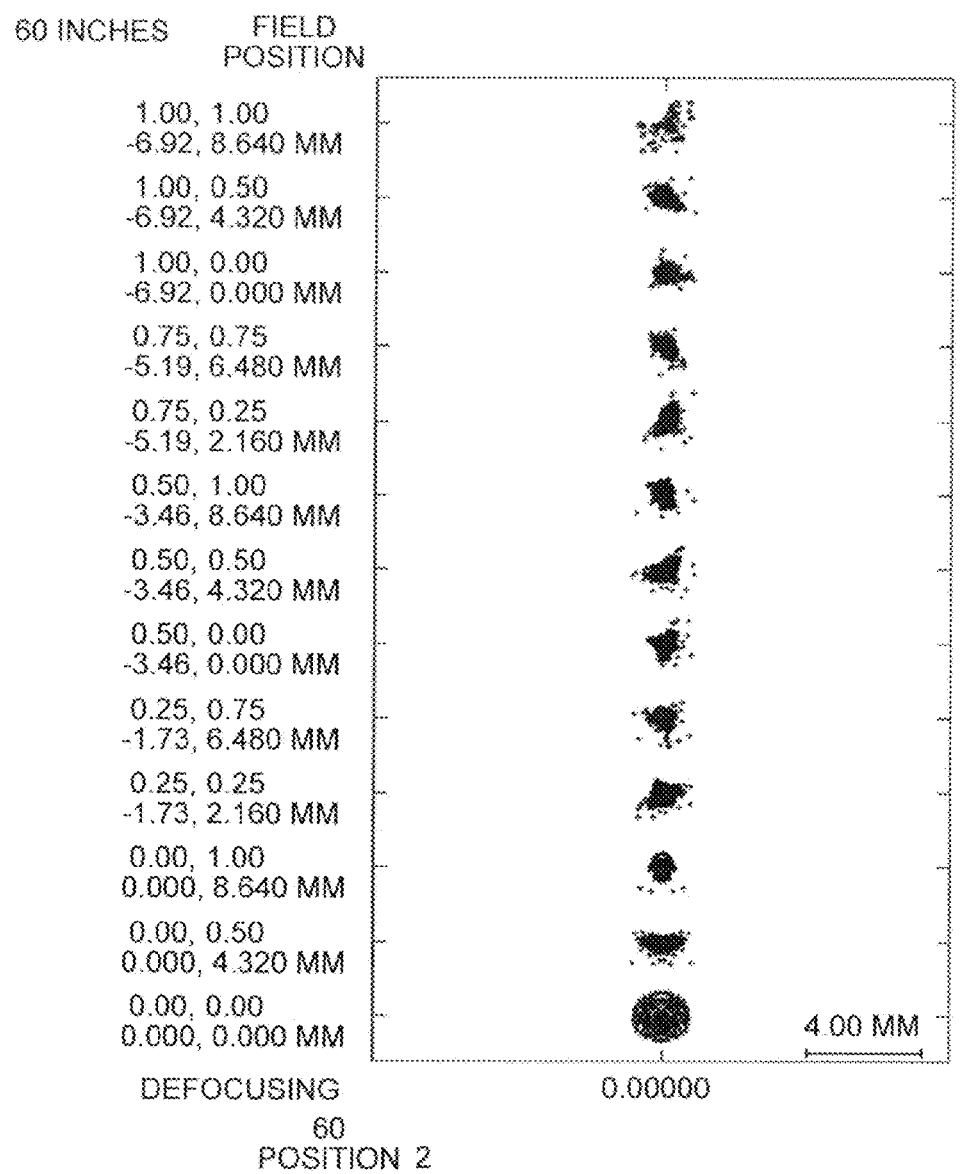
FIG. 16 is a spot diagram illustrating imaging characteristics (mm) on a screen surface regarding a wavelength of 625 nm (red), a wavelength of 550 nm (green), and a wavelength of 425 nm (blue) with a medium projection distance (60 inches) of the projector apparatus according to the first embodiment.
Figure 17:
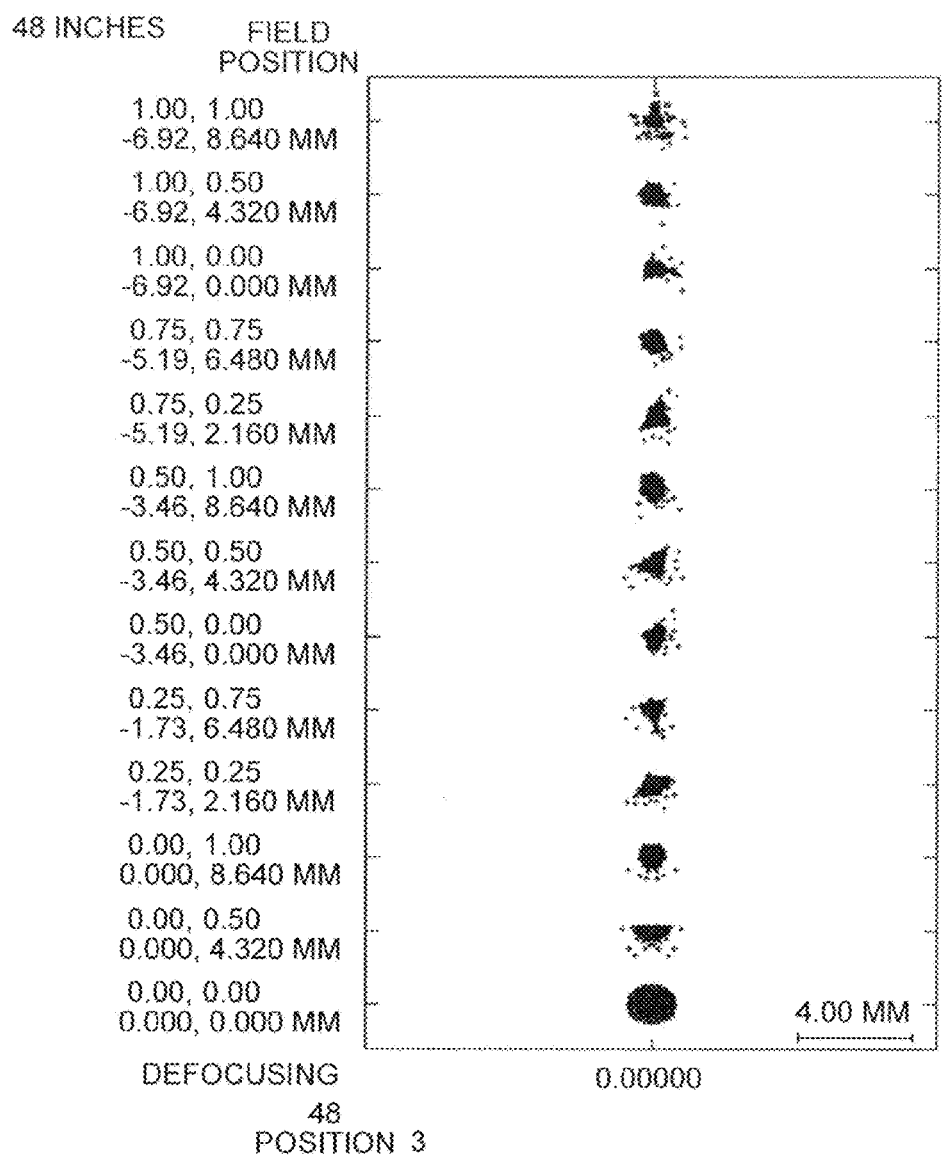
FIG. 17 is a spot diagram illustrating imaging characteristics (mm) on a screen surface regarding a wavelength of 625 nm (red), a wavelength of 550 nm (green), and a wavelength of 425 nm (blue) with a short projection distance (48 inches) of the projector apparatus according to the first embodiment.

FIG. 12 illustrates spot positions (wavelength: 550 nm) of respective angles of view on a screen with a long projection distance (80 inches). FIG. 13 illustrates spot positions (wavelength: 550 nm) of respective angles of view on a screen with a medium projection distance (60 inches). FIG. 14 illustrates spot positions (wavelength: 550 nm) of respective angles of view on a screen with a short projection distance (48 inches). According to FIGS. 12 to 14, the refractive optical system 4 provided in the projector apparatus of the first embodiment can project a projection image having small distortion, regarding each zoom and each projection distance. FIGS. 15 to 17 illustrate spot diagrams. In the spot diagrams of FIGS. 15 to 17, the image forming characteristics (mm) on the screen surface are illustrated with respect to a wavelength of 625 nm (red), a wavelength of 550 nm (green), and a wavelength of 425 nm (blue). The field position of each spot is indicated by coordinates (x, y) on the image forming unit 2.

Figure 18:
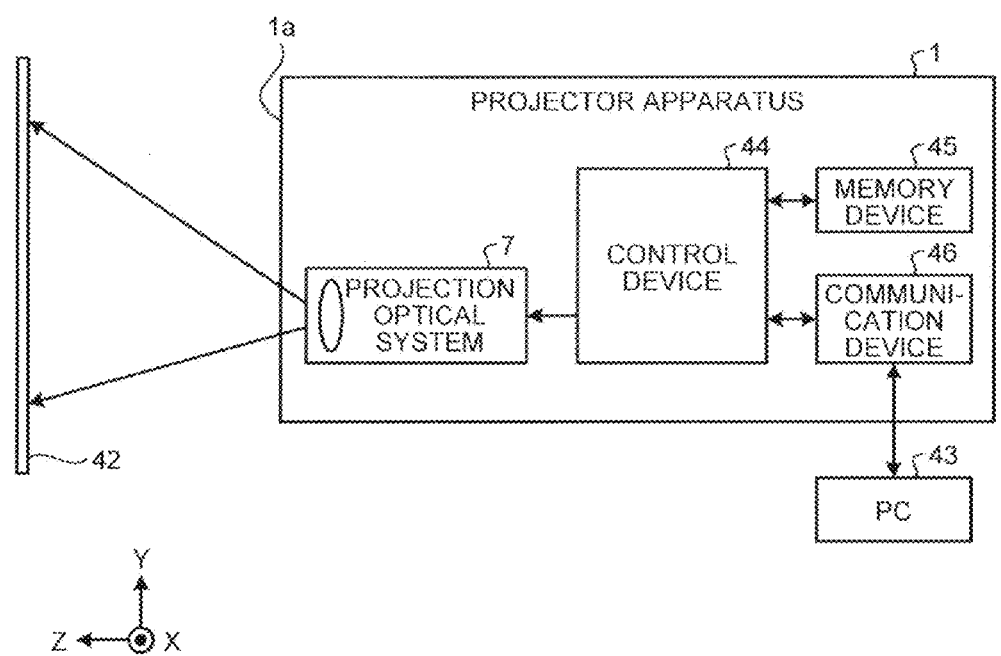
FIG. 18 is a block diagram of the projector apparatus according to the first embodiment.

FIG. 18 illustrates a block diagram of the projector apparatus of the first embodiment. The projector apparatus of the first embodiment is arranged so that the front face (front) 1a of the housing 1 faces a screen (projection surface) 42. The projector apparatus is connected to an external information processing apparatus such as a personal computer (PC) apparatus 43 through a conventional cable such as a dedicated cable and a universal serial bus (USB) cable so as to communicate each other. The projector apparatus may be connected to the PC apparatus 43 through wireless communication in accordance with a known wireless communication protocol to communicate each other. The projector apparatus is provided with the above-described projection optical system 7, a control device 44, a memory device 45, and a communication device 46. The projector apparatus is constituted with an image processing unit, a power unit, a cooling fan, etc. (not illustrated) that are stored in the housing 1 together with the projection optical system 7 described above.

The projection optical system 7 projects a projection image on the screen 42 under control of the control device 44. The projection image projected on the screen 42 with the projection optical system 7 is an image transmitted from the PC apparatus 43 to the projector apparatus, for example. That is, in such a case as an example, an image displayed on a display of the PC apparatus 43 is projected as a projection image on the screen 42 with the projection optical system 7.

The above description can be summarized as follows. In the projector apparatus of the first embodiment, the "Did" is a maximum paraxial image height of the intermediate image in the focusing state in which a projection image is maximum. In the projector apparatus, the "D" is a maximum value of a distance between an optical axis and an intersection of a paraxial image surface and a light beam passing the center of a stop of the refractive optical system 4. In the projector apparatus, the "F" is the focal length of the refractive optical system 4 in the focusing state in which a projection image is maximum. In the projector apparatus, the projection optical system 7 is designed so as to satisfy the conditional expressions of "0.6<D/Did<0.8 (Conditional Expression 1)" and "2.5<Did/F<5 (Conditional Expression 2)". Conditional Expression 1 and Conditional Expression 2 are expressions defining appropriate ranges of a distortion amount of an intermediate image and a size of the intermediate image, respectively. It is more preferable to design the projection optical system 7 so as to satisfy "0.65<D/Did<0.80 (Conditional Expression 3)" and "3<Did/F<4.5 (Conditional Expression 4)".

For downsizing the projection optical system using a mirror, it is particularly important to reduce space between a refractive optical system and a concave surface mirror (see FIG. 1). Thus, it can be considered that a distance between the refractive optical system and the concave surface mirror is shortened or that the size of the concave surface mirror itself is reduced. In general, the projection optical system that forms an intermediate image using a refractive optical system has a restriction of forming an intermediate image in front of the concave surface mirror. Therefore, it is required to shorten the conjugate length of the image forming unit and the intermediate image to reduce the total length. The conjugate length can be reduced by shortening the focal length of the refractive optical system. However, when the focal length is shortened, an angle of emergence to the concave surface mirror becomes wider, and the size of the concave surface mirror is increased, thus causing inconvenience of increasing the size of the projector apparatus.

Particularly in the projection optical system, a retro-focus type is usually adopted to secure back focus considering the balance with a lighting system. In this case, an intermediate image is distorted in a pincushion form, thus increasing the size of the concave surface mirror. When an angle of emergence to the concave surface mirror is made smaller to reduce the size of the concave surface mirror, the focal length of the refractive optical system becomes smaller unless the distortion aberration of the intermediate image is controlled appropriately. Then, the conjugate length of the image forming unit and the intermediate image becomes longer, thus increasing the size of the projector apparatus. That is, in order to reduce the size of the concave surface mirror while shortening the total length of the system, it is important to control appropriately the distortion aberration of the intermediate image and the size of the intermediate image itself.

There exists optimum relation between a focal distance of the refractive optical system and an aberration amount of the intermediate image to achieve the reduction of the image forming unit and the intermediate image and the reduction of the size of the concave surface mirror at the same time. When the distortion amount of the intermediate image exceeds the upper limit of Expression 1, the size of the concave surface mirror is increased, and as a result, the size of the projector apparatus is increased. When the distortion amount of the intermediate image is smaller than the lower limit of Expression 1, a load on the mirror is increased, thus causing the increase of sensitivity to manufacturing errors and the insufficiency of distortion correction on the screen. When the size of the intermediate image exceeds the upper limit of Expression 2, the intermediate image becomes larger and a load on the concave surface mirror is decreased, which advantageously decreases sensitivity to manufacturing errors. However, the size of the concave surface mirror is increased, and as a result, the size of the projector apparatus is increased. When the size of the intermediate image is smaller than the lower limit of Expression 2, the intermediate image becomes smaller and thus the size of the concave surface mirror is reduced, which advantageously downsizes the projector apparatus. However, a load on the concave surface mirror is increased in this case, causing inconvenience of increasing sensitivity to manufacturing errors.

For these reasons, in the projector apparatus of the first embodiment, the projection optical system 7 is designed so that Conditional Expressions 1 and 2 are satisfied. In this manner, it is possible to compress the intermediate image and reduce the size thereof, thereby reducing the concave surface mirror 6 in size. Then, the reduction of the size of the concave surface mirror 6 enables downsizing of the projector apparatus.

In the projector apparatus of the first embodiment, with a paraxial lateral magnification $\beta$ of the refractive optical system 4 when a projection image is maximum, the projector apparatus is designed so that the conditional expression of "5<$\beta$<8 (Conditional Expression 5)" is satisfied. It is more preferable to design the projector apparatus so that the conditional expression of "6<β<7 (Conditional Expression 6)" is satisfied. Conditional expressions 5 and 6 are expressions defining an appropriate range of the height of the intermediate image. When a value of the paraxial lateral magnification β of the refractive optical system 4 when a projection image is maximum exceeds the upper limit of Conditional Expression 5 (or Conditional Expression 6), it is possible to reduce power of the concave surface mirror and thus decrease sensitivity to manufacturing errors. However, the mirror size of the concave surface mirror is increased, thereby causing inconvenience of increasing the size of the projector apparatus. When a value of the paraxial lateral magnification β of the refractive optical system 4 when a projection image is maximum is smaller than the lower limit of Conditional Expression 5 (or Conditional Expression 6), the projector apparatus can be downsized advantageously. However, it is necessary to increase power of the concave surface mirror to obtain a projection image having a desired size, thereby causing inconvenience of increasing sensitivity to manufacturing errors.

Therefore, in the projector apparatus of the first embodiment, the projection optical system 7 is designed so that a value of the paraxial lateral magnification β of the refractive optical system 4 when a projection image is maximum is a value defined by Conditional Expression 5 (or Conditional Expression 6). In this manner, it is possible to set an appropriate height of the intermediate image and reduce the size of the concave surface mirror 6, thus downsizing the projector apparatus.

In the projector apparatus of the first embodiment, with a maximum value Y of the distance between the optical axis and the end of the image forming unit 2, the projector apparatus is designed so that the conditional expression of "0.4<Y/F<0.7 (Conditional Expression 7)" is satisfied. It is more preferable to design the projector apparatus so that the conditional expression of "0.45<Y/F<0.65 (Conditional Expression 8)" is satisfied. Conditional expressions 7 and 8 are expressions indicating an appropriate range of the focal length of the refractive optical system 4. When the focal length of the refractive optical system 4 is smaller than the lower limit of Conditional Expression 7 (or Conditional Expression 8), the angle of a light beam incident to the concave surface mirror 6 becomes smaller, which advantageously reduces the size of the concave surface mirror 6. However, the conjugate length becomes longer, which is not preferable because the housing 1 needs to be enlarged in a total length direction. When the focal length of the refractive optical system 4 exceeds the upper limit of Conditional Expression 7 (or Conditional Expression 8), the conjugate length can be smaller and there is no need to enlarge the housing 1 in a total length direction. However, in this case, the angle of the light beam incident to the concave surface mirror 6 becomes wider, which increases the size of the concave surface mirror 6, thus causing inconvenience of increasing the size of the projector apparatus.

For these reasons, in the projector apparatus of the first embodiment, the projection optical system 7 is designed so that the focal length of the refractive optical system 4 is a value defined by Conditional Expression 7 (or Conditional Expression 8). In this manner, it is possible to set an appropriate focal length of the refractive optical system 4 and thus downsize the projector apparatus.

In the projector apparatus of the first embodiment, the aperture stop 8 is fixed relative to the image forming unit 2 in the focusing state. This can reduce the variation of a distortion amount of the intermediate image by focusing, thus decreasing variation of distortion of an enlarged image on the screen.

In the projector apparatus of the first embodiment, the projector apparatus is designed so that the concave surface mirror 6 as an example of a reflecting surface is arranged on the most magnification side. The projection optical system 7 is configured so that an intermediate image formed with the refractive optical system 4 is enlarged and projected using the concave surface mirror 6. This configuration can reduce the size of the concave surface mirror 6 and thus downsize the projector apparatus.

In the projector apparatus of the first embodiment, the concave surface mirror 6 has a free curved surface form. Thus, barrel form distortion occurring on the intermediate image can be sufficiently corrected with the free curved surface of the concave surface mirror 6. Therefore, it is possible to obtain a high-quality projection image having no distortion.

In the projector apparatus of the first embodiment, at least one lens, among a plurality of lenses constituting the refractive optical system 4, is an aspheric surface lens. When a common projection optical system is used, an intermediate image tends to have a pincushion form. However, with the use of the aspheric surface lens, the excessive correction of the aspheric surface lens can cause barrel form distortion on the intermediate image. Thus, the intermediate image can be reduced in size, and the reduction of the size of the intermediate image enables downsizing of the projector apparatus.

In the projector apparatus of the first embodiment, the reflecting plane mirror 5 is provided between the refractive optical system 4 and the concave surface mirror 6 as an example of a reflecting surface. Thus, the space between the refractive optical system 4 and the concave surface mirror 6 is reduced.

It is difficult to reduce space between the refractive optical system 4 and the concave surface mirror 6 by only providing the reflecting plane mirror 5. Thus, in the projector apparatus of the first embodiment, the reflecting plane mirror 5 is provided while the conditions defined by Conditional Expressions 1 to 8 mentioned above are satisfied. As described with reference to FIGS. 1 to 3, in order to downsize the projection optical system provided with a reflecting plane mirror between the refractive optical system and the concave surface mirror, it is important to reduce a distance between an end of the reflecting mirror and an end of the concave surface mirror. However, when the focal length of the refractive optical system is reduced to simply reduce a conjugate length, an angle of emergence from the refractive optical system to the concave surface mirror becomes wider, and the size of the reflecting mirror is increased. Moreover, the interference between the refractive optical system and the light beam cannot be avoided and, consequently, it is necessary to enlarge the projector apparatus (housing 1) in a total length direction.

When the projector apparatus is designed so as to include the reflecting plane mirror 5 and satisfy the conditions defined by Conditional Expressions 1 to 8, however, it is possible to reduce a conjugate length that is equivalent to a distance between the reflecting plane mirror 5 and the concave surface mirror 6 and reduce an angle of emergence of a light beam from the lens of the refractive optical system 4 to the reflecting plane mirror 5. Therefore, it is possible to reduce space between the refractive optical system 4 and the concave surface mirror 6 while preventing interference between the refractive optical system 4 and the light beam and thus downsize the projector apparatus.

In this manner, according to the projector apparatus of the first embodiment, it is possible to provide a small-sized high-performance projector apparatus with an ultra-short projection distance.

Second Embodiment

Next, a projector apparatus of the second embodiment will be described. The projector apparatus of the second embodiment is different from the projector apparatus of the first embodiment only in the configuration of the refractive optical system. Thus, in the drawings used for the explanation of the projector apparatus of the second embodiment, the portions indicating the same operations or functions as in the projector apparatus of the first embodiment described above are represented with the same symbols as in the projector apparatus of the first embodiment, and the detailed description thereof is omitted. The following explanation of the second embodiment will mainly focus on the refractive optical system different from that in the first embodiment.

Figure 19:
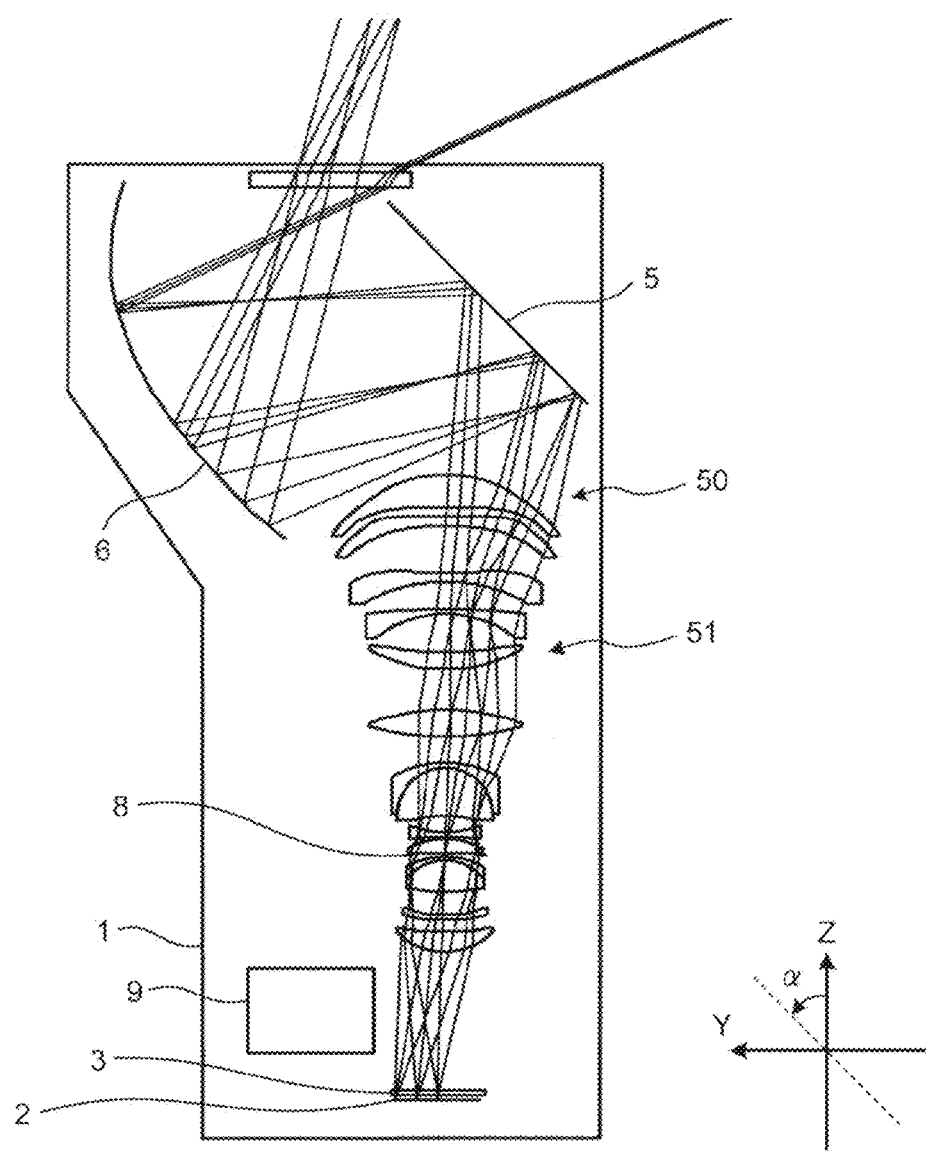
FIG. 19 is a cross section of a projector apparatus according to a second embodiment of the present invention.
Figure 20:
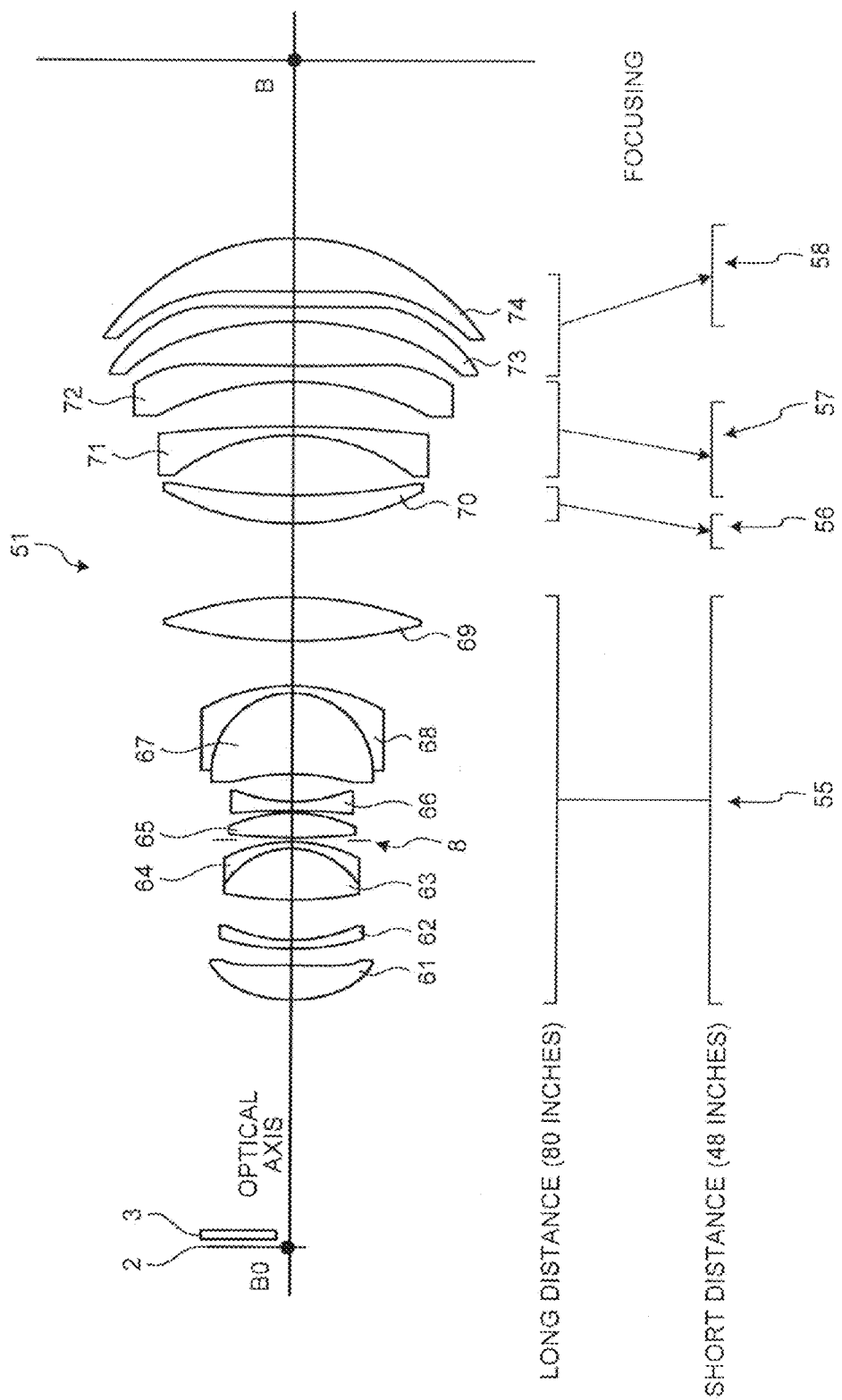
FIG. 20 is a diagram illustrating a lens configuration of a refractive optical system provided in the projector apparatus according to the second embodiment.

FIG. 19 is a cross section of the projector apparatus of the second embodiment. The paths indicated by continuous lines in FIG. 19 illustrate paths of the movement by focusing. FIG. 20 illustrates a refractive optical system 51 provided in a projection optical system 50 of the projector apparatus of the second embodiment. In FIGS. 19 and 20, a light flux subjected to two-dimensional intensity modulation with the image forming unit 2 such as a DMD based on image information becomes a projection light flux as an object light. The projection light flux from the image forming unit 2 becomes an image-forming light flux through the refractive optical system 51 including at least one aspheric surface lens, the reflecting plane mirror 5, and the concave surface mirror 6. That is, an image formed on the image forming unit 2 such as a DMD is enlarged and projected with the projection optical system 50 on the screen as a projection image. The number of mirrors can be increased to provide power to the reflecting plane mirror 5.

The light passing through the refractive optical system 51 forms an intermediate image which is a space image conjugate to the image information formed with the image forming unit 2 on a near side to the image forming unit 2 relative to the concave surface mirror 6. The intermediate image is not necessarily formed as a flat image. In the second embodiment, and the third and fourth embodiments described later, the intermediate image is formed as a curved image. The intermediate image is enlarged and projected on the screen through the free curved surface concave surface mirror 6 arranged on the most magnification side. The image surface curvature and distortion occurring on the intermediate image is corrected with the free curved surface of the concave surface mirror 6. The free curved surface of the concave surface mirror 6 corrects image surface curvature and distortion occurring on the intermediate image. Thus, the degree of freedom of the design of the refractive optical system 51 and the projection optical system 50 can be increased, which remarkably contributes to the downsizing of the projector apparatus, for example.

Figure 21:
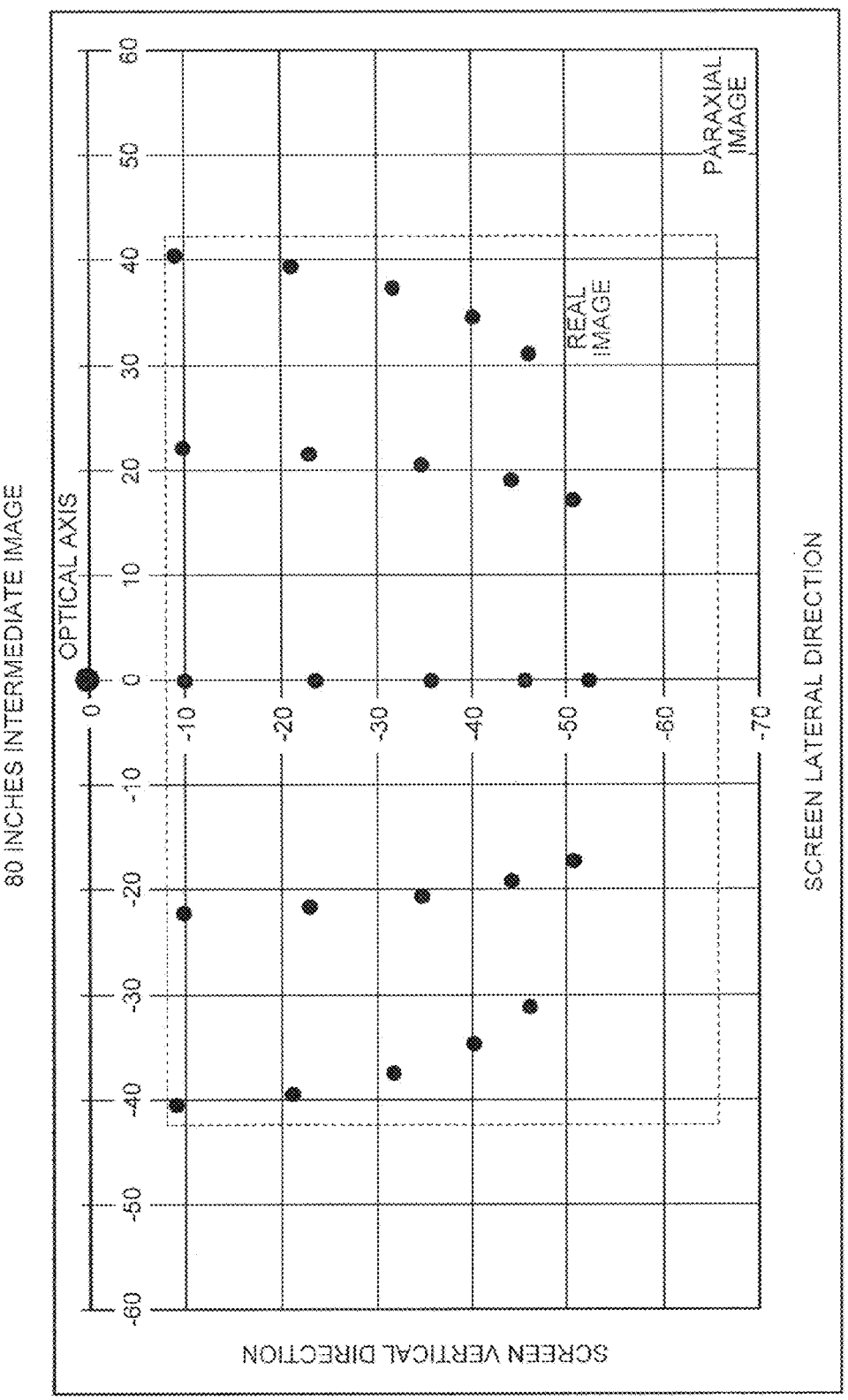
FIG. 21 is a diagram illustrating plotted intersections of a paraxial image plane and a main light beam with a long distance (80 inches) of the projector apparatus according to the second embodiment.
Figure 22:
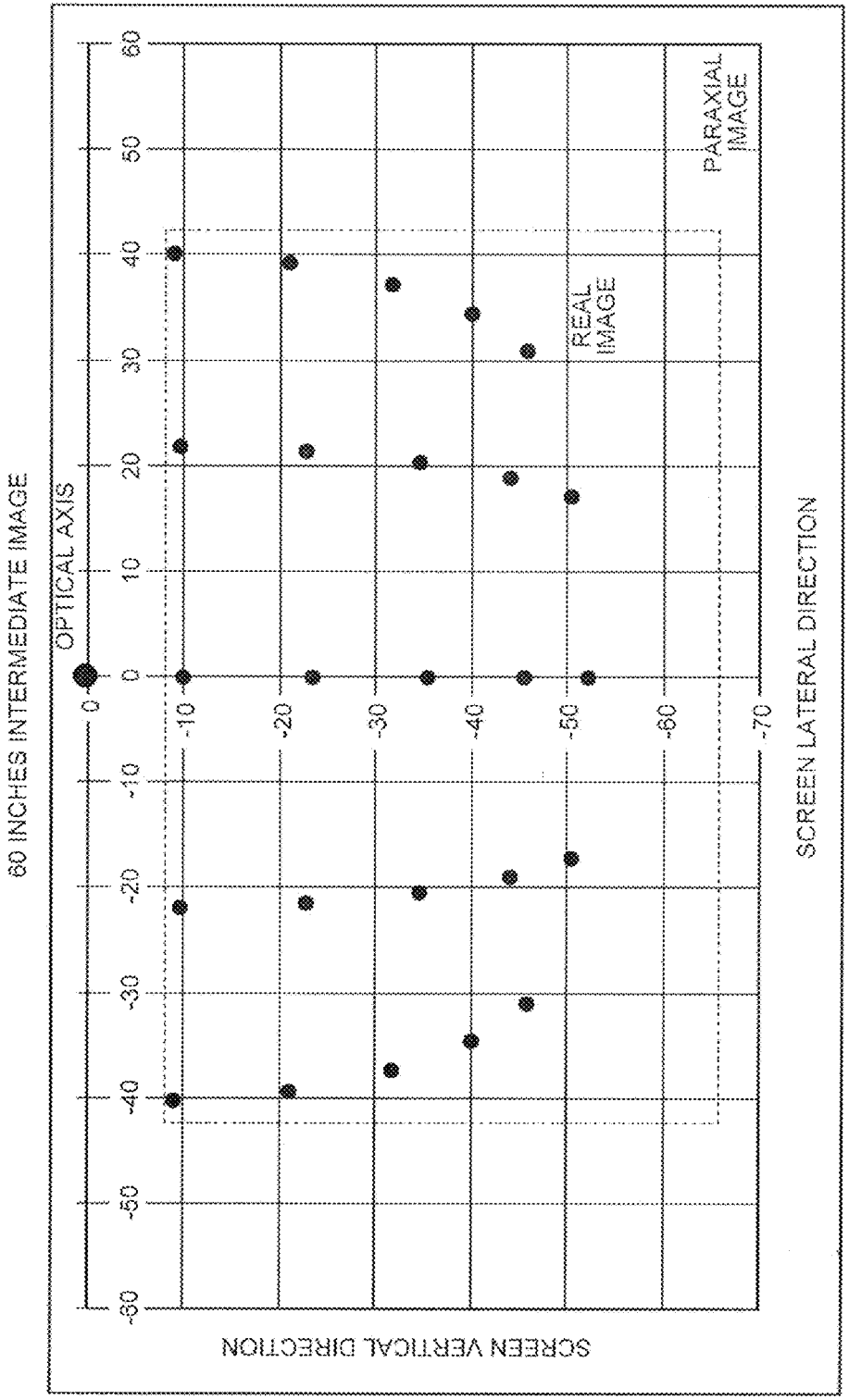
FIG. 22 is a diagram illustrating plotted intersections of a paraxial image plane and a main light beam with a medium distance (60 inches) of the projector apparatus according to the second embodiment.
Figure 23:
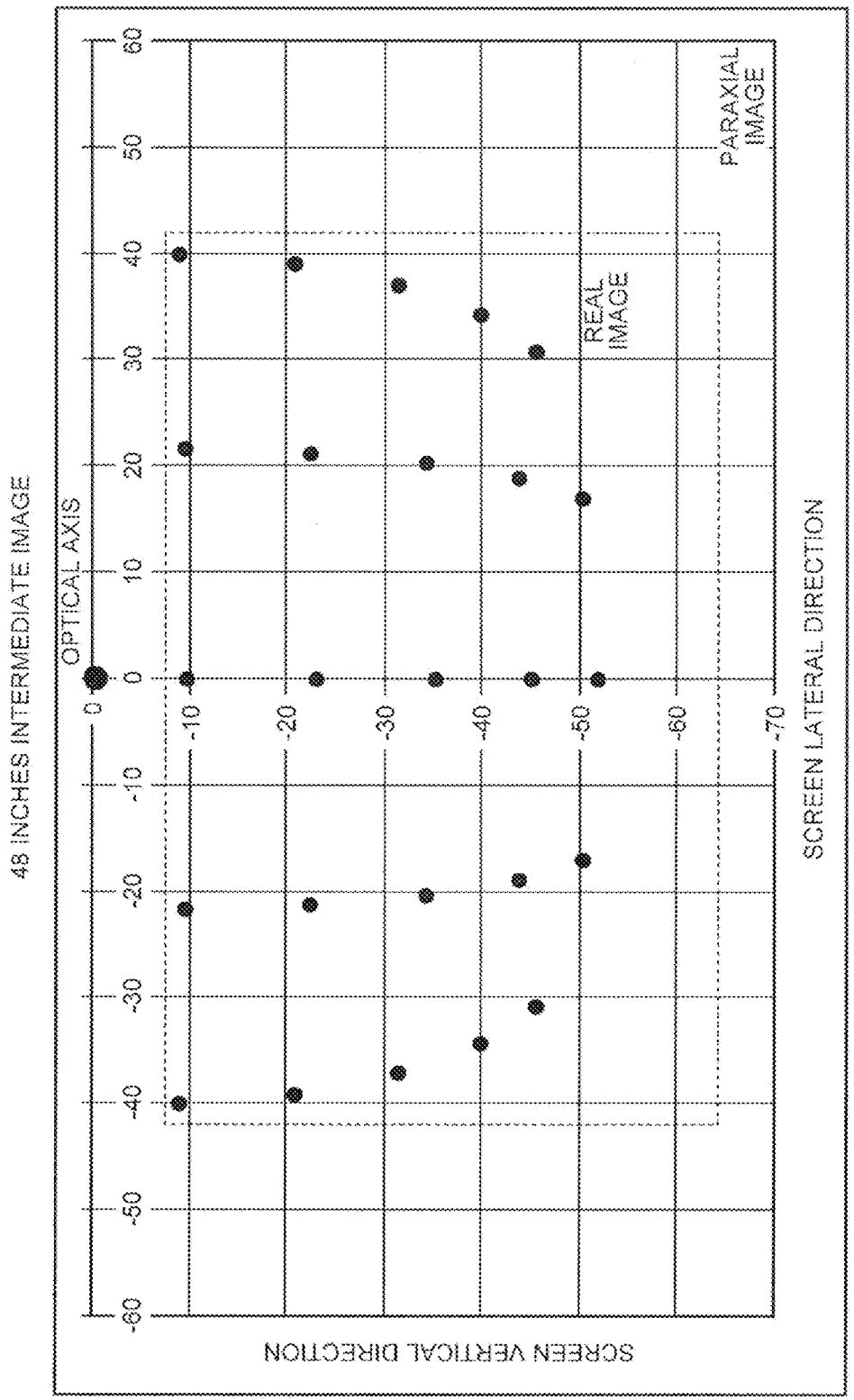
FIG. 23 is a diagram illustrating plotted intersections of a paraxial image plane and a main light beam with a short distance (48 inches) of the projector apparatus according to the second embodiment.

FIGS. 21, 22, and 23 are diagrams illustrating plotted intersections of the main light beam and the paraxial image plane regarding a long distance (80 inches), a medium distance (60 inches), and a short distance (48 inches), respectively. In FIGS. 21 to 23, black points indicate coordinates of intersections of the main light beam and the paraxial image plane with several angles of view, and a dotted line indicates the paraxial image. According to FIGS. 21 to 23, the barrel form distortion occurs in each screen size. This indicates that the intermediate image is compressed and reduced in size. In the projector apparatus of the second embodiment, the size of the intermediate image can be reduced in this manner. Thus, the size of the free curved surface concave surface mirror 6 can be reduced, which downsizes the projector apparatus and reduces costs of the projector apparatus.

In the projector apparatus of the second embodiment, in the focusing from a long distance side to a short distance side, a first lens group 55 of the refractive optical system 51 illustrated in FIG. 20, the reflecting plane mirror 5, and the free curved surface concave surface mirror 6 are fixed relative to the image forming surface. A second lens group 56 and a third lens group 57 are moved toward the image forming unit 2. A fourth lens group 58 is moved to the magnification side. That is, in the projector apparatus of the second embodiment, a process called a floating focus is performed in the focusing from a long distance side to a short distance side. Therefore, the projector apparatus of the second embodiment can highly control image surface curvature and distortion aberration. In the projector apparatus of the second embodiment, the aspheric surface lenses are used in the lens groups moving in the above manner, and the excessive correction of the aspheric surface lenses causes barrel form distortion on the intermediate image. The entire configuration and operation of the projector apparatus is as described above with reference to FIG. 18.

The refractive optical system 51 includes the first lens group 55 having positive refractive power and the second lens group 56 having positive refractive power in this order from the image forming unit 2 to the magnification side, as illustrated in FIG. 20. The refractive optical system 51 includes the third lens group 57 having negative refractive power with one aspheric surface lens and the fourth lens group 58 having positive refractive power with two aspheric surface lenses. The projection optical system 50 is constituted by such a refractive optical system 51, the reflecting plane mirror 5 illustrated in FIG. 19, and the free curved surface concave surface mirror 6 arranged at the most magnification side. In the focusing from a long distance side to a short distance side with the variation of the projection distance, the second lens group 56 and the third lens group 57 are moved toward the image forming unit 2, and the fourth lens group 58 is moved to the magnification side.

The first lens group 55 illustrated in FIG. 20 includes, in the order from the image forming unit 2, a both surface aspheric biconvex lens 61 with the stronger convex surface directed to the image forming unit 2 and a negative meniscus lens 62 with the convex surface directed to the image forming unit 2. Moreover, the first lens group 55 includes a biconvex lens 63 with the stronger convex surface directed to the magnification side, a cemented lens 64 of a negative meniscus lens with the convex surface directed to the magnification side, and a biconvex lens 65 with the stronger convex surface directed to the magnification side. Furthermore, the first lens group 55 includes a biconcave lens 66 with the stronger concave surface directed to the magnification side, a positive meniscus lens 67 with the convex surface directed to the magnification side, a cemented lens 68 of a negative meniscus lens with the convex surface directed to the magnification side, and a biconvex lens 69 with the stronger convex surface directed to the magnification side.

The second lens group 56 includes a positive meniscus lens 70 with the convex surface directed to the image forming unit 2. The third lens group 57 includes a negative meniscus lens 71 with the convex surface directed to the magnification side, and a both surface aspheric biconcave lens 72 with the stronger concave surface directed to the image forming unit 2. The fourth lens group 58 includes a both surface aspheric negative meniscus lens 73 with the convex surface directed to the magnification side and a both surface aspheric biconvex lens 74 with the stronger convex surface directed to the magnification side.

The following tables 6 to 10 show data of the refractive optical system 51 provided in the projector apparatus of the second embodiment. The "i" in the table 6 represents the i-th surface (prism surface, lens surface, stop surface, reflecting surface) when counted from the image forming unit 2.

Numerical aperture: 0.195

Focusing

TABLE 7

|  | short distance | standard | long distance |
| --- | --- | --- | --- |
| screen size | 48 inches | 60 inches | 80 inches |
| variable A | 8.31 | 8.64 | 8.83 |
| variable B | 7.71 | 7.49 | 7.34 |
| variable C | 9.56 | 7.57 | 5.45 |
| variable D | 43.42 | 45.30 | 47.38 |
| variable E | 239.64 | 291.73 | 378.48 |

Aspheric Surface Coefficient

TABLE 8

| | K | A4 | A6 | A8 | A10 | A12 | A14 | A16 | A18 | A20 |
| --- | --- | --- | --- | --- | --- | --- | --- | --- | --- | --- |
| 4th surface | 0.8790 | −8.147E−06 | 7.963E−07 | −2.359E−08 | 8.740E−10 | −1.631E−11 | 1.926E−13 | −1.267E−15 | 3.416E−18 | 4.068E−21 |
| 5th surface | 0.0000 | 1.154E−04 | 9.967E−07 | −1.776E−08 | 6.499E−10 | −7.829E−12 | 4.256E−14 | | | |
| 24th surface | −0.0404 | 2.788E−06 | −2.383E−07 | 3.201E−09 | −2.145E−11 | 1.055E−13 | −4.443E−16 | 1.378E−18 | −2.488E−21 | 1.875E−24 |
| 25th surface | −0.2134 | −7.826E−05 | 1.602E−07 | 2.303E−10 | −4.612E−12 | 2.533E−14 | −8.935E−17 | 2.026E−19 | −2.604E−22 | 1.399E−25 |
| 26th surface | 0.0000 | 1.274E−04 | −1.491E−06 | 8.274E−09 | −2.989E−11 | 8.213E−14 | −1.793E−16 | 2.831E−19 | −2.691E−22 | 1.110E−25 |
| 27th surface | 0.0000 | 9.022E−05 | −1.202E−06 | 7.918E−09 | −4.107E−11 | 1.534E−13 | −3.773E−16 | 5.706E−19 | −4.764E−22 | 1.665E−25 |
| 28th surface | 0.0000 | −5.948E−05 | −2.365E−08 | 4.093E−09 | −4.144E−11 | 2.085E−13 | −6.040E−16 | 1.018E−18 | −9.269E−22 | 3.522E−25 |
| 29th surface | −0.4278 | −2.395E−05 | −1.792E−07 | 2.959E−09 | −2.254E−11 | 1.064E−13 | −3.047E−16 | 5.085E−19 | −4.554E−22 | 1.690E−25 |

TABLE 6

Numerical aperture: 0.195

| i | R | D | Nd | Vd |
| --- | --- | --- | --- | --- |
| 1 | ∞ | 1.00 | | |
| 2 | ∞ | 1.00 | 1.51680 | 64.2000 |
| 3 | ∞ | 28.00 | | |
| 4* | 16.920 | 4.15 | 1.48749 | 70.4412 |
| 5* | −86.202 | 2.04 | | |
| 6 | 30.400 | 1.00 | 1.84666 | 23.7779 |
| 7 | 19.376 | 4.94 | | |
| 8 | 45.510 | 6.27 | 1.57099 | 50.7999 |
| 9 | −9.519 | 0.80 | 1.83400 | 37.1605 |
| 10 | −16.682 | 0.10 | | |
| Stop | ∞ | 0.3 | | |
| 11 | 71.073 | 3.07 | 1.48749 | 70.4412 |
| 12 | −17.224 | 0.30 | | |
| 13 | −76.088 | 1.08 | 1.83481 | 42.7253 |
| 14 | 19.237 | 3.32 | | |
| 15 | −24.803 | 9.78 | 1.51742 | 52.4309 |
| 16 | −9.691 | 0.90 | 1.81600 | 46.6206 |
| 17 | −21.668 | 5.46 | | |
| 18 | 65.620 | 5.30 | 1.67270 | 32.0992 |
| 19 | −44.454 | variable A | | |
| 20 | 32.573 | 3.38 | 1.60342 | 38.0273 |
| 21 | 72.964 | variable B | | |
| 22 | −23.546 | 1.00 | 1.90366 | 31.3150 |
| 23 | −139.608 | 5.49 | | |
| 24* | −34.063 | 1.80 | 1.53046 | 55.8000 |
| 25* | 49.884 | variable C | | |
| 26* | −35.541 | 1.80 | 1.53046 | 55.8000 |
| 27* | −154.897 | 1.77 | | |
| 28* | 312.746 | 6.61 | 1.53046 | 55.8000 |
| 29* | −32.153 | variable D | | |
| 30 | ∞ | −68.26 | reflecting surface | |
| 31* | ∞ | variable E | reflecting surface | |

Free Curved Surface Coefficient

TABLE 9

| K | 0 |
| --- | --- |
| C4 | 1.2974E−02 |
| C6 | 1.0016E−02 |
| C8 | −1.8057E−05 |
| C10 | −1.4660E−04 |
| C11 | −1.5530E−06 |
| C13 | 1.2966E−06 |
| C15 | −1.9642E−06 |
| C17 | −2.0682E−08 |
| C19 | 1.1516E−07 |
| C21 | 1.5877E−08 |
| C22 | 5.9787E−10 |
| C24 | −6.7728E−10 |
| C26 | 1.5581E−09 |
| C28 | 5.1414E−10 |
| C30 | 9.4263E−12 |
| C32 | −3.7110E−11 |
| C34 | −1.4921E−11 |
| C36 | −1.1494E−13 |
| C37 | −1.3005E−13 |
| C39 | 1.9814E−13 |
| C41 | −2.6621E−13 |
| C43 | −2.5121E−13 |
| C45 | −4.3397E−14 |
| C47 | −1.0627E−15 |
| C49 | 7.6546E−15 |
| C51 | 7.5943E−15 |
| C53 | 2.3787E−15 |
| C55 | 8.5541E−17 |
| C56 | 1.3608E−17 |
| C58 | 9.9039E−18 |
| C60 | 9.1950E−17 |

TABLE 9-continued

| K | 0 |
|---|---|
| C62 | 1.0020E−16 |
| C64 | 4.0743E−17 |
| C66 | 4.5165E−18 |

DMD Size
Dot size: 10.8 μm
Lateral length: 13.824 mm
Vertical length: 8.64 mm
From optical axis to center of device: 5.63 mm The following table 10 shows the position coordinates of the reflecting plane mirror 5 and the free curved surface concave surface mirror 6 from a vertex in the focusing state in which a projection image by a lens nearest to the reflecting surface is maximum. The rotation is indicated with an angle between a surface normal and the optical axis.

TABLE 10

| | Y axis | Z axis | α |
|---|---|---|---|
| 30th surface | 0.00 | 47.38 | −45.00 |
| 31st surface | 68.26 | 54.52 | −98.65 |

Figure 24:
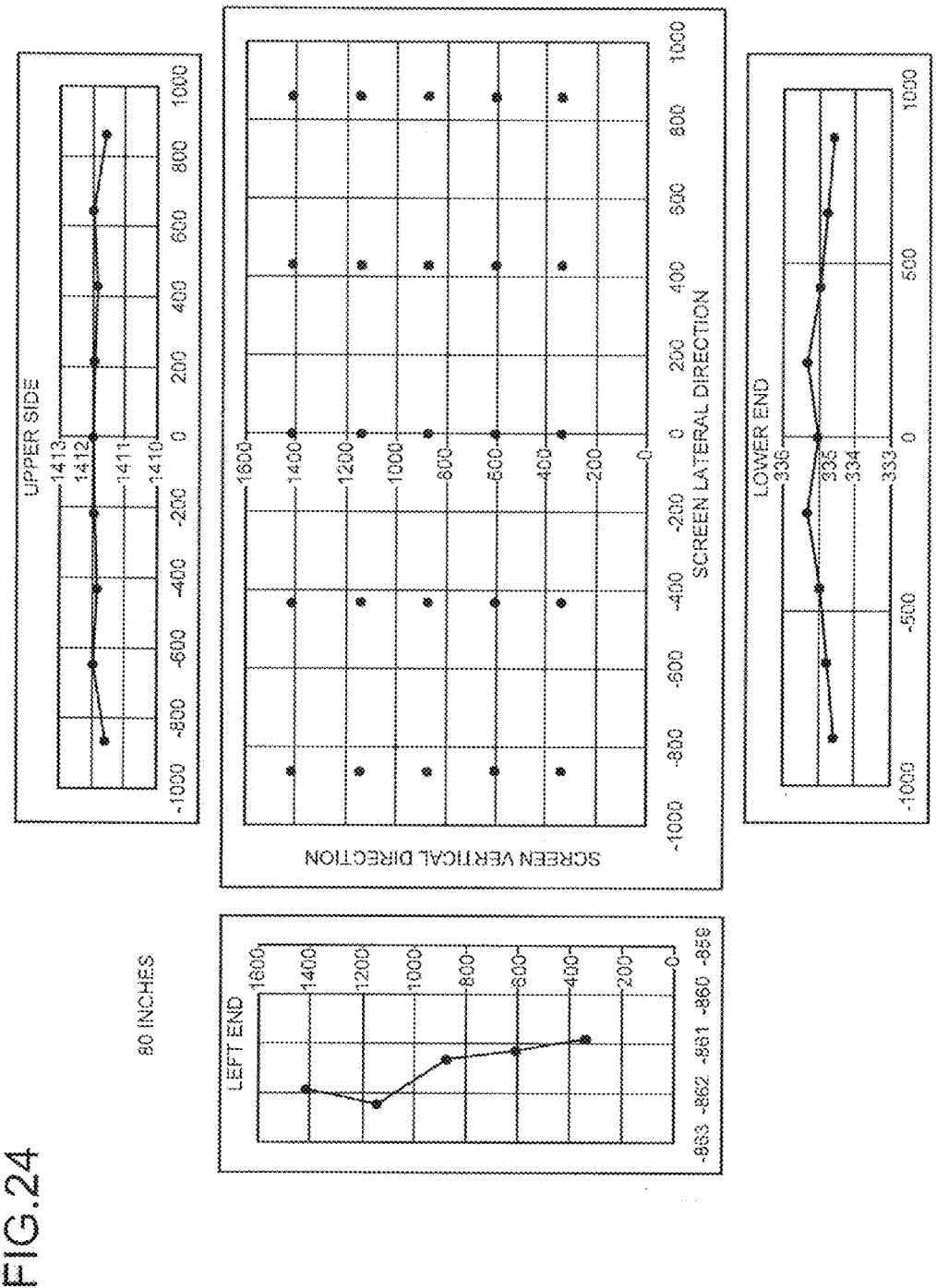
FIG. 24 is a diagram illustrating spotted positions of respective angles of view on a screen with a long projection distance (80 inches) of the projector apparatus according to the second embodiment.
Figure 25:
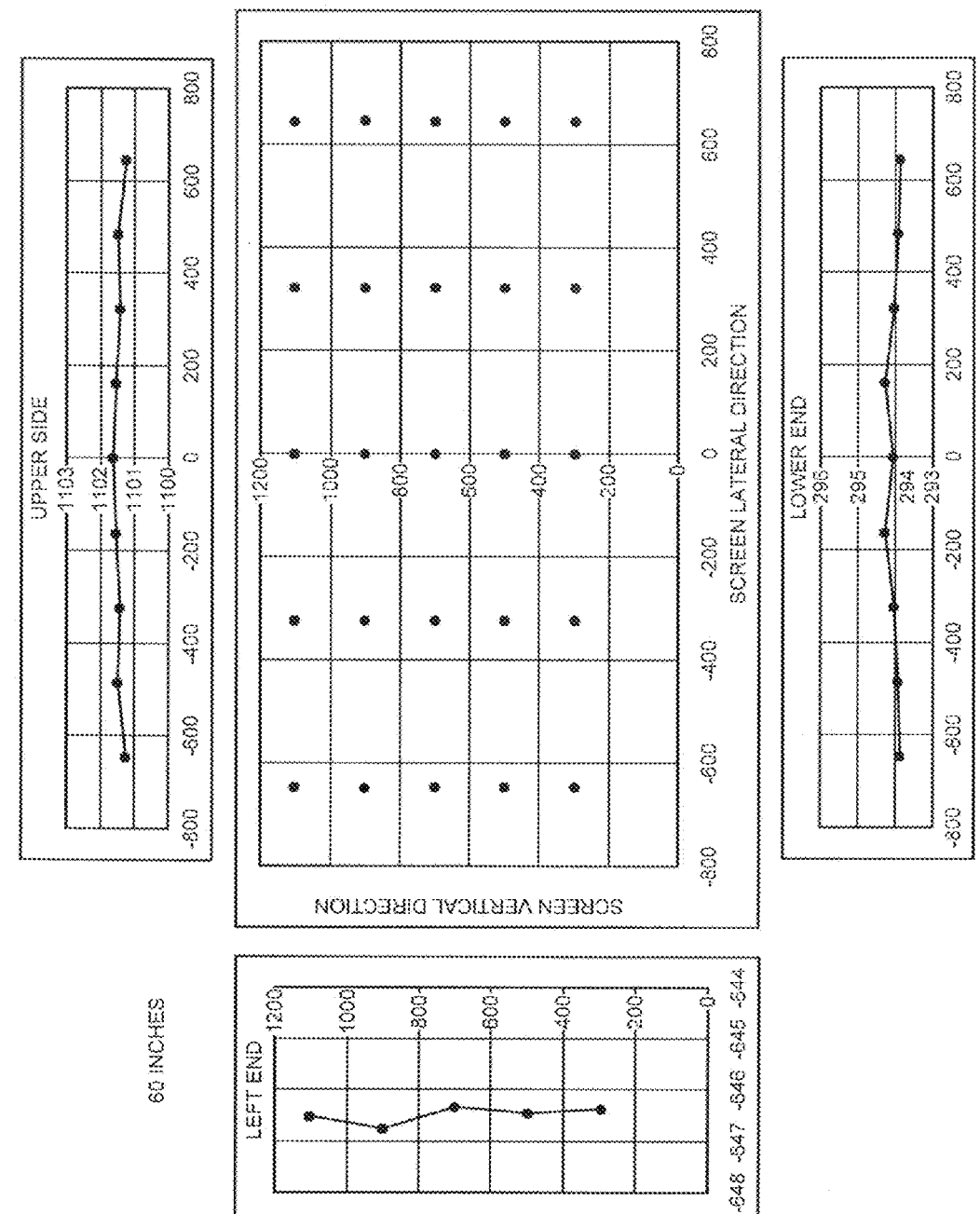
FIG. 25 is a diagram illustrating spotted positions of respective angles of view on a screen with a medium projection distance (60 inches) of the projector apparatus according to the second embodiment.
Figure 26:
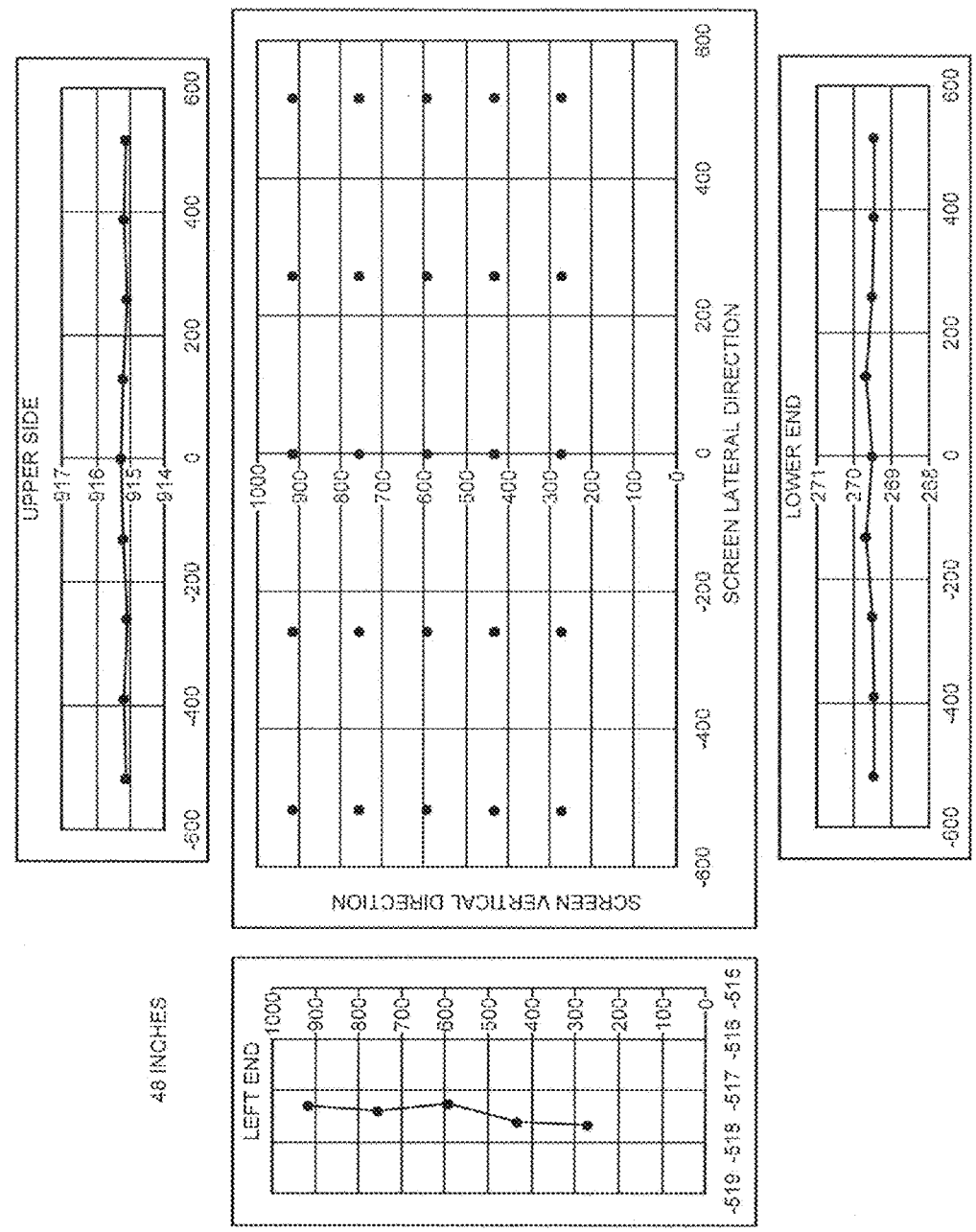
FIG. 26 is a diagram illustrating spotted positions of respective angles of view on a screen with a short projection distance (48 inches) of the projector apparatus according to the second embodiment.
Figure 27:
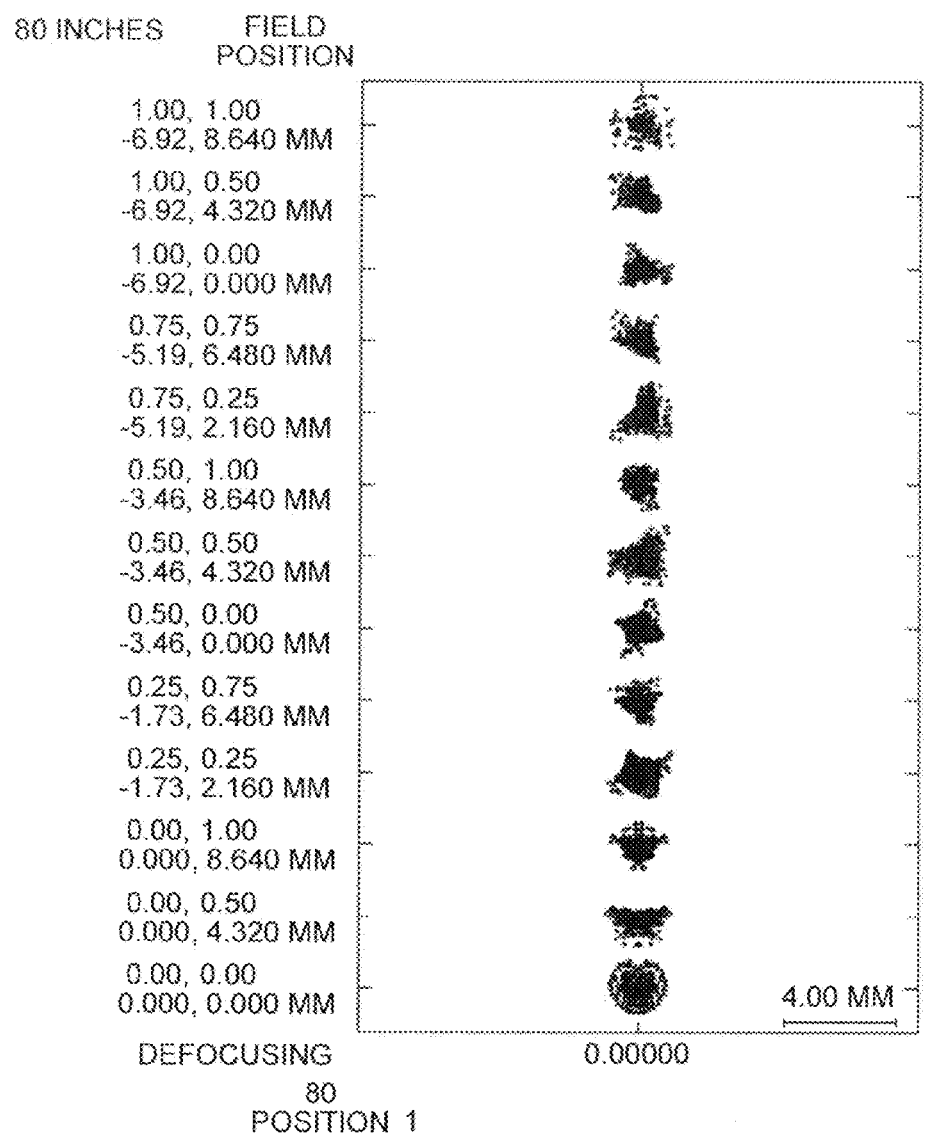
FIG. 27 is a spot diagram illustrating imaging characteristics (mm) on a screen surface regarding a wavelength of 625 nm (red), a wavelength of 550 nm (green), and a wavelength of 425 nm (blue) with a long projection distance (80 inches) of the projector apparatus according to the second embodiment.
Figure 28:
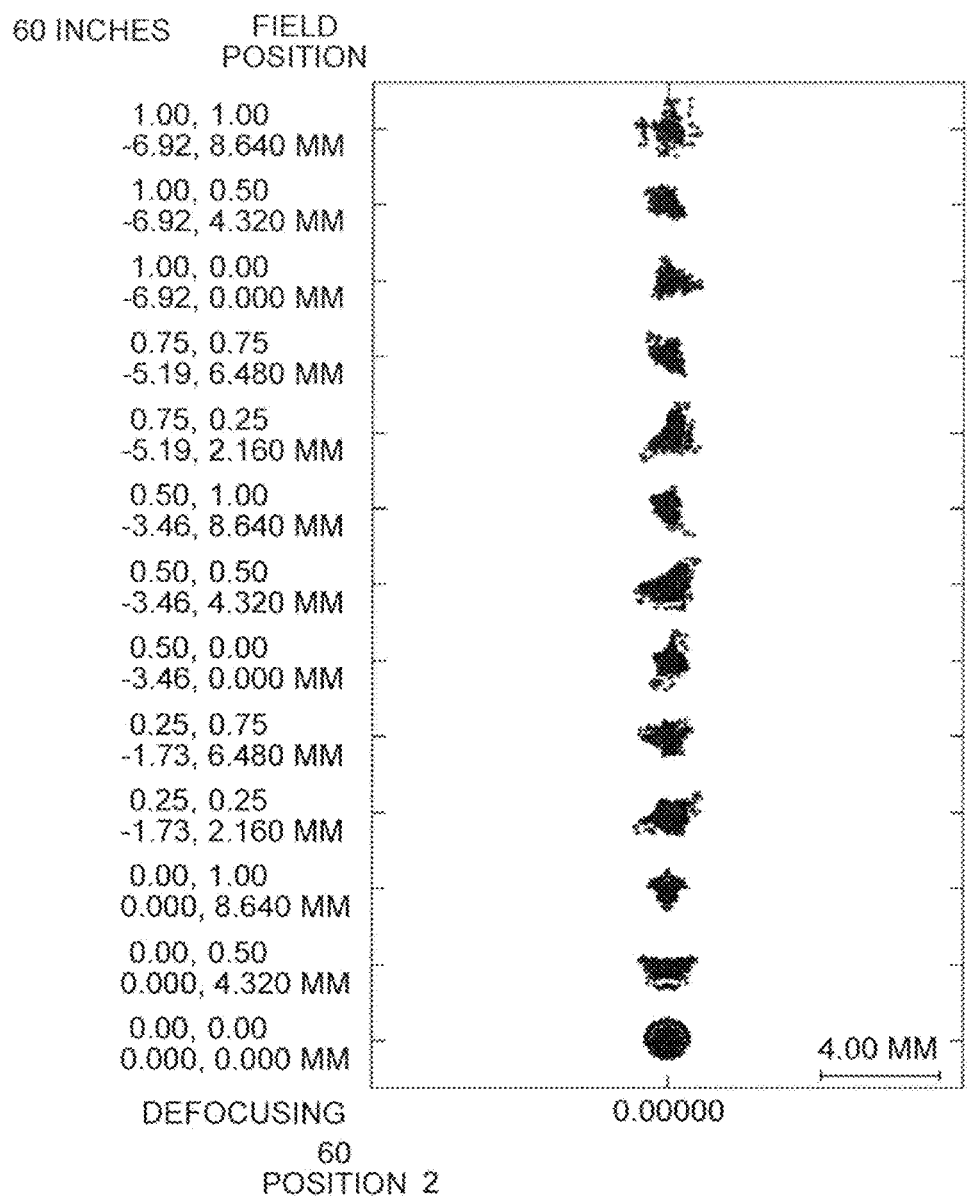
FIG. 28 is a spot diagram illustrating imaging characteristics (mm) on a screen surface regarding a wavelength of 625 nm (red), a wavelength of 550 nm (green), and a wavelength of 425 nm (blue) with a medium projection distance (60 inches) of the projector apparatus according to the second embodiment.
Figure 29:
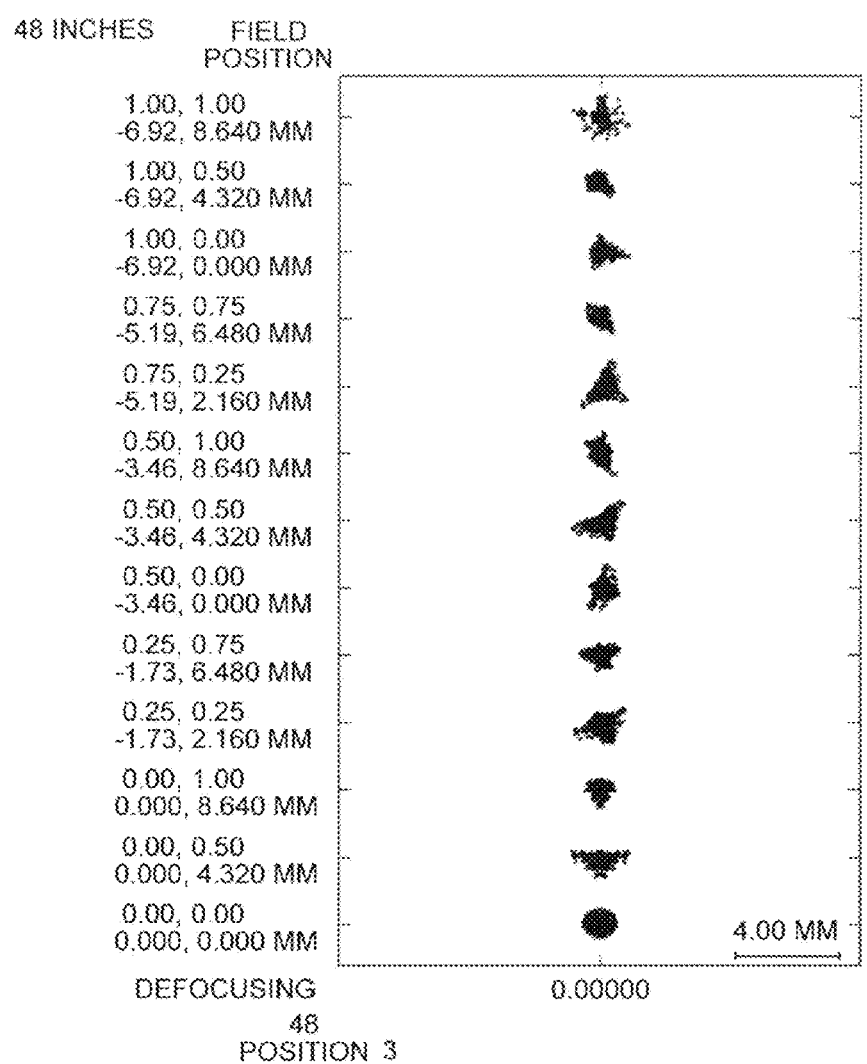
FIG. 29 is a spot diagram illustrating imaging characteristics (mm) on a screen surface regarding a wavelength of 625 nm (red), a wavelength of 550 nm (green), and a wavelength of 425 nm (blue) with a short projection distance (48 inches) of the projector apparatus according to the second embodiment.

FIG. 24 illustrates spot positions (wavelength: 550 nm) of respective angles of view on a screen with a long projection distance (80 inches). FIG. 25 illustrates spot positions (wavelength: 550 nm) of respective angles of view on a screen with a medium projection distance (60 inches). FIG. 26 illustrates spot positions (wavelength: 550 nm) of respective angles of view on a screen with a short projection distance (48 inches). According to FIGS. 24 to 26, the refractive optical system 51 provided in the projector apparatus of the second embodiment can project a projection image having small distortion, regarding each zoom and each projection distance. FIGS. 27 to 29 illustrate spot diagrams. In the spot diagrams of FIGS. 27 to 29, the image forming characteristics (mm) on the screen surface are illustrated with respect to a wavelength of 625 nm (red), a wavelength of 550 nm (green), and a wavelength of 425 nm (blue). The field position of each spot is indicated by coordinates (x, y) on the image forming unit 2.

As is clear from the above description, in the projector apparatus of the second embodiment, the aspheric surface lenses provided in the refractive optical system 51 cause barrel form distortion on the intermediate image so as to compress the intermediate image and reduce the size thereof. In this manner, the concave surface mirror 6 can be reduced in size, and the reduction of the size of the concave surface mirror 6 enables the downsizing of the projector apparatus. The barrel form distortion occurring on the intermediate image is corrected with the free curved surface concave surface mirror 6, and the corrected intermediate image is projected on the screen, etc. Therefore, it is possible to obtain a high-quality projection image and achieve the same effects as in the first embodiment described above.

Third Embodiment

Next, a projector apparatus of the third embodiment will be described. The projector apparatus of the third embodiment is different from the projector apparatuses of the above-described embodiments only in the configuration of the refractive optical system. Thus, in the drawings used for the explanation of the projector apparatus of the third embodiment, the portions indicating the same operations or functions as in the projector apparatus of the first embodiment described above are represented with the same symbols as in the projector apparatus of the first embodiment, and the detailed description thereof is omitted. The following explanation of the third embodiment will mainly focus on the refractive optical system different from that in the above-described embodiments.

Figure 30:
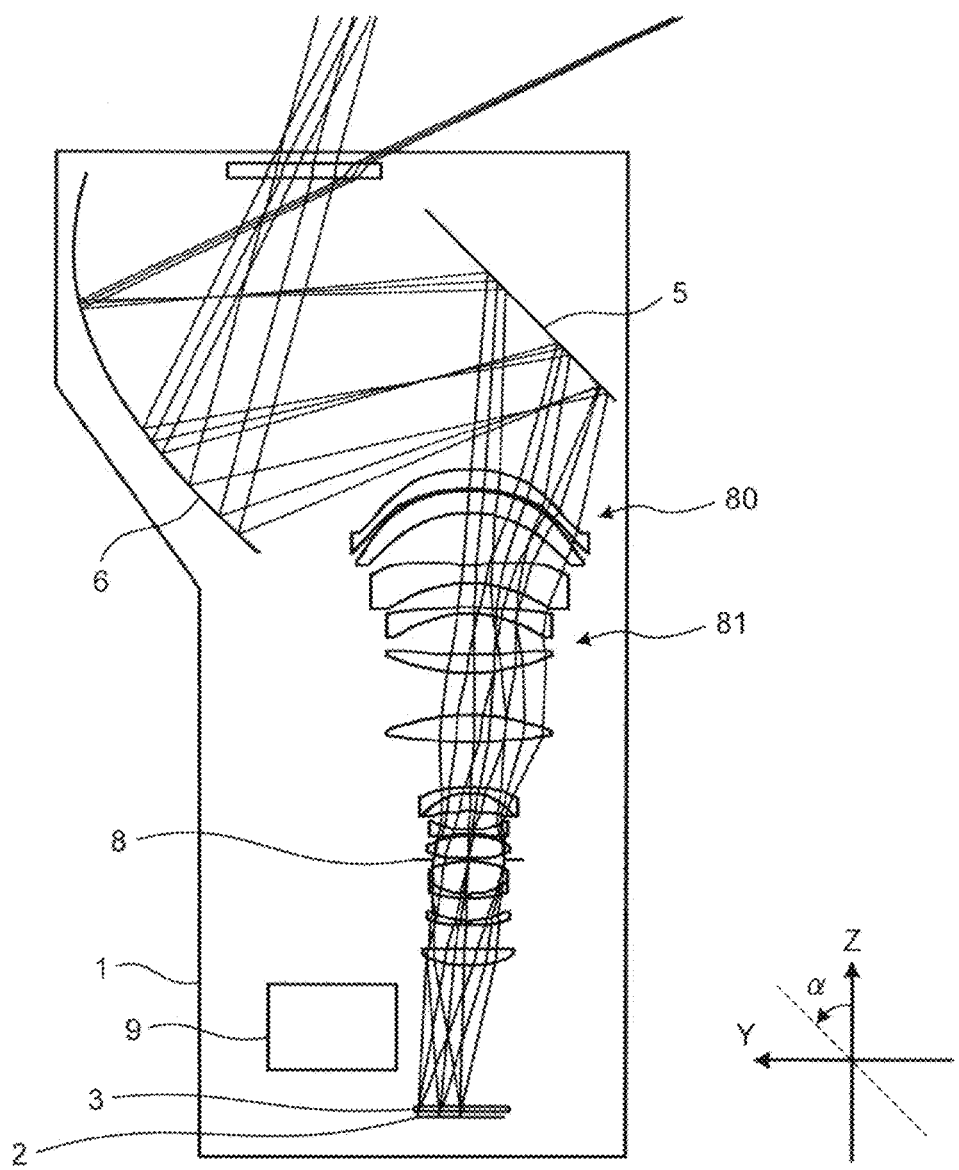
FIG. 30 is a cross section of a projector apparatus according to a third embodiment of the present invention.
Figure 31:
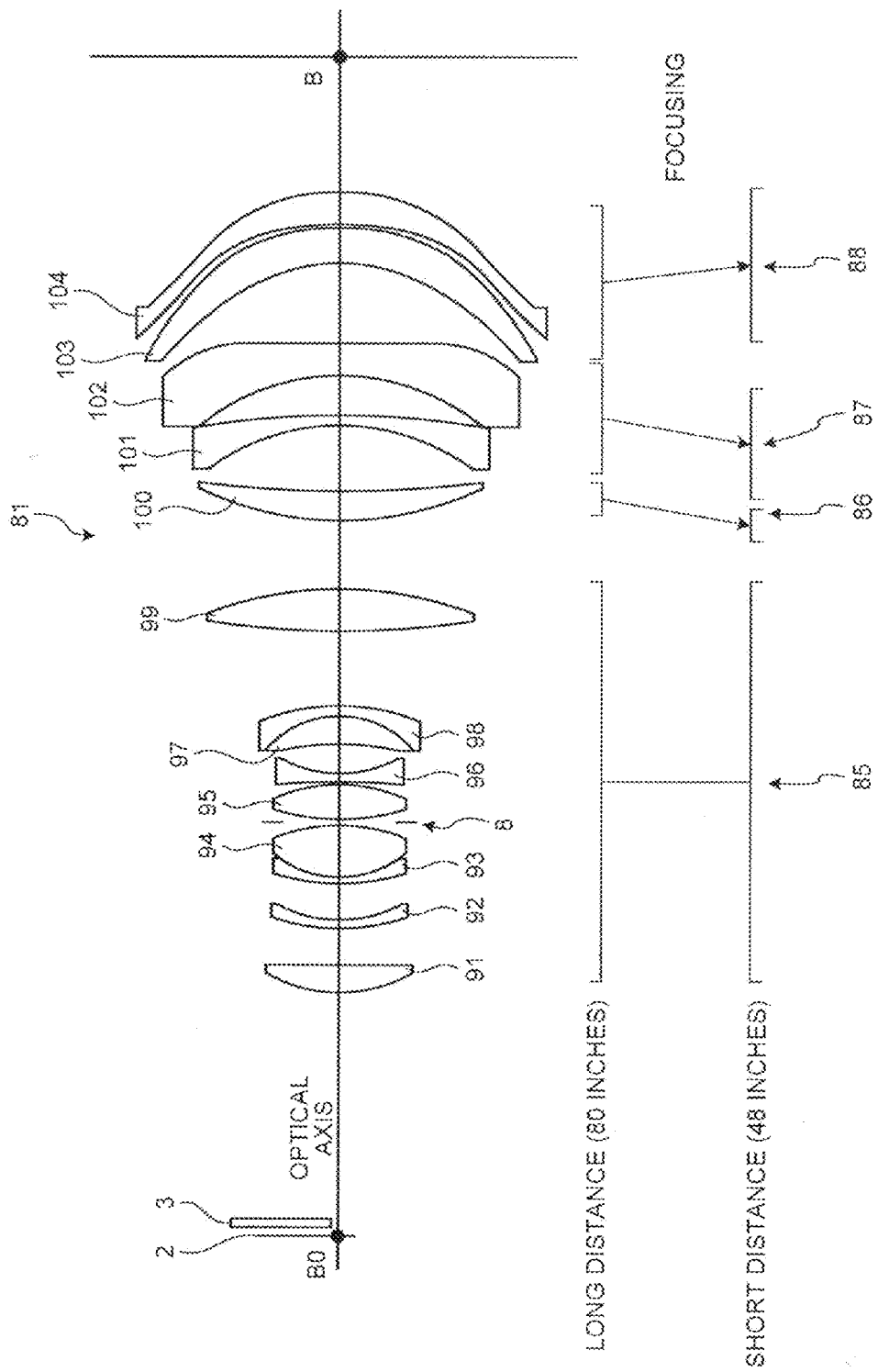
FIG. 31 is a diagram illustrating a lens configuration of a refractive optical system provided in the projector apparatus according to the third embodiment.

FIG. 30 is a cross section of the projector apparatus of the third embodiment. The continuous lines in FIG. 30 illustrate paths of the movement by focusing. FIG. 31 illustrates a lens configuration of a refractive optical system 81 provided in a projection optical system 80 of the projector apparatus of the third embodiment. In FIGS. 30 and 31, a light flux subjected to two-dimensional intensity modulation with the image forming unit 2 such as a DMD based on image information becomes a projection light flux as an object light. The projection light flux from the image forming unit 2 becomes an image-forming light flux through the refractive optical system 81 including at least one aspheric surface lens, the reflecting plane mirror 5, and the concave surface mirror 6. That is, an image formed on the image forming unit 2 such as a DMD is enlarged and projected with the projection optical system 80 on the screen as a projection image. The number of mirrors can be increased to provide power to the reflecting plane mirror 5.

The light passing through the refractive optical system 81 forms an intermediate image which is a space image conjugate to the image information formed with the image forming unit 2 on a near side to the image forming unit 2 relative to the concave surface mirror 6. The intermediate image is not necessarily formed as a flat image. In the third embodiment, and the fourth embodiment described later, the intermediate image is formed as a curved image. The intermediate image is enlarged and projected on the screen through the free curved surface concave surface mirror 6 arranged on the most magnification side. The image surface curvature and distortion occurs on the intermediate image. However, the image surface curvature and distortion occurring on the intermediate image is corrected with the free curved surface of the concave surface mirror 6, and the corrected intermediate image is projected on the screen. The free curved surface of the concave surface mirror 6 corrects image surface curvature and distortion occurring on the intermediate image. Thus, the degree of freedom of the design of the refractive optical system 81 and the projection optical system 80 can be increased, which remarkably contributes to the downsizing of the projector apparatus, for example.

Figure 32:
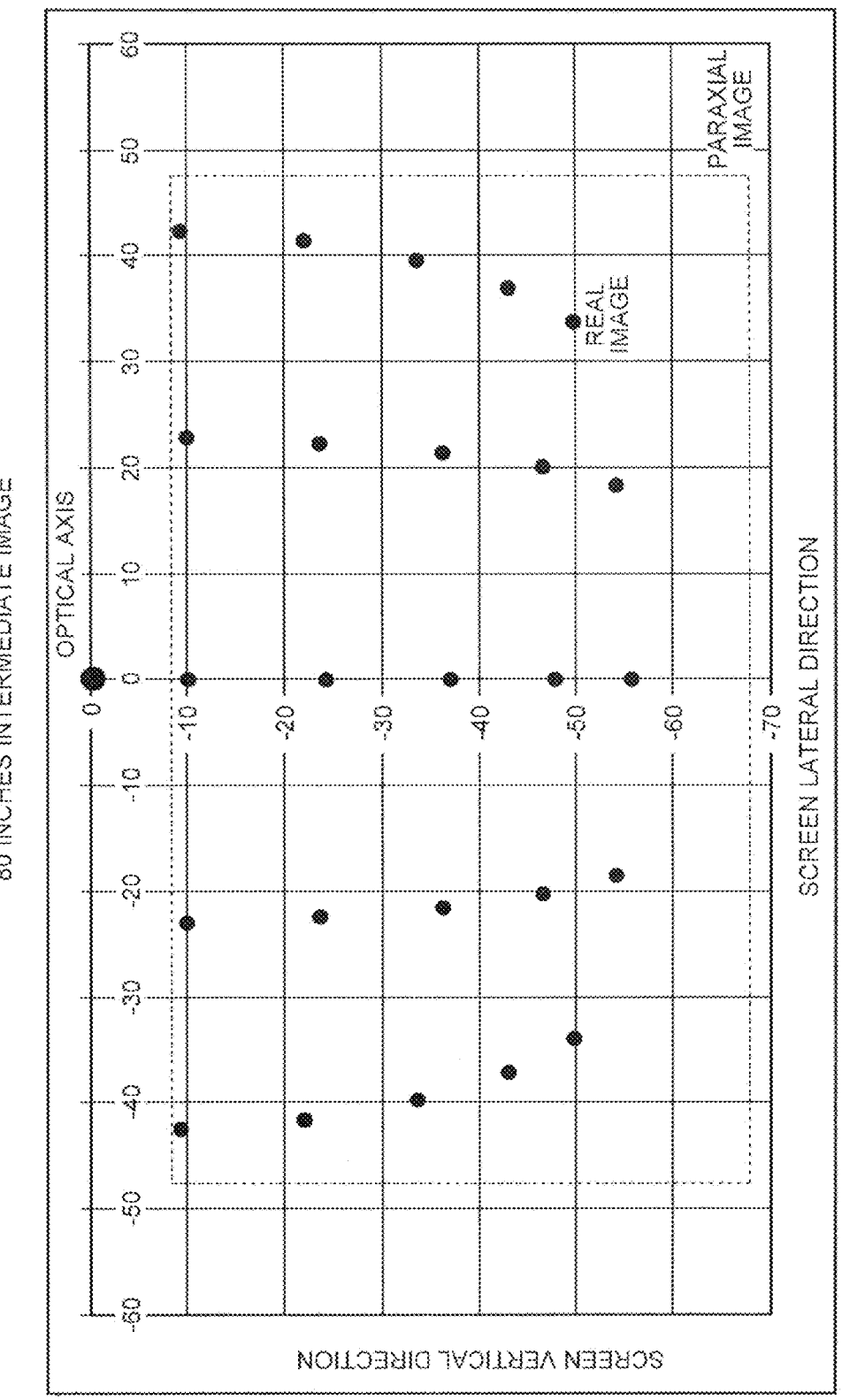
FIG. 32 is a diagram illustrating plotted intersections of a paraxial image plane and a main light beam with a long distance (80 inches) of the projector apparatus according to the third embodiment.
Figure 33:
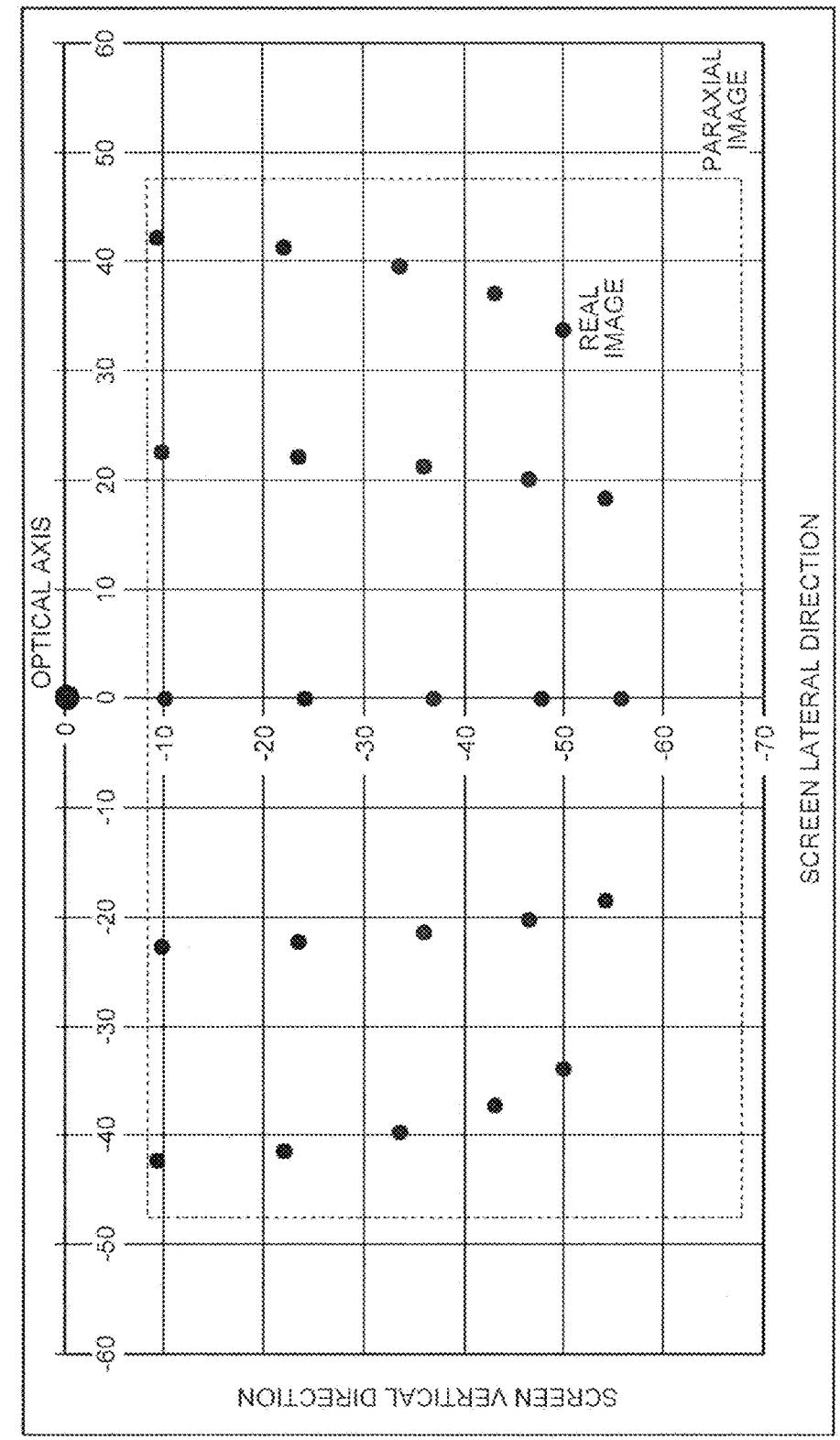
FIG. 33 is a diagram illustrating plotted intersections of a paraxial image plane and a main light beam with a medium distance (60 inches) of the projector apparatus according to the third embodiment.
Figure 34:
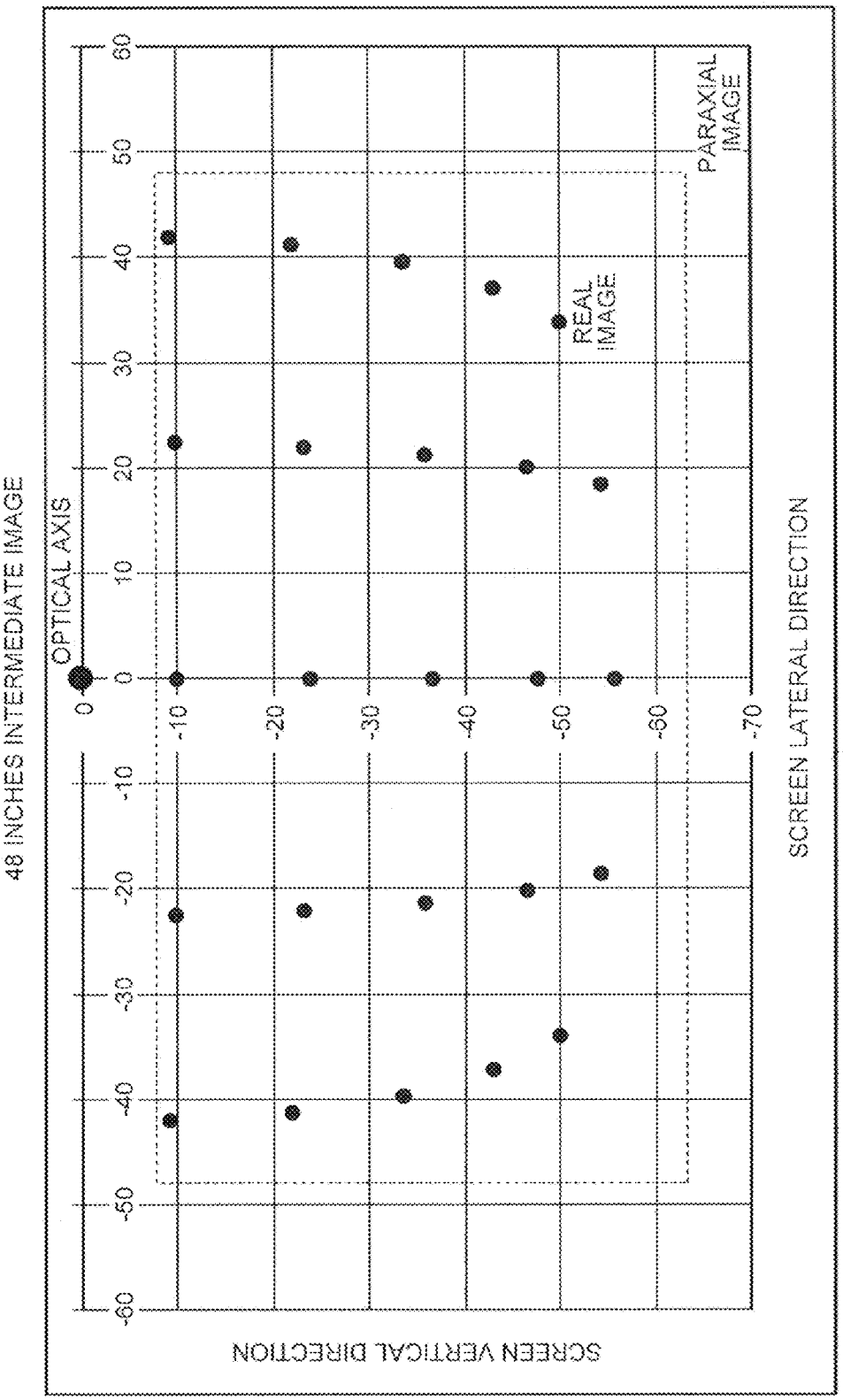
FIG. 34 is a diagram illustrating plotted intersections of a paraxial image plane and a main light beam with a short distance (48 inches) of the projector apparatus according to the third embodiment.

FIGS. 32, 33, and 34 are diagrams illustrating plotted intersections of the main light beam and the paraxial image plane regarding a long distance (80 inches), a medium distance (60 inches), and a short distance (48 inches), respectively. In FIGS. 32 to 34, black points indicate coordinates of intersections of the main light beam and the paraxial image plane with several angles of view, and a dotted line indicates the paraxial image. According to FIGS. 32 to 34, the barrel form distortion occurs in each screen size. This indicates that the intermediate image is compressed and reduced in size. In the projector apparatus of the third embodiment, the size of the intermediate image can be reduced in this manner. Thus, the size of the free curved surface concave surface mirror 6 can be reduced, which downsizes the projector apparatus and reduces costs of the projector apparatus.

In the projector apparatus of the third embodiment, in the focusing from a long distance side to a short distance side, a first lens group 85 of the refractive optical system 81 illustrated in FIG. 31, the reflecting plane mirror 5, and the free curved surface concave surface mirror 6 are fixed relative to the image forming surface. A second lens group 86 and a third lens group 87 are moved toward the image forming unit 2. A fourth lens group 88 is moved to the magnification side. That is, in the projector apparatus of the third embodiment, a process called a floating focus is performed in the focusing from a long distance side to a short distance side. Therefore, the projector apparatus of the third embodiment can highly control image surface curvature and distortion aberration. In the projector apparatus of the third embodiment, the aspheric surface lenses are used in the lens groups moving in the above manner, and the excessive correction of the aspheric surface lenses causes barrel form distortion on the intermediate image. The entire configuration and operation of the projector apparatus is as described above with reference to FIG. 18.

The refractive optical system 81 includes the first lens group 85 having positive refractive power and the second lens group 86 having positive refractive power in this order from the image forming unit 2 to the magnification side, as illustrated in FIG. 31. The refractive optical system 81 includes the third lens group 87 having negative refractive power with one aspheric surface lens and the fourth lens group 88 having positive refractive power with two aspheric surface lenses. The projection optical system 80 includes such a refractive optical system 81, the reflecting plane mirror 5, and the free curved surface concave surface mirror 6 arranged at the most magnification side. In the focusing from a long distance side to a short distance side with the variation of the projection distance, the refractive optical system 81 moves the second positive lens group 86 and the third negative lens group 87 toward the image forming unit 2, and moves the fourth positive lens group 88 to the magnification side.

The first lens group 85 includes, in the order from the image forming unit 2, a both surface aspheric biconvex lens 91 with the stronger convex surface directed to the image forming unit 2 and a negative meniscus lens 92 with the convex surface directed to the image forming unit 2. Moreover, the first lens group 85 includes a negative meniscus lens 93 with the convex surface directed to the image forming unit 2, a cemented lens 94 of a biconvex lens with the stronger convex surface directed to the image forming unit 2, and a both surface aspheric biconvex lens 95 with the stronger convex surface directed to the magnification side. Furthermore, the first lens group 85 includes a biconcave lens 96 with the stronger concave surface directed to the magnification side, a positive meniscus lens 97 with the convex surface directed to the magnification side, a cemented lens 98 of a negative meniscus lens with the convex surface directed to the magnification side, and a biconvex lens 99 with the stronger convex surface directed to the magnification side.

The second lens group 86 includes a positive meniscus lens 100 with the convex surface directed to the image forming unit 2. The third lens group 87 includes a negative meniscus lens 101 with the convex surface directed to the magnification side, and a both surface aspheric biconcave lens 102 with the stronger concave surface directed to the image forming unit 2. The fourth lens group 88 includes a both surface aspheric negative meniscus lens 103 with the convex surface directed to the magnification side and a both surface aspheric positive meniscus lens 104 with the convex surface directed to the magnification side.

The following tables 11 to 15 show data of the refractive optical system 81 provided in the projector apparatus of the third embodiment. The "i" in the table 11 represents the i-th surface (prism surface, lens surface, stop surface, reflecting surface) when counted from the image forming unit 2.

Numerical aperture: 0.195

TABLE 11

| | | Numerical aperture: 0.195 | | |
|---|---|---|---|---|
| i | R | D | Nd | Vd |
| 1 | ∞ | 1.00 | | |
| 2 | ∞ | 1.00 | 1.51680 | 64.1983 |
| 3 | ∞ | 28.00 | | |
| 4* | 19.765 | 3.36 | 1.48749 | 70.2363 |
| 5* | −67.954 | 4.50 | | |
| 6 | 24.431 | 1.00 | 1.90366 | 31.3150 |
| 7 | 15.956 | 4.58 | | |
| 8 | 29.430 | 0.75 | 1.90366 | 31.3150 |
| 9 | 12.701 | 6.46 | 1.58144 | 40.7476 |
| 10 | −20.585 | 0.30 | | |
| Stop | ∞ | 0.3 | | |
| 11 | 25.032 | 4.42 | 1.48749 | 70.4412 |
| 12 | −18.832 | 0.30 | | |
| 13 | −75.099 | 1.01 | 1.83481 | 42.7253 |
| 14 | 15.401 | 3.65 | | |
| 15 | −35.558 | 3.52 | 1.48749 | 70.2363 |
| 16 | −12.066 | 1.20 | 1.90366 | 31.3150 |
| 17 | −24.959 | 9.14 | | |
| 18 | 98.434 | 5.26 | 1.78470 | 26.2912 |
| 19 | −44.523 | variable A | | |
| 20 | 41.644 | 3.57 | 1.69895 | 30.1279 |
| 21 | 138.666 | variable B | | |
| 22 | −27.076 | 1.20 | 1.84666 | 23.7779 |
| 23 | −112.416 | 4.89 | | |
| 24* | −24.847 | 3.73 | 1.53046 | 55.8000 |
| 25* | 67.396 | variable C | | |
| 26* | −21.980 | 4.36 | 1.53046 | 55.8000 |
| 27* | −26.619 | 0.30 | | |
| 28* | −53.067 | 4.00 | 1.53046 | 55.8000 |
| 29* | −30.336 | variable D | | |
| 30 | ∞ | −79.13 | reflecting surface | |
| 31* | ∞ | variable E | reflecting surface | |

Focusing

TABLE 12

| | short distance | standard | long distance |
|---|---|---|---|
| screen size | 48 inches | 60 inches | 80 inches |
| variable A | 6.50 | 7.57 | 8.50 |
| variable B | 8.94 | 8.47 | 8.05 |
| variable C | 13.64 | 12.01 | 10.26 |
| variable D | 40.57 | 41.60 | 42.83 |
| variable E | 239.78 | 291.71 | 378.38 |

Aspheric Surface Coefficient

TABLE 13

| | K | A4 | A6 | A8 | A10 | A12 | A14 | A16 |
|---|---|---|---|---|---|---|---|---|
| 4th surface | 0.321 | −1.549E−05 | 2.348E−07 | −8.023E−10 | 2.681E−11 | | | |
| 5th surface | 0.000 | 6.621E−05 | 2.759E−07 | −1.140E−11 | 2.885E−11 | | | |
| 11th surface | 0.039 | 1.376E−06 | −4.475E−08 | | | | | |

TABLE 13-continued

| | K | A4 | A6 | A8 | A10 | A12 | A14 | A16 |
|---|---|---|---|---|---|---|---|---|
| 12th surface | 0.189 | 2.530E−06 | −6.381E−08 | | | | | |
| 24th surface | −0.727 | 1.733E−05 | −1.008E−07 | 3.294E−10 | −5.241E−13 | | | |
| 25th surface | −3.607 | −4.578E−05 | 7.716E−08 | −1.653E−10 | 2.335E−13 | −1.953E−16 | | |
| 26th surface | −0.801 | 2.660E−05 | −3.323E−07 | 1.159E−09 | −1.614E−12 | 8.043E−16 | | |
| 27th surface | −0.439 | 1.047E−05 | 7.131E−08 | −1.254E−09 | 3.952E−12 | −4.868E−15 | 2.111E−18 | |
| 28th surface | 2.299 | −7.581E−05 | 5.903E−07 | −3.350E−09 | 9.671E−12 | −1.452E−14 | 1.119E−17 | −3.585E−21 |
| 29th surface | −1.174 | −5.710E−05 | 2.478E−07 | −1.176E−09 | 3.283E−12 | −4.590E−15 | 3.119E−18 | −8.254E−22 |

Free Curved Surface Coefficient

TABLE 14

| K | 0 |
|---|---|
| C4 | 1.2663E−02 |
| C6 | 9.0693E−03 |
| C8 | −1.4730E−05 |
| C10 | −1.5861E−04 |
| C11 | −1.6146E−06 |
| C13 | 1.7056E−06 |
| C15 | −1.9417E−06 |
| C17 | −1.8278E−08 |
| C19 | 1.2447E−07 |
| C21 | 1.7523E−08 |
| C22 | 6.1211E−10 |
| C24 | −6.9304E−10 |
| C26 | 1.4859E−09 |
| C28 | 4.8433E−10 |
| C30 | 7.2389E−12 |
| C32 | −3.8764E−11 |
| C34 | −1.6595E−11 |
| C36 | −3.3449E−13 |
| C37 | −1.3657E−13 |
| C39 | 1.4026E−13 |
| C41 | −2.9312E−13 |
| C43 | −2.3637E−13 |
| C45 | −3.9507E−14 |
| C47 | −6.9844E−16 |
| C49 | 7.0885E−15 |
| C51 | 6.9612E−15 |
| C53 | 2.4919E−15 |
| C55 | 6.5428E−17 |
| C56 | 1.4330E−17 |
| C58 | 1.3597E−17 |
| C60 | 8.4166E−17 |
| C62 | 8.6819E−17 |
| C64 | 3.5818E−17 |
| C66 | 3.2204E−18 |

DMD Size
Dot size: 10.8 μm
Lateral length: 13.824 mm
Vertical length: 8.64 mm
From optical axis to center of device: 5.62 mm The following table 15 shows the position coordinates of the reflecting plane mirror 5 and the free curved surface concave surface mirror 6 from a vertex in the focusing state in which a projection image by a lens nearest to the reflecting surface is maximum. The rotation is indicated with an angle between a surface normal and the optical axis.

TABLE 15

| | Y axis | Z axis | α |
|---|---|---|---|
| 30th surface | 0.00 | 42.83 | −45.00 |
| 31st surface | 79.13 | 51.06 | −99.28 |

Figure 35:
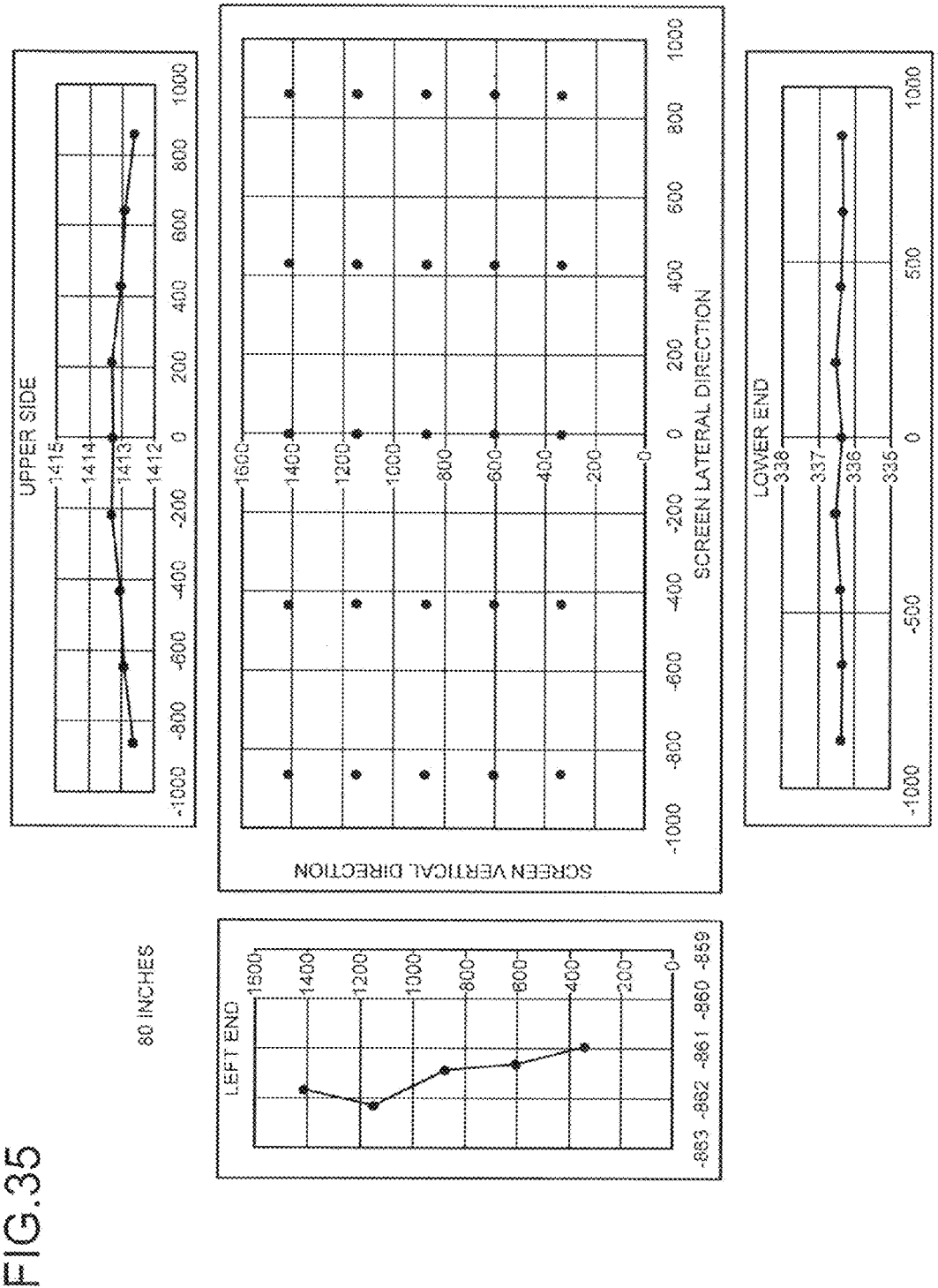
FIG. 35 is a diagram illustrating spotted positions of respective angles of view on a screen with a long projection distance (80 inches) of the projector apparatus according to the third embodiment.
Figure 36:
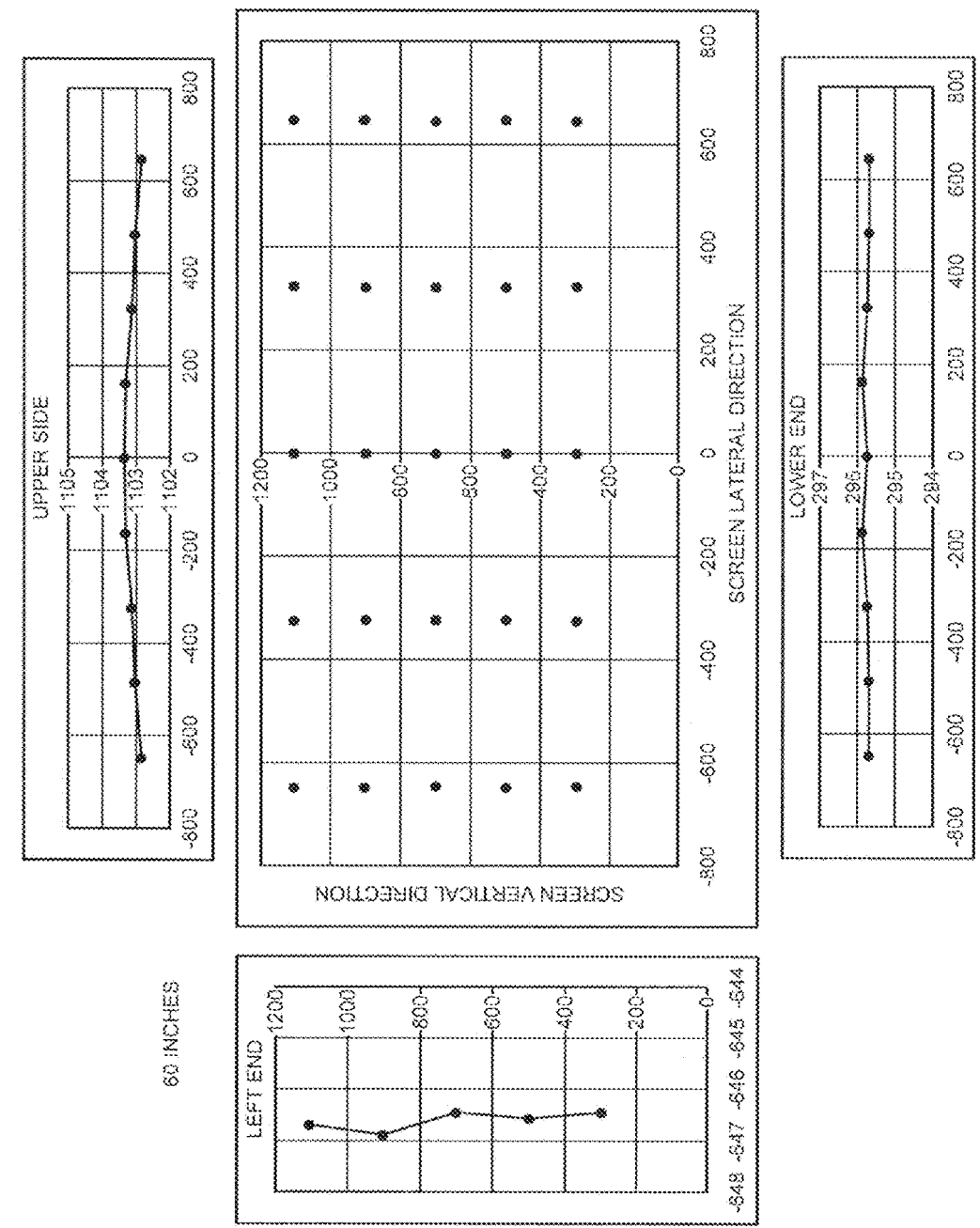
FIG. 36 is a diagram illustrating spotted positions of respective angles of view on a screen with a medium projection distance (60 inches) of the projector apparatus according to the third embodiment.
Figure 37:
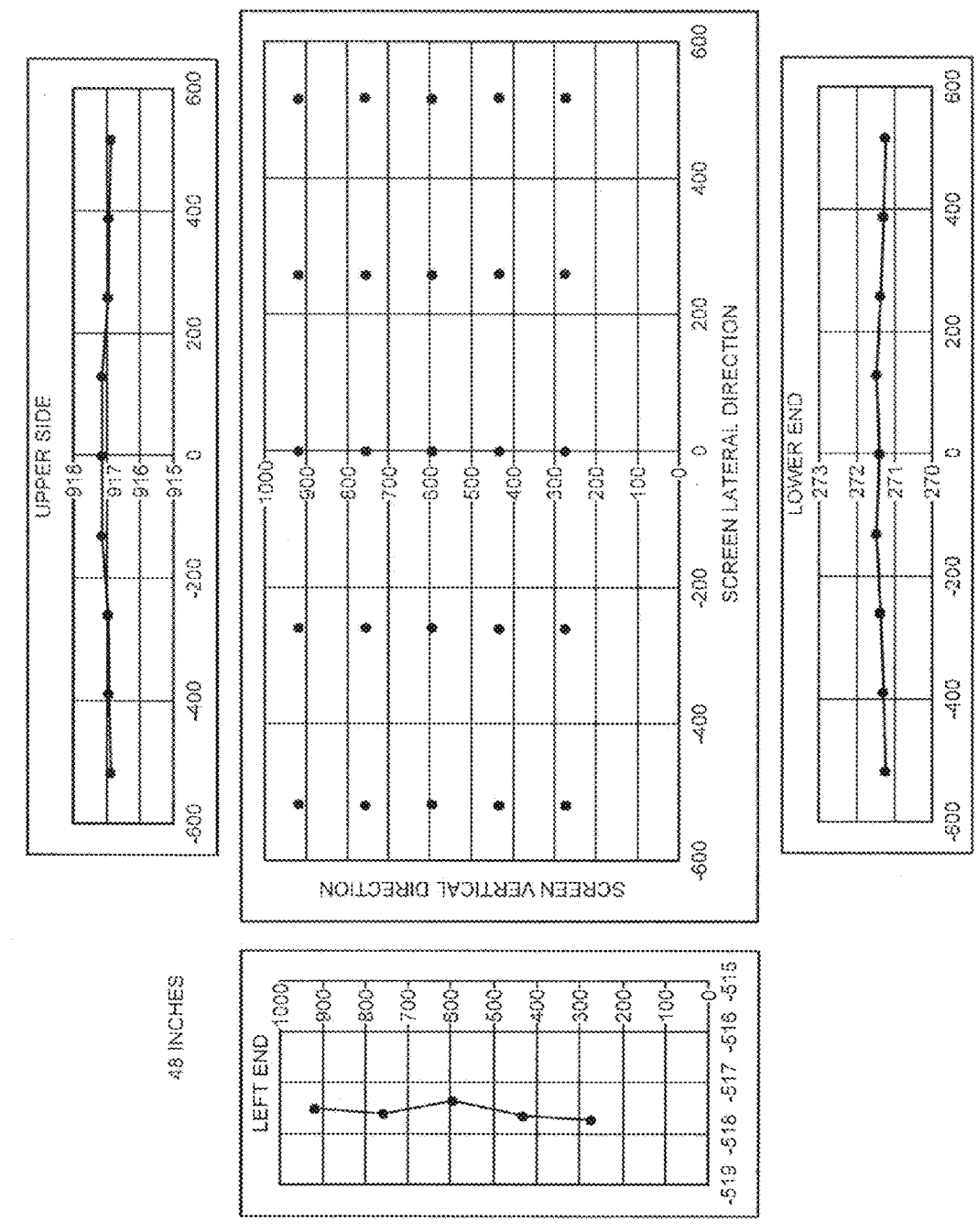
FIG. 37 is a diagram illustrating spotted positions of respective angles of view on a screen with a short projection distance (48 inches) of the projector apparatus according to the third embodiment.
Figure 38:
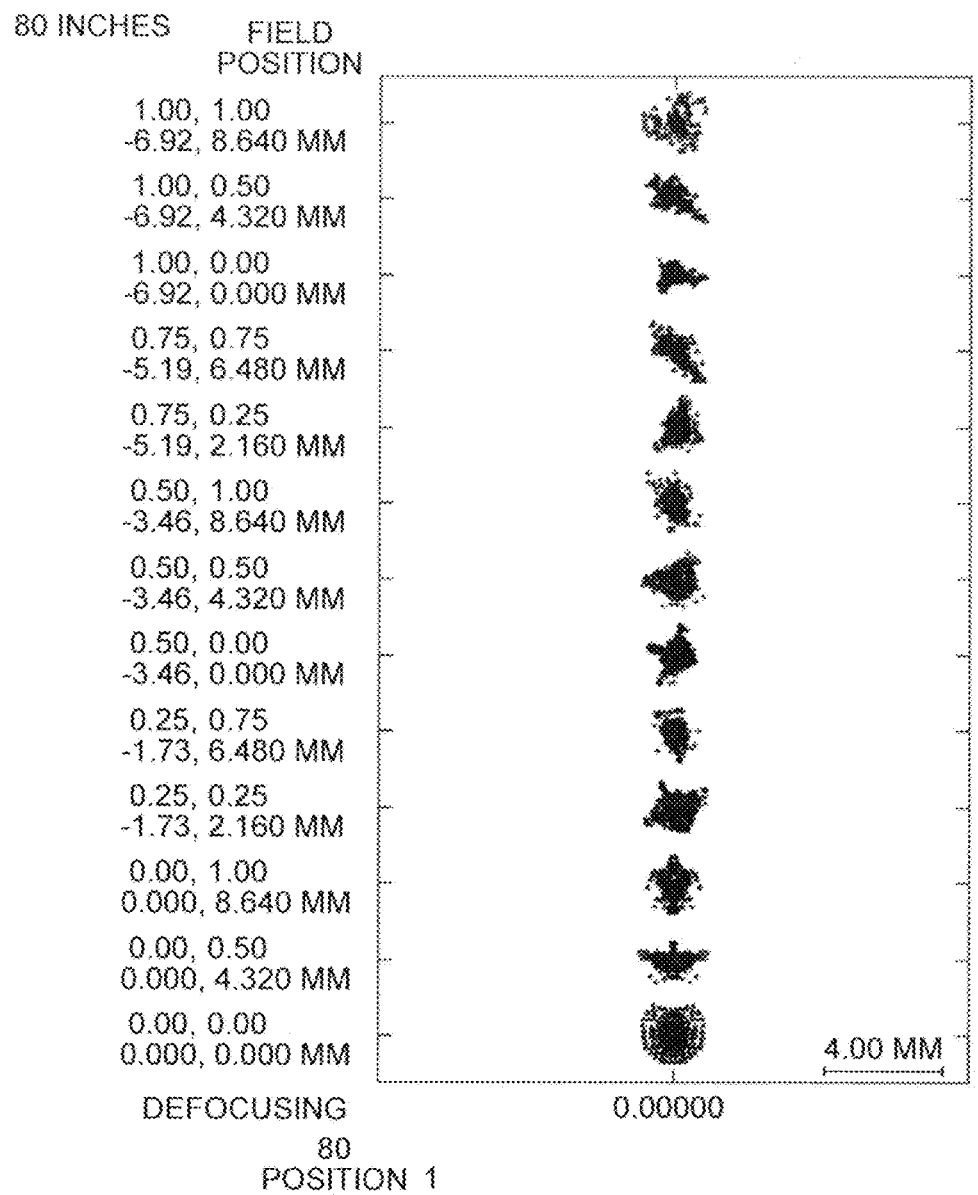
FIG. 38 is a spot diagram illustrating imaging characteristics (mm) on a screen surface regarding a wavelength of 625 nm (red), a wavelength of 550 nm (green), and a wavelength of 425 nm (blue) with a long projection distance (80 inches) of the projector apparatus according to the third embodiment.
Figure 39:
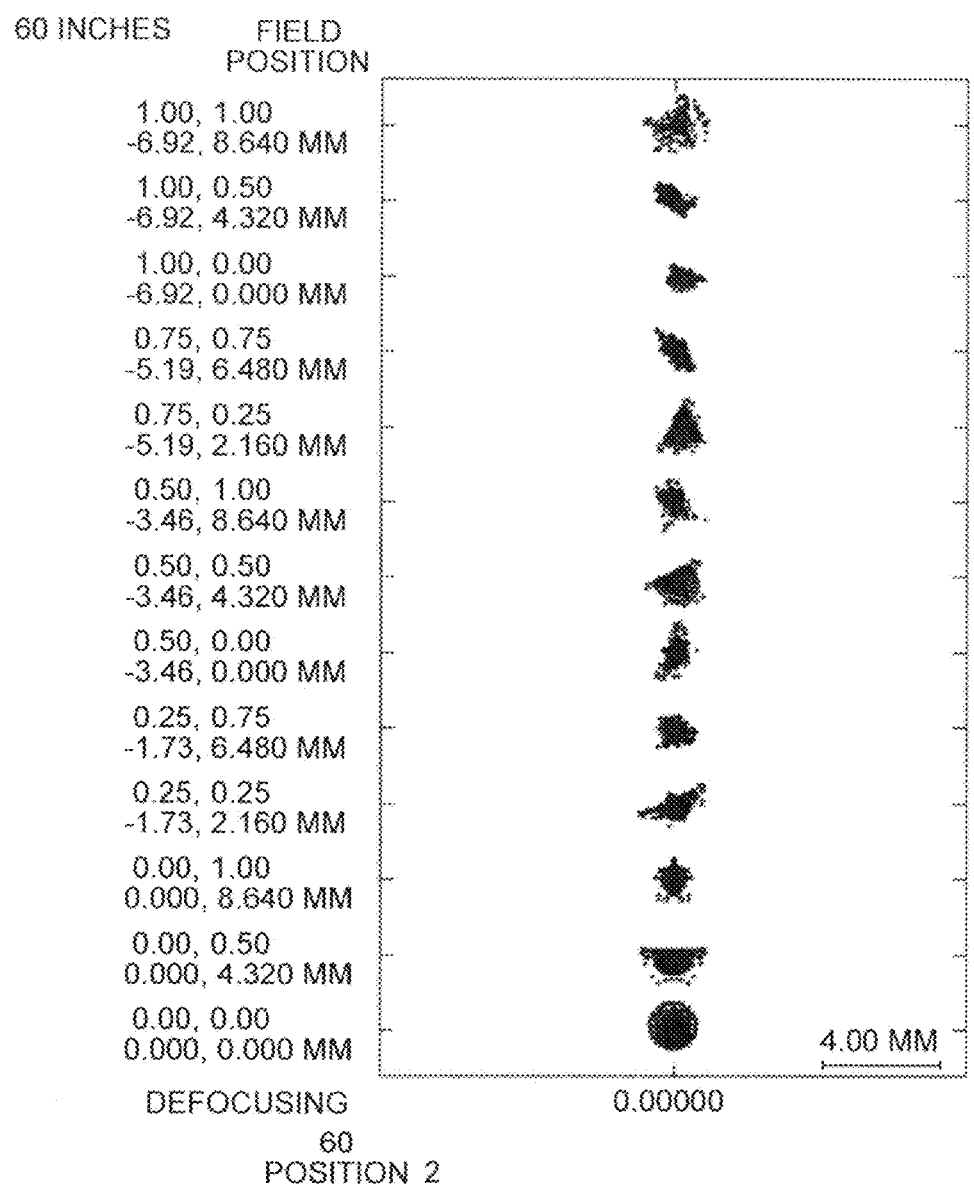
FIG. 39 is a spot diagram illustrating imaging characteristics (mm) on a screen surface regarding a wavelength of 625 nm (red), a wavelength of 550 nm (green), and a wavelength of 425 nm (blue) with a medium projection distance (60 inches) of the projector apparatus according to the third embodiment.
Figure 40:
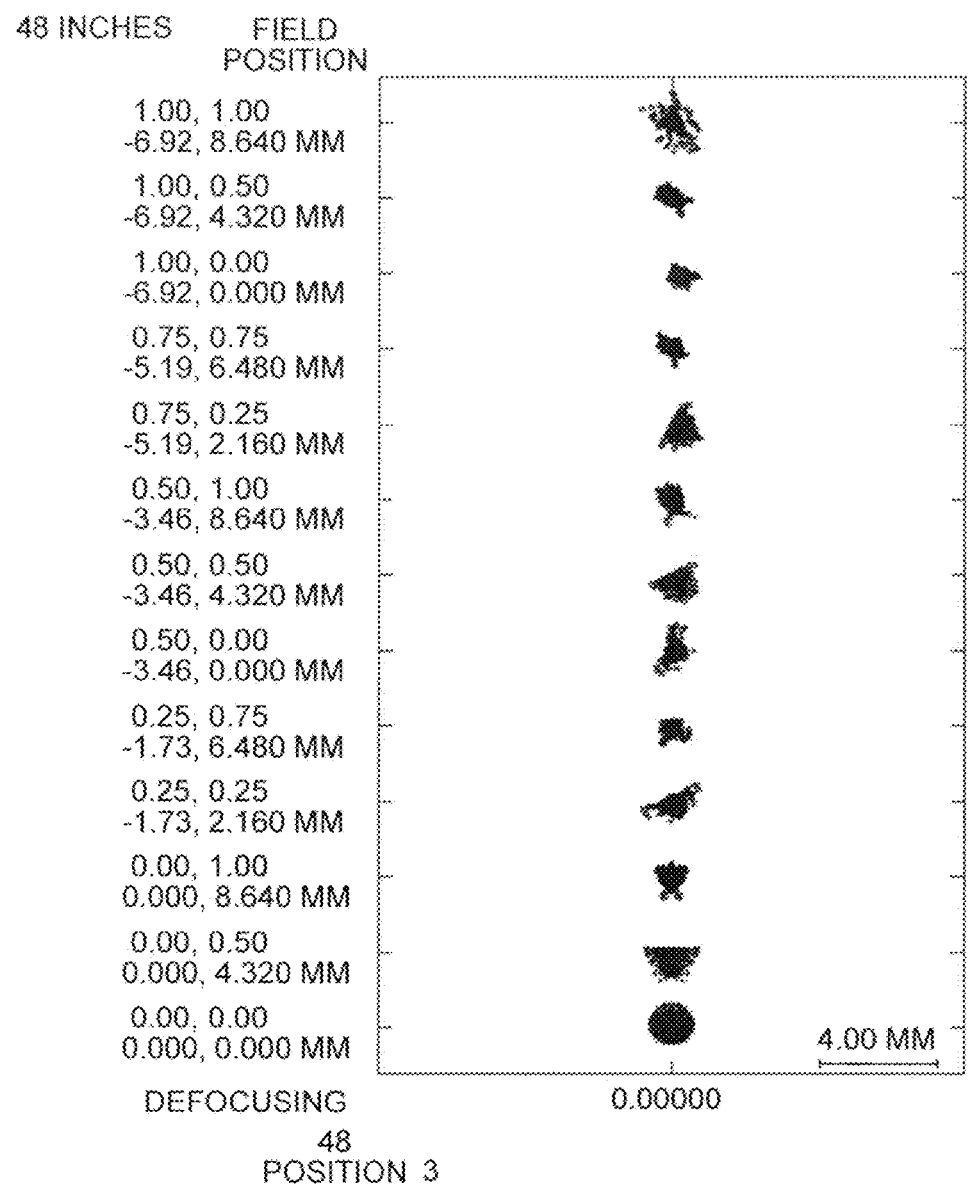
FIG. 40 is a spot diagram illustrating imaging characteristics (mm) on a screen surface regarding a wavelength of 625 nm (red), a wavelength of 550 nm (green), and a wavelength of 425 nm (blue) with a short projection distance (48 inches) of the projector apparatus according to the third embodiment.

FIG. 35 illustrates spot positions (wavelength: 550 nm) of respective angles of view on a screen with a long projection distance (80 inches). FIG. 36 illustrates spot positions (wavelength: 550 nm) of respective angles of view on a screen with a medium projection distance (60 inches). FIG. 37 illustrates spot positions (wavelength: 550 nm) of respective angles of view on a screen with a short projection distance (48 inches). According to FIGS. 35 to 37, the refractive optical system 81 provided in the projector apparatus of the third embodiment can project a projection image having small distortion, regarding each zoom and each projection distance. FIGS. 38 to 40 illustrate spot diagrams. In the spot diagrams of FIGS. 38 to 40, the image forming characteristics (mm) on the screen surface are illustrated with respect to a wavelength of 625 nm (red), a wavelength of 550 nm (green), and a wavelength of 425 nm (blue). The field position of each spot is indicated by coordinates (x, y) on the image forming unit 2.

As is clear from the above description, in the projector apparatus of the third embodiment, the aspheric surface lenses provided in the refractive optical system 81 cause barrel form distortion on the intermediate image so as to compress the intermediate image and reduce the size thereof. In this manner, the concave surface mirror 6 can be reduced in size, and the reduction of the size of the concave surface mirror 6 enables the downsizing of the projector apparatus. The barrel form distortion occurring on the intermediate image is corrected with the free curved surface concave surface mirror 6, and the corrected intermediate image is projected on the screen, etc. Therefore, it is possible to obtain a high-quality projection image and achieve the same effects as in the embodiments described above.

Fourth Embodiment

Next, a projector apparatus of the fourth embodiment will be described. The projector apparatus of the fourth embodiment is different from the projector apparatuses of the above-described embodiments only in the configuration of the refractive optical system. Thus, in the drawings used for the explanation of the projector apparatus of the fourth embodiment, the portions indicating the same operations or functions as in the projector apparatus of the first embodiment described above are represented with the same symbols as in the projector apparatus of the first embodiment, and the detailed description thereof is omitted. The following explanation of the fourth embodiment will mainly focus on the refractive optical system different from that in the above-described embodiments.

Figure 41:
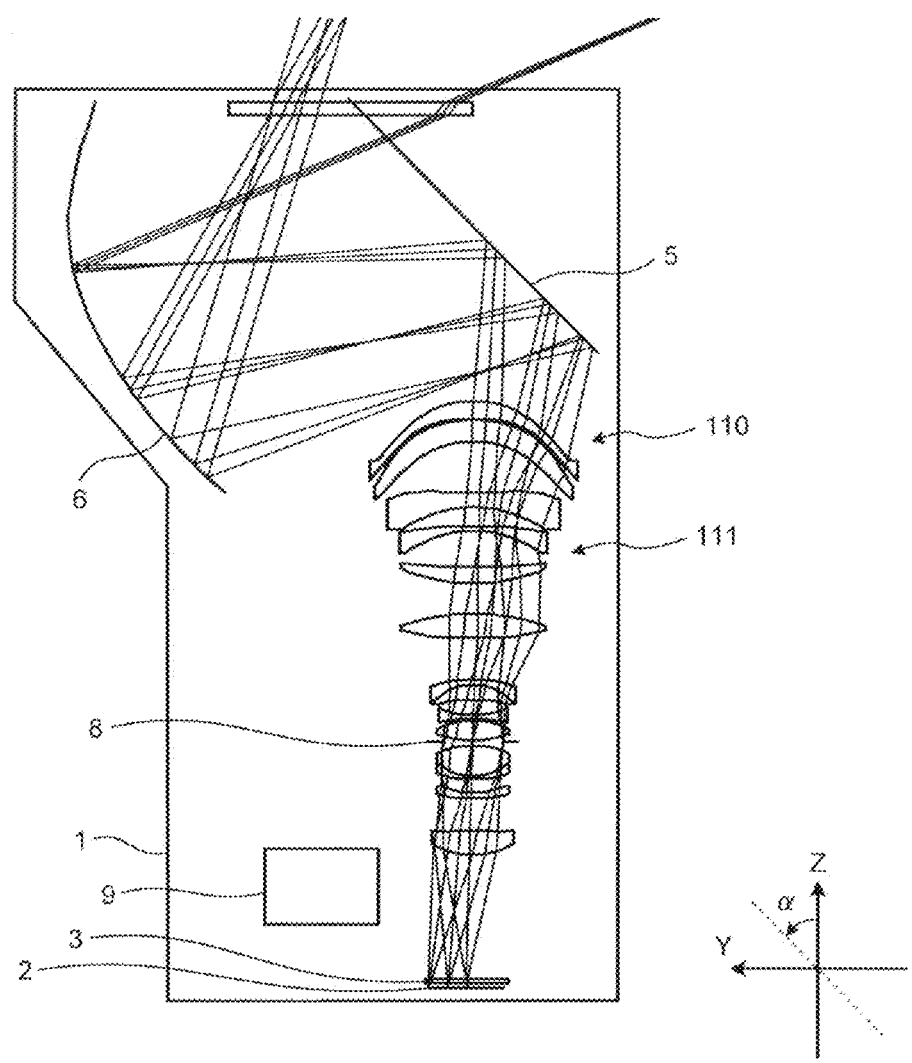
FIG. 41 is a cross section of a projector apparatus according to a fourth embodiment of the present invention.
Figure 42:
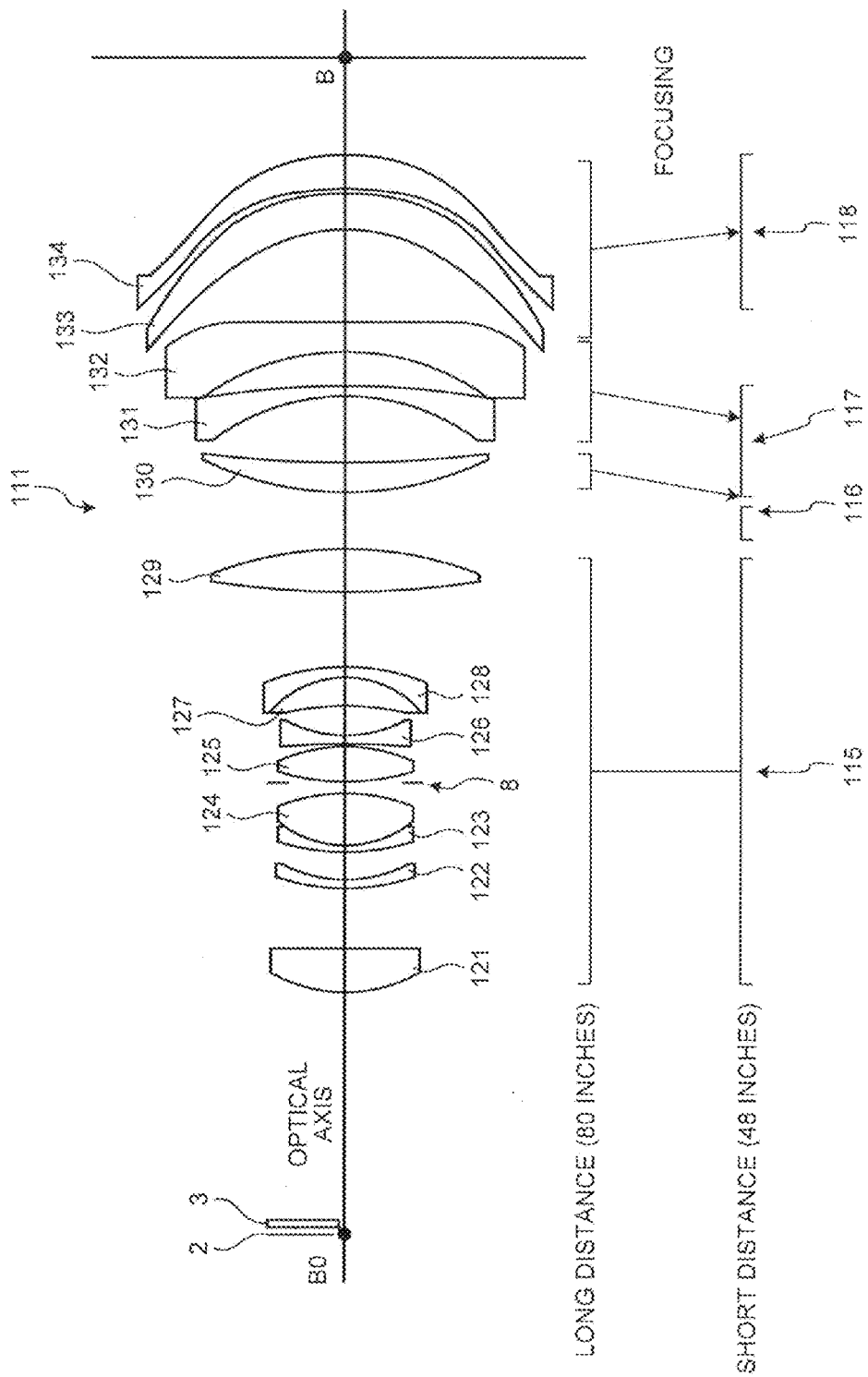
FIG. 42 is a diagram illustrating a lens configuration of a refractive optical system provided in the projector apparatus according to the fourth embodiment.

FIG. 41 is a cross section of the projector apparatus of the fourth embodiment. The continuous lines in FIG. 41 illustrate paths of the movement by focusing. FIG. 42 illustrates a refractive optical system 111 provided in a projection optical system 110 of the projector apparatus of the fourth embodiment. In FIGS. 41 and 42, a light flux subjected to two-dimensional intensity modulation with the image forming unit 2 such as a DMD based on image information becomes a projection light flux as an object light. The projection light flux from the image forming unit 2 becomes an image-forming light flux through the refractive optical system 111 including at least one aspheric surface lens, the reflecting plane mirror 5, and the concave surface mirror 6. That is, an image formed on the image forming unit 2 such as a DMD is enlarged and projected with the projection optical system 110 on the screen as a projection image. The number of mirrors can be increased to provide power to the reflecting plane mirror 5.

The light passing through the refractive optical system 111 forms an intermediate image which is a space image conjugate to the image information formed with the image forming unit 2 on a near side to the image forming unit 2 relative to the concave surface mirror 6. The intermediate image is not necessarily formed as a flat image. In the fourth embodiment, the intermediate image is formed as a curved image. The intermediate image is enlarged and projected on the screen through the free curved surface concave surface mirror 6 arranged on the most magnification side. The image surface curvature and distortion occurs on the intermediate image. However, the image surface curvature and distortion occurring on the intermediate image is corrected with the free curved surface of the concave surface mirror 6, and the corrected intermediate image is projected on the screen. The free curved surface of the concave surface mirror 6 corrects image surface curvature and distortion occurring on the intermediate image. Thus, the degree of freedom of the design of the refractive optical system 111 and the projection optical system 110 can be increased, which remarkably contributes to the downsizing of the projector apparatus, for example.

Figure 43:
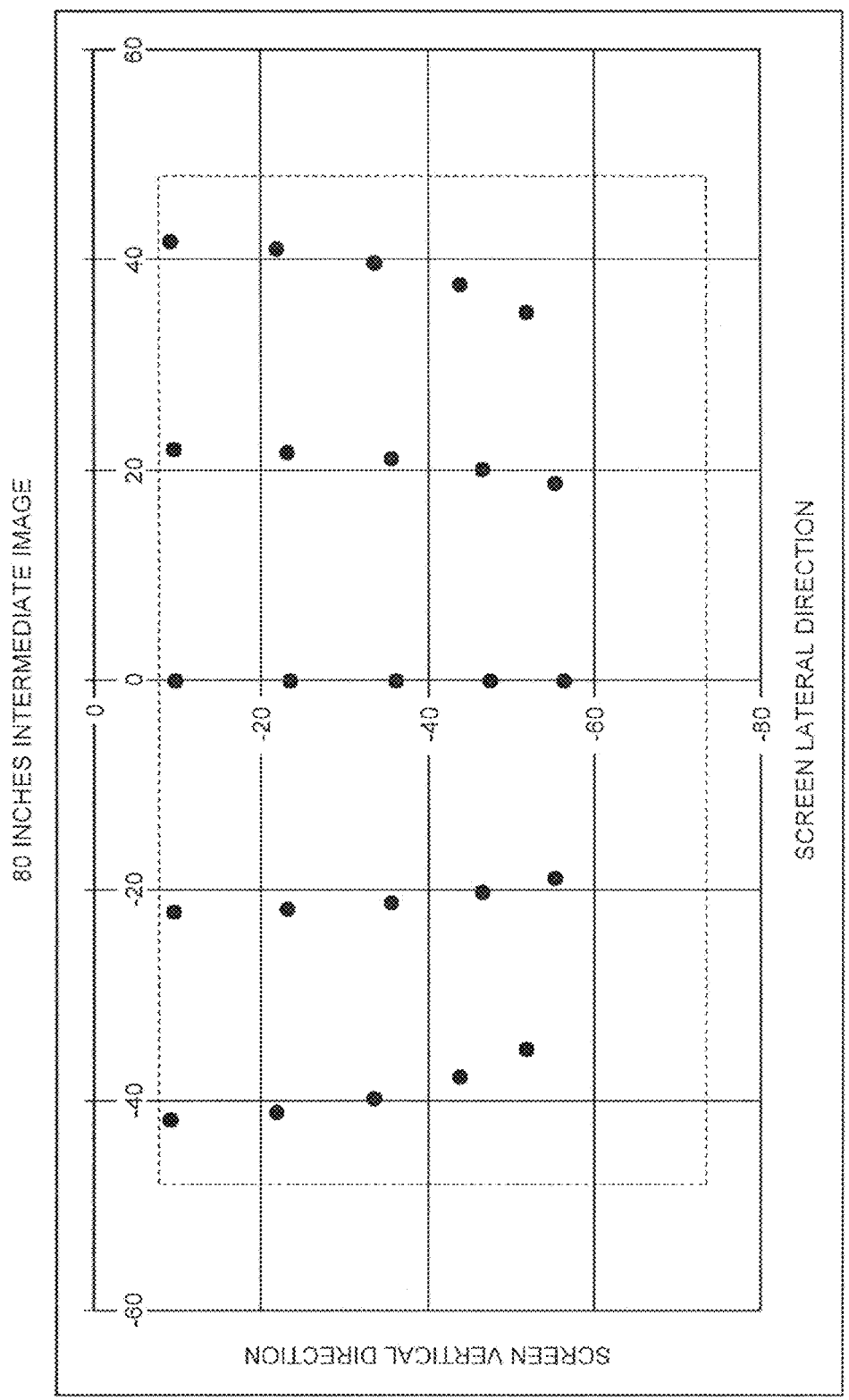
FIG. 43 is a diagram illustrating plotted intersections of a paraxial image plane and a main light beam with a long distance (80 inches) of the projector apparatus according to the fourth embodiment.
Figure 44:
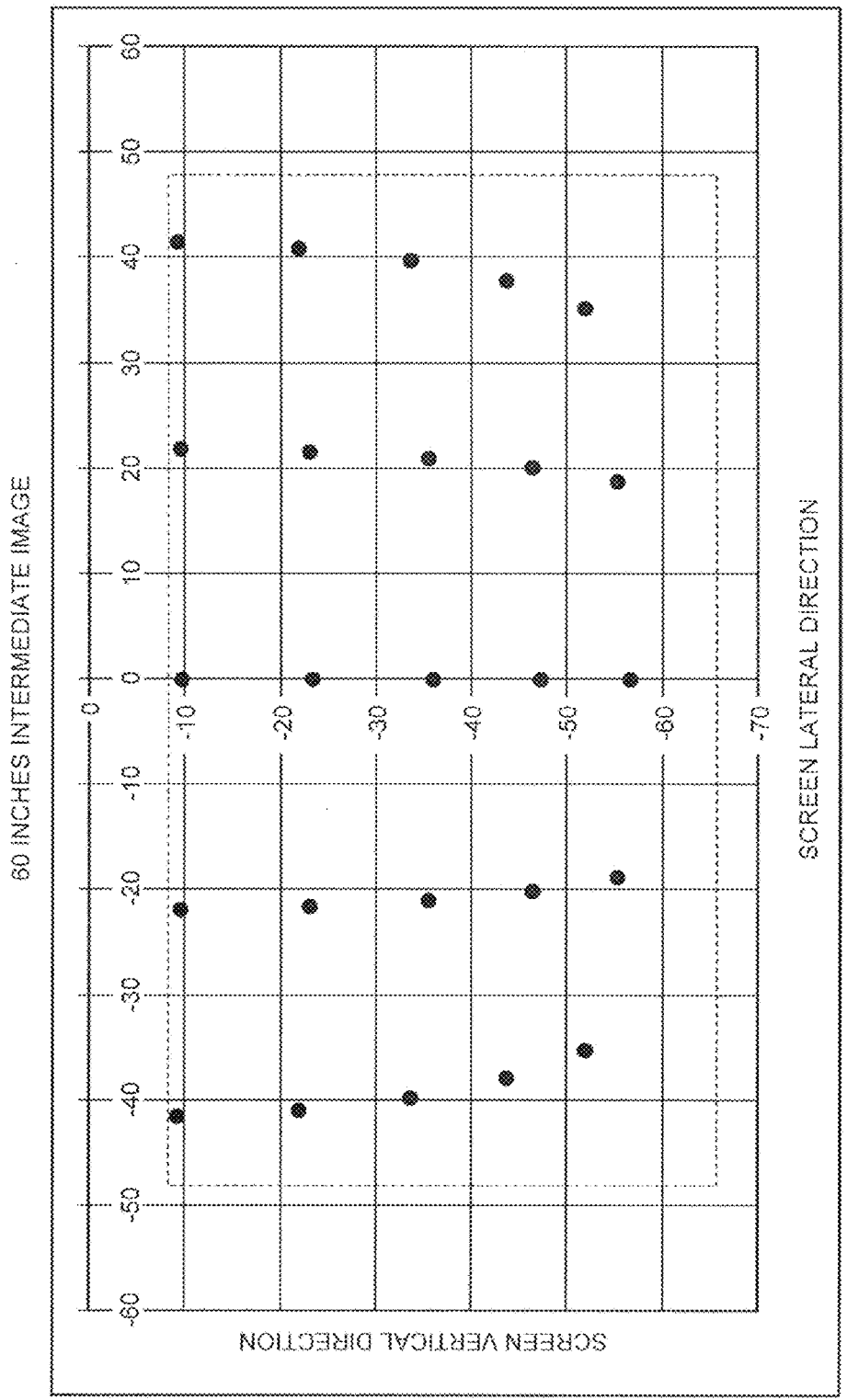
FIG. 44 is a diagram illustrating plotted intersections of a paraxial image plane and a main light beam with a medium distance (60 inches) of the projector apparatus according to the fourth embodiment.
Figure 45:
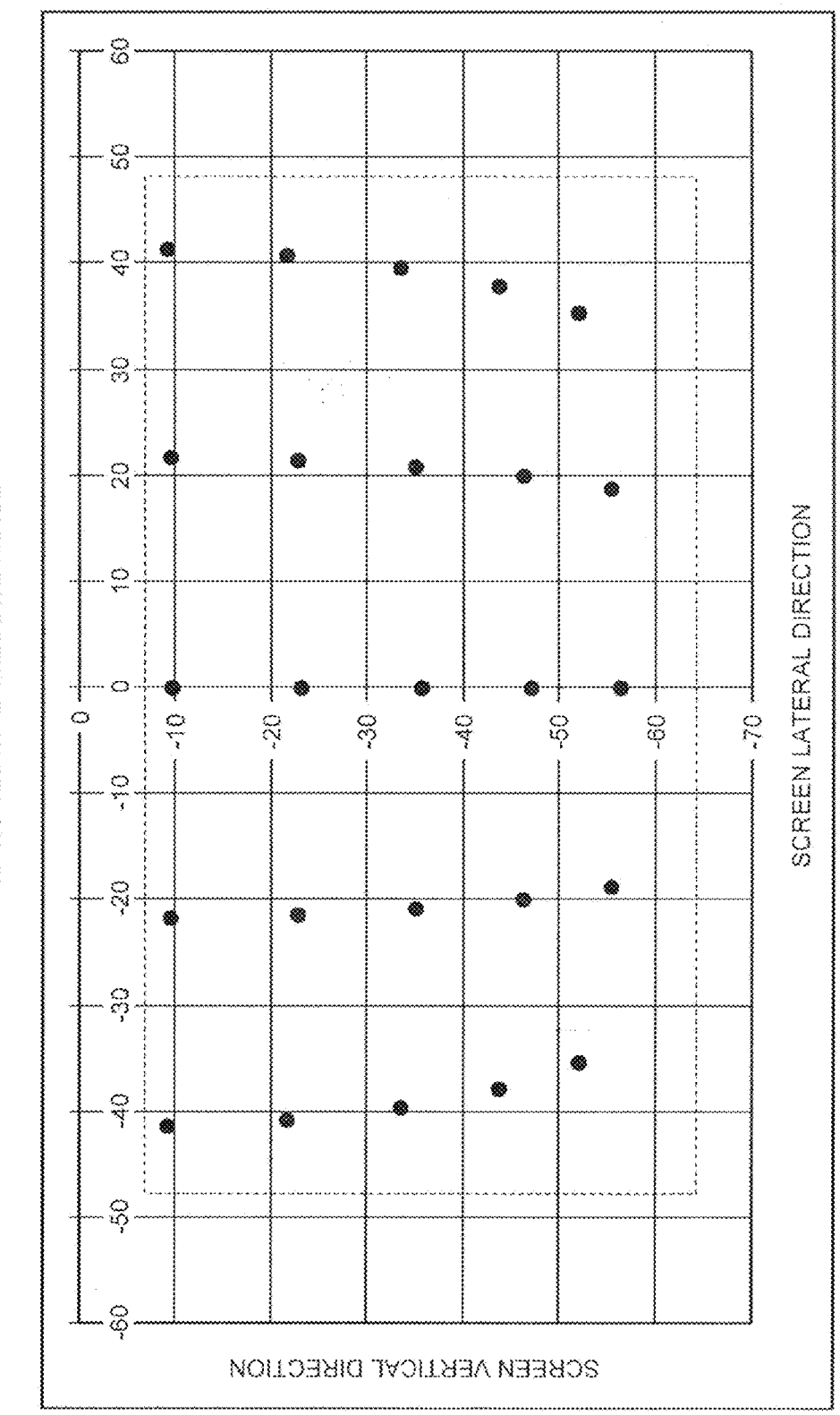
FIG. 45 is a diagram illustrating plotted intersections of a paraxial image plane and a main light beam with a short distance (48 inches) of the projector apparatus according to the fourth embodiment.

FIGS. 43, 44, and 45 are diagrams illustrating plotted intersections of the main light beam and the paraxial image plane regarding a long distance (80 inches), a medium distance (60 inches), and a short distance (48 inches), respectively. In FIGS. 43 to 45, black points indicate coordinates of intersections of the main light beam and the paraxial image plane with several angles of view, and a dotted line indicates the paraxial image. According to FIGS. 43 to 45, the barrel form distortion occurs in each screen size. This indicates that the intermediate image is compressed and reduced in size. In the projector apparatus of the fourth embodiment, the size of the intermediate image can be reduced in this manner. Thus, the size of the free curved surface concave surface mirror 6 can be reduced, which downsizes the projector apparatus and reduces costs of the projector apparatus.

In the projector apparatus of the fourth embodiment, in the focusing from a long distance side to a short distance side, a first lens group 115 of the refractive optical system 111 illustrated in FIG. 42, the reflecting plane mirror 5, and the free curved surface concave surface mirror 6 are fixed relative to the image forming surface. A second lens group 116 and a third lens group 117 are moved toward the image forming unit 2, and a fourth lens group 118 is moved to the magnification side. That is, in the projector apparatus of the fourth embodiment, a process called a floating focus is performed in the focusing from a long distance side to a short distance side. Therefore, the projector apparatus of the fourth embodiment can highly control image surface curvature and distortion aberration. In the projector apparatus of the fourth embodiment, the aspheric surface lenses are used in the lens groups moving in the above manner, and the excessive correction of the aspheric surface lenses causes barrel form distortion on the intermediate image. The entire configuration and operation of the projector apparatus is as described above with reference to FIG. 18.

The refractive optical system 111 includes the first lens group 115 having positive refractive power and the second lens group 116 having positive refractive power in this order from the image forming unit 2 to the magnification side, as illustrated in FIG. 42. The refractive optical system 111 includes the third lens group 117 having negative refractive power with one aspheric surface lens and the fourth lens group 118 having positive refractive power with two aspheric surface lenses. The projection optical system 110 includes such a refractive optical system 111, the reflecting plane mirror 5, and the free curved surface concave surface mirror 6 arranged at the most magnification side. In the focusing from a long distance side to a short distance side with the variation of the projection distance, the refractive optical system 111 moves the second positive lens group 116 and the third negative lens group 117 toward the image forming unit 2, and moves the fourth positive lens group 118 to the magnification side.

The first lens group 115 includes, in the order from the image forming unit 2, a both surface aspheric biconvex lens 121 with the stronger convex surface directed to the image forming unit 2 and a negative meniscus lens 122 with the convex surface directed to the image forming unit 2. Moreover, the first lens group 115 includes a negative meniscus lens 123 with the convex surface directed to the image forming unit 2 and a cemented lens 124 of a biconvex lens with the stronger convex surface directed to the image forming unit 2. Furthermore, the first lens group 115 includes a both surface aspheric biconvex lens 125 with the stronger convex surface directed to the magnification side, a biconcave lens 126 with the stronger concave surface directed to the magnification side, and a positive meniscus lens 127 with the convex surface directed to the magnification side. The first lens group 115 includes a cemented lens 128 of a negative meniscus lens with the convex surface directed to the magnification side and a biconvex lens 129 with the stronger convex surface directed to the magnification side.

The second lens group 116 includes a positive meniscus lens 130 with the convex surface directed to the image forming unit 2. The third lens group 117 includes a negative meniscus lens 131 with the convex surface directed to the magnification side and a both surface aspheric biconcave lens 132 with the stronger concave surface directed to the image forming unit 2. The fourth lens group 118 includes a both surface aspheric negative meniscus lens 133 with the convex surface directed to the magnification side and a both surface aspheric positive meniscus lens 134 with the convex surface directed to the magnification side.

The following tables 16 to 20 show data of the refractive optical system 111 provided in the projector apparatus of the fourth embodiment. The "i" in the table 16 represents the i-th surface (prism surface, lens surface, stop surface, reflecting surface) when counted from the image forming unit 2.

Numerical aperture: 0.195

TABLE 16

Numerical aperture: 0.195

| I | R | D | Nd | Vd |
|---|---|---|---|---|
| 1 | ∞ | 1.00 | | |
| 2 | ∞ | 1.00 | 1.51680 | 64.1983 |
| 3 | ∞ | 28.00 | | |
| 4* | 18.975 | 5.24 | 1.48749 | 70.2363 |
| 5* | −94.721 | 7.45 | | |
| 6 | 36.928 | 1.20 | 1.90366 | 31.3150 |
| 7 | 18.890 | 3.09 | | |
| 8 | 24.244 | 0.80 | 1.90366 | 31.3150 |

Focusing

TABLE 17

| | short distance | standard | long distance |
|---|---|---|---|
| screen size | 48 inches | 60 inches | 80 inches |
| variable A | 5.18 | 6.14 | 6.94 |
| variable B | 8.77 | 8.38 | 8.04 |
| variable C | 15.10 | 13.50 | 11.63 |
| variable D | 36.91 | 37.94 | 39.36 |
| variable E | 269.44 | 328.05 | 425.91 |

Aspheric Surface Coefficient

TABLE 18

| | K | A4 | A6 | A8 | A10 | A12 | A14 | A16 |
|---|---|---|---|---|---|---|---|---|
| 4th surface | −0.089 | −2.469E−06 | −4.814E−08 | 3.006E−09 | −1.783E−11 | | | |
| 5th surface | 0.000 | 5.922E−05 | 4.142E−08 | 3.096E−09 | −1.936E−11 | | | |
| 11th surface | −0.343 | −4.914E−07 | −8.303E−08 | | | | | |
| 12th surface | 0.162 | 1.163E−05 | −1.421E−07 | | | | | |
| 24th surface | −0.358 | 5.395E−06 | −5.090E−08 | 2.247E−10 | −3.893E−13 | | | |
| 25th surface | 1.571 | −4.021E−05 | 5.659E−08 | −9.410E−11 | 1.044E−13 | −9.756E−17 | | |
| 26th surface | −0.870 | 3.365E−05 | −2.766E−07 | 6.312E−10 | −3.809E−13 | −9.115E−17 | | |
| 27th surface | −0.296 | 3.583E−05 | −3.991E−07 | 1.406E−09 | −3.220E−12 | 4.465E−15 | −2.584E−18 | |
| 28th surface | 2.278 | −3.223E−06 | −3.479E−07 | 1.305E−09 | −2.431E−12 | 3.404E−15 | −3.356E−18 | 1.496E−21 |
| 29th surface | −1.303 | −1.658E−05 | −7.439E−08 | −8.252E−11 | 1.311E−12 | −2.562E−15 | 1.961E−18 | −5.377E−22 |

TABLE 16-continued

Numerical aperture: 0.195

| I | R | D | Nd | Vd |
|---|---|---|---|---|
| 9 | 12.422 | 6.64 | 1.58144 | 40.7476 |
| 10 | −20.056 | 1.12 | | |
| Stop | ∞ | 0.3 | | |
| 11 | 26.609 | 4.26 | 1.48749 | 70.4412 |
| 12 | −18.832 | 0.30 | | |
| 13 | −48.135 | 1.00 | 1.83481 | 42.7253 |
| 14 | 18.449 | 3.42 | | |
| 15 | −36.328 | 3.34 | 1.48749 | 70.2363 |
| 16 | −12.512 | 1.20 | 1.90366 | 31.3150 |
| 17 | −30.033 | 9.33 | | |
| 18 | 76.247 | 5.47 | 1.78470 | 26.2912 |
| 19 | −51.163 | variable A | | |
| 20 | 43.722 | 3.70 | 1.69895 | 30.1279 |
| 21 | 185.916 | variable B | | |
| 22 | −26.601 | 1.20 | 1.84666 | 23.7779 |
| 23 | −90.143 | 4.09 | | |
| 24* | −29.253 | 3.38 | 1.53046 | 55.8000 |
| 25* | 79.813 | variable C | | |
| 26* | −20.078 | 4.72 | 1.53046 | 55.8000 |
| 27* | −27.732 | 0.30 | | |
| 28* | −49.739 | 4.00 | 1.53046 | 55.8000 |
| 29* | −25.525 | variable D | | |
| 30 | ∞ | −91.98 | reflecting surface | |
| 31* | ∞ | variable E | reflecting surface | |

Free Curved Surface Coefficient

TABLE 19

| K | 0 |
|---|---|
| C4 | 1.1720E−02 |
| C6 | 8.4731E−03 |
| C8 | −2.3832E−05 |
| C10 | −1.5794E−04 |
| C11 | −1.3961E−06 |
| C13 | 1.7240E−06 |
| C15 | −1.9360E−06 |
| C17 | −1.2236E−08 |
| C19 | 1.2585E−07 |
| C21 | 1.7568E−08 |
| C22 | 5.2094E−10 |
| C24 | −7.2895E−10 |
| C26 | 1.4519E−09 |
| C28 | 4.8374E−10 |
| C30 | 5.3852E−12 |
| C32 | −3.9451E−11 |
| C34 | −1.6489E−11 |
| C36 | −3.1742E−13 |
| C37 | −1.1651E−13 |
| C39 | 1.5119E−13 |
| C41 | −2.7979E−13 |
| C43 | −2.2888E−13 |
| C45 | −4.0093E−14 |
| C47 | −4.3307E−16 |
| C49 | 7.3286E−15 |
| C51 | 6.8302E−15 |
| C53 | 2.3829E−15 |

TABLE 19-continued

| K | 0 |
|---|---|
| C55 | 7.7935E−17 |
| C56 | 1.2179E−17 |
| C58 | 1.2304E−17 |
| C60 | 8.0415E−17 |
| C62 | 7.9418E−17 |
| C64 | 3.2335E−17 |
| C66 | 3.0703E−18 |

DMD Size
Dot size: 10.8 μm
Lateral length: 13.824 mm
Vertical length: 8.64 mm
From optical axis to center of device: 5.64 mm The following table 20 shows the position coordinates of the reflecting plane mirror 5 and the free curved surface concave surface mirror 6 from a vertex in the focusing state in which a projection image by a lens nearest to the reflecting surface is maximum. The rotation is indicated with an angle between a surface normal and the optical axis.

TABLE 20

| | Y axis | Z axis | α |
|---|---|---|---|
| 30th surface | 0.00 | 39.36 | −45.00 |
| 31st surface | 91.98 | 48.28 | −99.97 |

Figure 46:
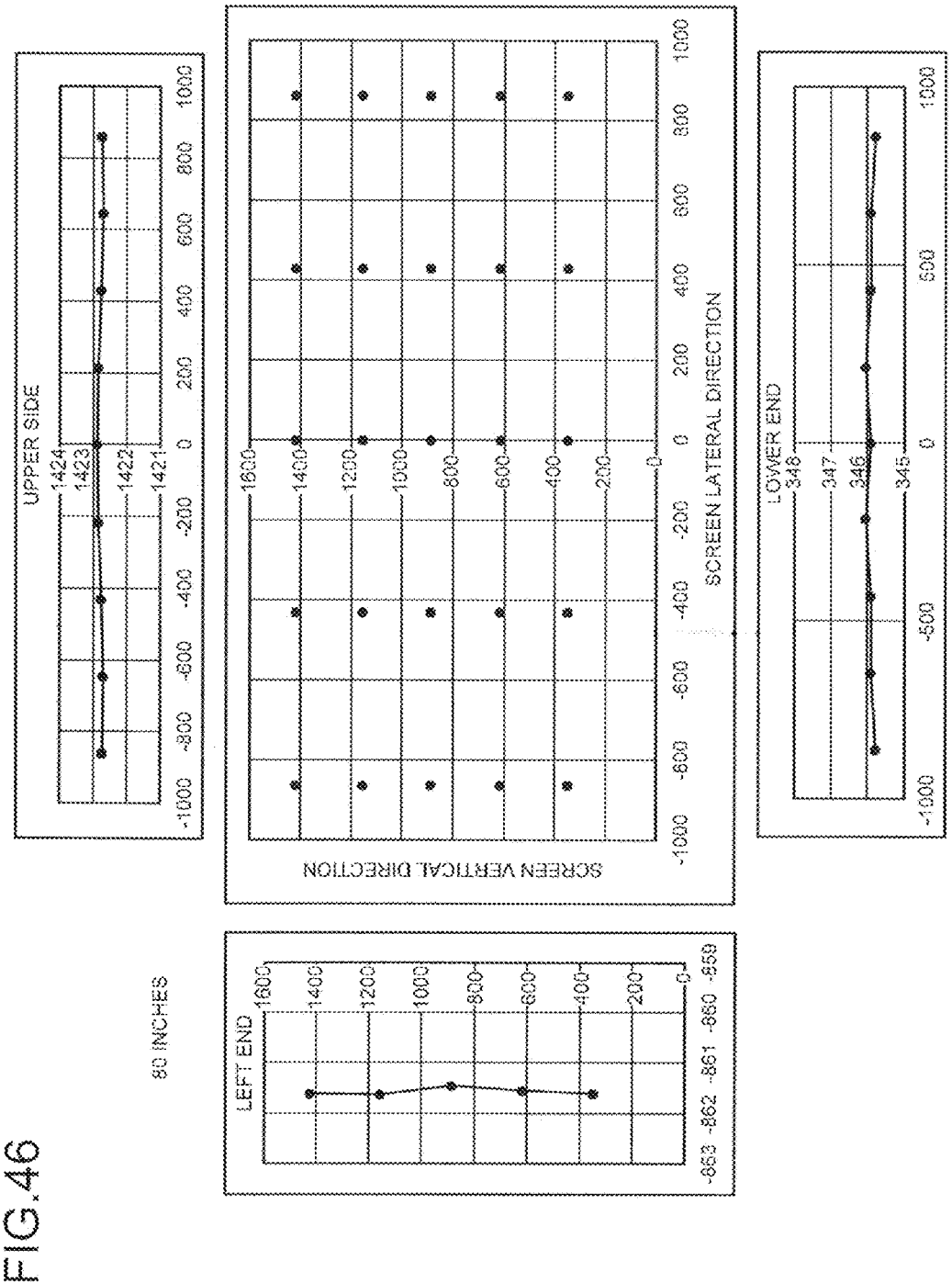
FIG. 46 is a diagram illustrating spotted positions of respective angles of view on a screen with a long projection distance (80 inches) of the projector apparatus according to the fourth embodiment.
Figure 47:
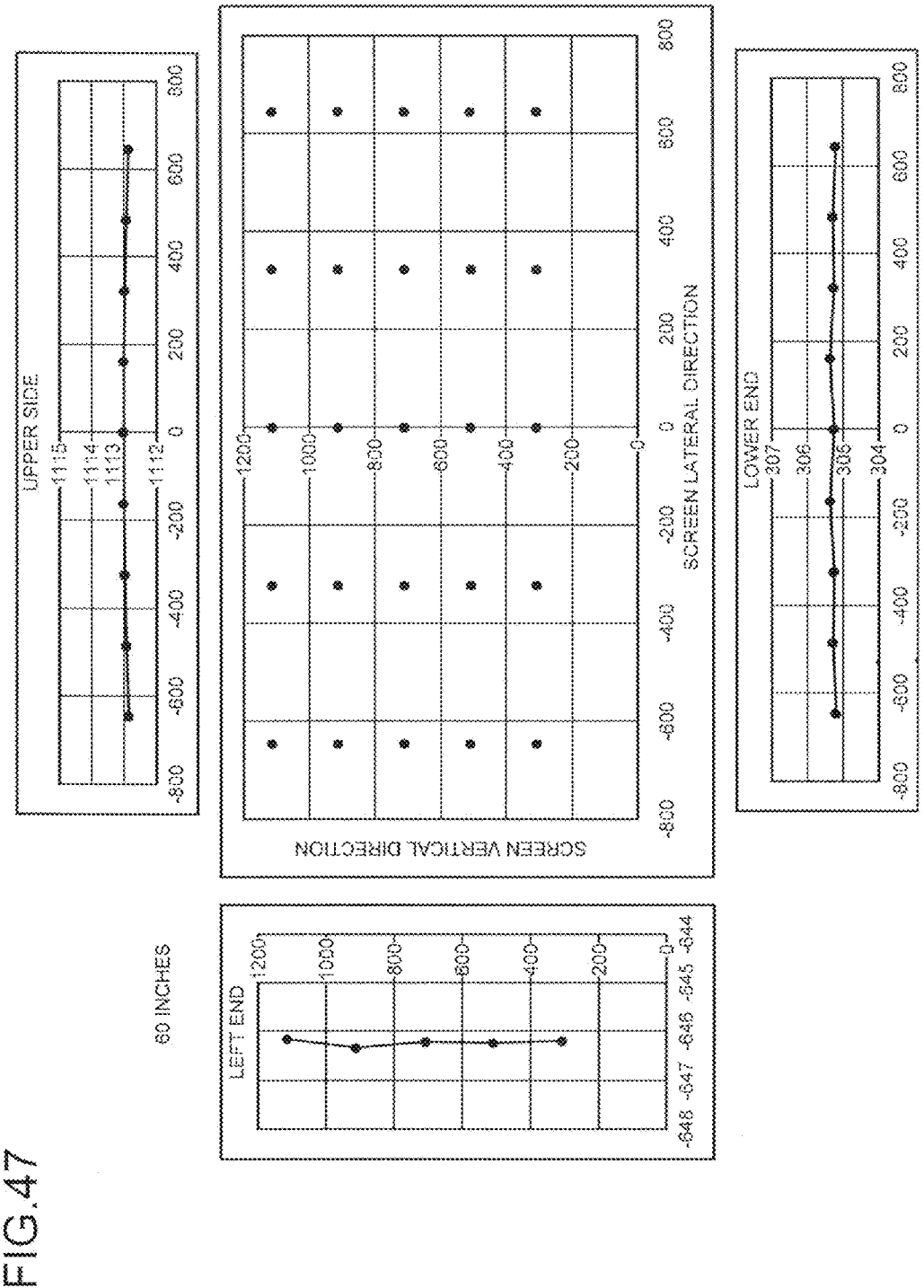
FIG. 47 is a diagram illustrating spotted positions of respective angles of view on a screen with a medium projection distance (60 inches) of the projector apparatus according to the fourth embodiment.
Figure 48:
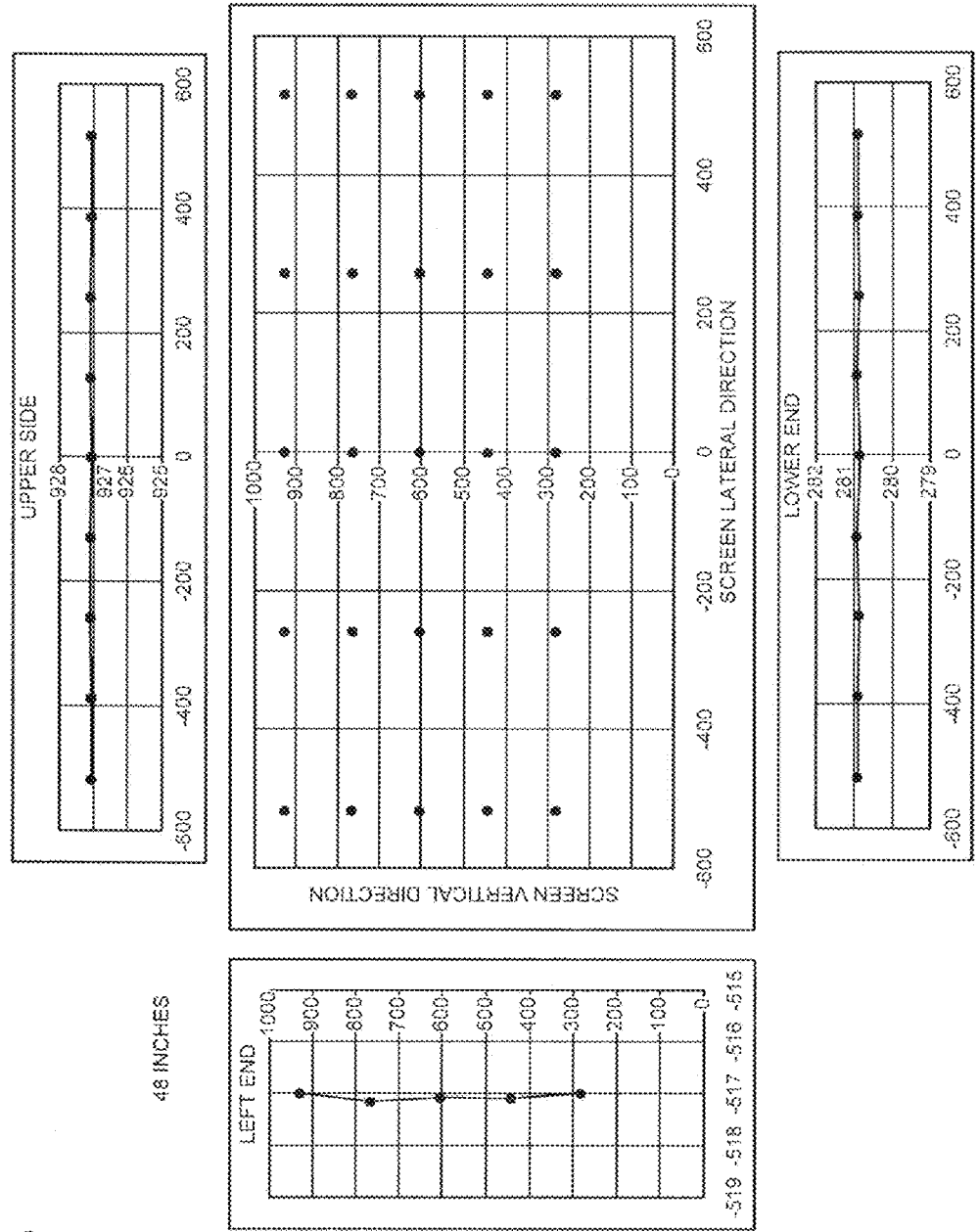
FIG. 48 is a diagram illustrating spotted positions of respective angles of view on a screen with a short projection distance (48 inches) of the projector apparatus according to the fourth embodiment.
Figure 49:
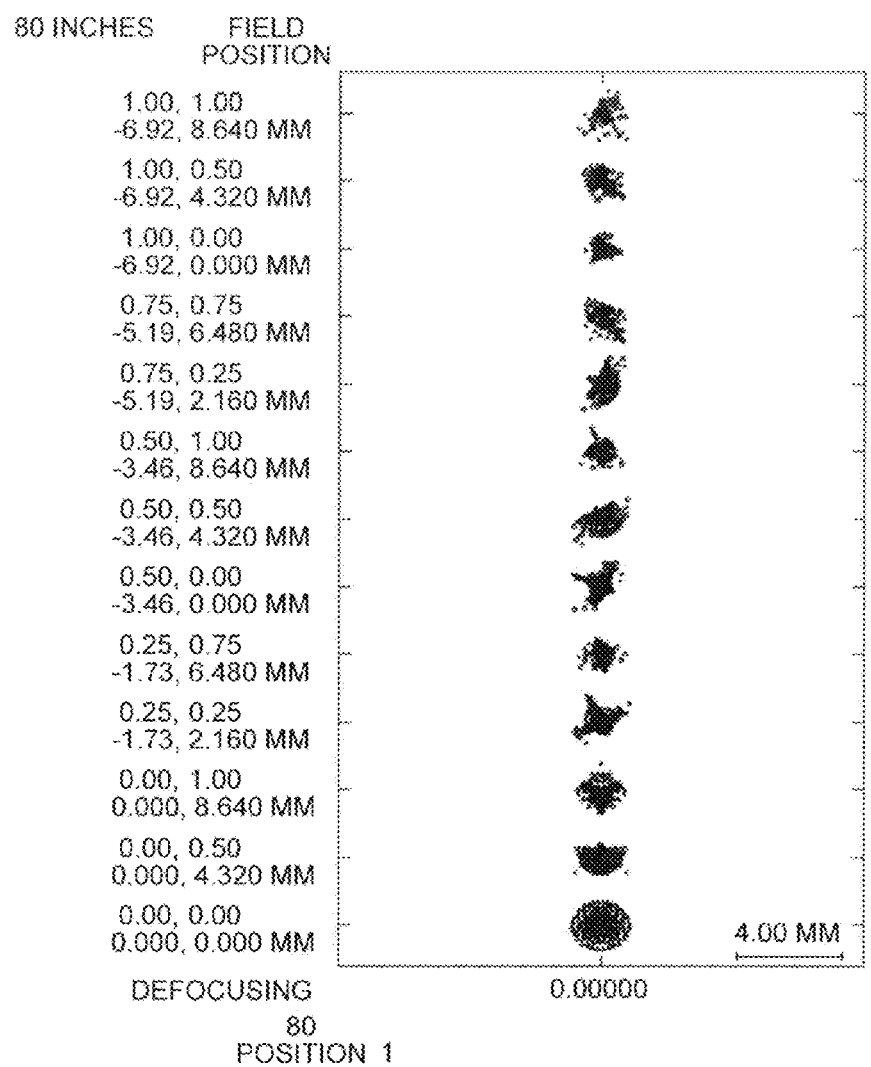
FIG. 49 is a spot diagram illustrating imaging characteristics (mm) on a screen surface regarding a wavelength of 625 nm (red), a wavelength of 550 nm (green), and a wavelength of 425 nm (blue) with a long projection distance (80 inches) of the projector apparatus according to the fourth embodiment.

FIG. 46 illustrates spot positions (wavelength: 550 nm) of respective angles of view on a screen with a long projection distance (80 inches). FIG. 47 illustrates spot positions (wavelength: 550 nm) of respective angles of view on a screen with a medium projection distance (60 inches). FIG. 48 illustrates spot positions (wavelength: 550 nm) of respective angles of view on a screen with a short projection distance (48 inches). According to FIGS. 46 to 48, the refractive optical system ill provided in the projector apparatus of the fourth embodiment can project a projection image having small distortion, regarding each zoom and each projection distance. FIGS. 49 to 51 illustrate spot diagrams. In the spot diagrams of FIGS. 49 to 51, the image forming characteristics (mm) on the screen surface are illustrated with respect to a wavelength of 625 nm (red), a wavelength of 550 nm (green), and a wavelength of 425 nm (blue). The field position of each spot is indicated by coordinates (x, y) on the image forming unit 2.

As is clear from the above description, in the projector apparatus of the fourth embodiment, the aspheric surface lenses provided in the refractive optical system 111 cause barrel form distortion on the intermediate image so as to compress the intermediate image and reduce the size thereof. In this manner, the concave surface mirror 6 can be reduced in size, and the reduction of the size of the concave surface mirror 6 enables the downsizing of the projector apparatus. The barrel form distortion occurring on the intermediate image is corrected with the free curved surface concave surface mirror 6, and the corrected intermediate image is projected on the screen, etc. Therefore, it is possible to obtain a high-quality projection image and achieve the same effects as in the embodiments described above.

Fifth Embodiment

Next, a projector apparatus of the fifth embodiment will be described. The projector apparatus of the fifth embodiment is different from the projector apparatuses of the above-described embodiments only in the configuration of the refractive optical system. Thus, in the drawings used for the explanation of the projector apparatus of the fifth embodiment, the portions indicating the same operations or functions as in the projector apparatus of the first embodiment described above are represented with the same symbols as in the projector apparatus of the first embodiment, and the detailed description thereof is omitted. The following explanation of the fifth embodiment will mainly focus on the refractive optical system different from that in the above-described embodiments.

FIG. 52 illustrates a cross section of the projector apparatus of the fifth embodiment. FIG. 53 illustrates a lens configuration of a refractive optical system 141 provided in a projection optical system 140 of the projector apparatus of the fifth embodiment. In FIG. 52, paths of the movement by focusing of lens groups are illustrated by continuous lines. The projector apparatus of the fifth embodiment includes the projection optical system 140 formed so as to satisfy "2.5<Did/F<6 (Conditional Expression 9)" and "0.4<Y/F<0.75 (Conditional Expression 10)". Thus, it is possible to use a larger and higher-resolution DMD, etc. as the image forming unit 2.

In FIGS. 52 and 53, a light flux subjected to two-dimensional intensity modulation with the image forming unit 2 such as a DMD based on image information becomes a projection light flux as an object light. The projection light flux from the image forming unit 2 becomes an image-forming light flux through the refractive optical system 141 including at least one aspheric surface lens, the reflecting plane mirror 5, and the concave surface mirror 6. That is, an image formed on the image forming unit 2 is enlarged and projected with the projection optical system 140 on the screen as a projection image.

The light passing through the refractive optical system 141 forms an intermediate image which is a space image conjugate to the image information formed with the image forming unit 2 on a near side to the image forming unit 2 relative to the reflecting plane mirror 5. The intermediate image is not necessarily formed as a flat image, and is formed as a curved surface image. This is also applied to the above-described embodiments. The intermediate image is enlarged and projected on the screen through the concave surface mirror 6 (free curved surface concave surface mirror) arranged on the most magnification side. The image surface curvature and distortion occurs on the intermediate image. However, with the use of the free curved surface concave surface mirror 6, the image surface curvature and distortion occurring on the intermediate image can be corrected. In this manner, a load of aberration correction on the lens system can be reduced, whereby the degree of freedom of the design is increased, which downsizes the projector apparatus more easily, for example.

FIGS. 54, 55, and 56 are diagrams illustrating plotted intersections of the main light beam and the paraxial image plane regarding a long distance (80 inches), a medium distance (60 inches), and a short distance (48 inches), respectively, of the projector apparatus of the fifth embodiment. In FIGS. 54 to 56, black points indicate coordinates of intersections of the main light beam and the paraxial image plane with several angles of view, and a dotted line indicates the paraxial image. In FIGS. 54 to 56, the barrel form distortion occurs in each screen size. This indicates that the intermediate image is compressed. Thus, in the projector apparatus of the fifth embodiment, the reduction of the size of the intermediate image can reduce the size of the free curved surface concave surface mirror 6, which reduces costs and downsizes the apparatus.

In the projector apparatus of the fifth embodiment, in the focusing from a long distance side to a short distance side, a positive lens group 151 (see FIG. 53), the reflecting plane mirror 5, and the free curved surface concave surface mirror 6 are fixed relative to the image forming surface. By contrast, a positive lens group 152 (see FIG. 53) and a negative lens group 153 (see FIG. 53) are moved toward the image forming unit 2, and a positive lens group 154 (see FIG. 53) is moved to the magnification side. That is, it is possible to highly control image surface curvature and distortion aberration by the floating focus. In the projector apparatus of the fifth embodiment, the aspheric surface lenses are used in the moving lens groups 152, 153, 154, which improves the effect of correction. Components necessary for image formation such as an image processing unit, a power unit, a cooling fan, etc. (not illustrated in FIG. 52) are stored in the housing 1 together with the projection optical system 140.

The refractive optical system 141 of the projection optical system 140 includes the first lens group 151 having positive refractive power and the second lens group 152 having positive refractive power in this order from the image forming unit 2 to the magnification side, as illustrated in FIG. 53. The refractive optical system 141 includes the third lens group 153 having negative refractive power with one aspheric surface lens and the fourth lens group 154 having positive refractive power with one aspheric surface lens.

The first lens group 151 includes, in the order from the image forming unit 2, a both surface aspheric biconvex lens 161 with the stronger convex surface directed to the image forming unit 2 and a biconcave lens 162 with the stronger concave surface directed to the magnification side. Moreover, the first lens group 151 includes a cemented lens 165 of a negative meniscus lens 163 with the convex surface directed to the image forming unit 2 and a positive meniscus lens 164 with the convex surface directed to the image forming unit 2, and the aperture stop 8. Furthermore, the first lens group 151 includes a both surface aspheric biconvex lens 166 with the stronger convex surface directed to the image forming unit 2 and a negative meniscus lens 167 with the convex surface directed to the image forming unit 2. The first lens group 151 includes a cemented lens 170 of a biconvex lens 168 with the stronger convex surface directed to the magnification side and a biconcave lens 169 with the stronger concave surface directed to the image forming unit 2, and a positive meniscus lens 171 with the stronger convex surface directed to the magnification side.

The second lens group 152 includes a biconvex lens 172 with the stronger convex surface directed to the magnification side and a positive meniscus lens 173 with the stronger convex surface directed to the image forming unit 2. The third lens group 153 includes a negative meniscus lens 174 with the convex surface directed to the magnification side and a both surface aspheric biconcave lens 175 with the stronger concave surface directed to the image forming unit 2. The fourth lens group 154 includes a both surface aspheric positive meniscus lens 176 with the convex surface directed to the magnification side.

In such a refractive optical system 141, in the focusing from a long distance side to a short distance side, for example, the second positive lens group 152 and the third negative lens group 153 are moved toward the image forming unit 2, and the fourth positive lens group 154 is moved to the magnification side.

The following tables 21 to 24 show data of the refractive optical system 141 provided in the projector apparatus of the fifth embodiment. The "i" in the table 21 represents the i-th surface (prism surface, lens surface, stop surface, reflecting surface) when counted from the image forming unit 2.

Numerical aperture: 0.200

TABLE 21

| i | R | D | Nd | Vd |
|---|---|---|---|---|
| 1 | ∞ | 1 | | |
| 2 | ∞ | 1 | 1.5168 | 64.1983 |
| 3 | ∞ | 29 | | |
| 4* | 12.975 | 5.28 | 1.48749 | 70.2363 |
| 5* | −29.299 | 2.06 | | |
| 6 | −40.76 | 0.8 | 1.86879 | 26.3428 |
| 7 | 35.62 | 3.15 | | |
| 8 | 21.156 | 0.8 | 1.8 | 29.8447 |
| 9 | 10.395 | 3.78 | 1.54814 | 45.7843 |
| 10 | 70.46 | 0.61 | | |
| Stop | ∞ | 2.44 | | |
| 11* | 23.366 | 4.28 | 1.73785 | 27.4138 |
| 12* | −25.543 | 0.3 | | |
| 13 | 40.202 | 0.8 | 1.82395 | 44.458 |
| 14 | 16.681 | 2.16 | | |
| 15 | 1262.987 | 4.79 | 1.48749 | 70.4412 |
| 16 | −12.216 | 1 | 1.8147 | 35.8667 |
| 17 | 56.709 | 5.65 | | |
| 18 | −227.979 | 4.76 | 1.58723 | 39.4156 |
| 19 | −25.861 | variable A | | |
| 20 | 130.721 | 5.28 | 1.51633 | 64.142 |
| 21 | −70.396 | 6.54 | | |
| 22 | 49.348 | 5.45 | 1.58108 | 33.9747 |
| 23 | 320.489 | variable B | | |
| 24 | −30.134 | 1.5 | 1.87464 | 34.8483 |
| 25 | −122.918 | 3.34 | | |
| 26* | −34.455 | 1.2 | 1.53046 | 55.8 |
| 27* | 55.5 | variable C | | |
| 28* | −64.791 | 5.28 | 1.53046 | 55.8 |
| 29* | −43.625 | variable D | | |
| 30 | ∞ | −69.19 | reflecting surface | |
| 31* | ∞ | variable E | reflecting surface | |

Focusing

TABLE 22

| | short distance | standard | long distance |
|---|---|---|---|
| screen size | 48 inches | 60 inches | 80 inches |
| variable A | 6.73 | 7.29 | 7.76 |
| variable B | 10.96 | 10.87 | 10.77 |
| variable C | 13.53 | 11.36 | 9.3 |
| variable D | 49.15 | 50.85 | 52.54 |
| variable E | 238.93 | 291.49 | 378.24 |

Aspheric Surface Coefficient

TABLE 23

| | K | A4 | A6 | A8 | A10 | A12 | A14 | A16 |
|---|---|---|---|---|---|---|---|---|
| 4th surface | 0.104 | −4.28E−05 | −1.14E−07 | −3.46E−10 | −4.96E−12 | | | |
| 5th surface | 0 | 5.33E−05 | −9.59E−08 | 5.24E−10 | | | | |
| 11th surface | −2.726 | 9.83E−06 | −7.46E−08 | −1.86E−10 | | | | |

TABLE 23-continued

| | K | A4 | A6 | A8 | A10 | A12 | A14 | A16 |
|---|---|---|---|---|---|---|---|---|
| 12th surface | 2.405 | 3.56E−05 | −6.52E−08 | | | | | |
| 26th surface | −3.952 | 5.57E−06 | 9.91E−09 | −3.86E−11 | 2.41E−14 | | | |
| 27th surface | −64.787 | −2.31E−05 | 3.16E−08 | −4.62E−11 | 3.52E−14 | −1.81E−17 | | |
| 28th surface | 1.978 | −6.12E−05 | 1.27E−07 | −9.95E−11 | 3.20E−14 | −6.81E−18 | | |
| 29th surface | −0.469 | −3.80E−05 | 4.35E−08 | −1.50E−11 | 5.58E−14 | −1.12E−16 | 7.35E−20 | −1.80E−23 |

Free Curved Surface Coefficient

TABLE 24

| K | 0 |
|---|---|
| C4 | 1.12E−02 |
| C6 | 2.34E−03 |
| C8 | 7.40E−05 |
| C10 | −2.53E−04 |
| C11 | −9.36E−07 |
| C13 | 6.01E−06 |
| C15 | −2.45E−06 |
| C17 | −5.55E−08 |
| C19 | 1.60E−07 |
| C21 | 2.10E−08 |
| C22 | 2.14E−10 |
| C24 | −3.22E−09 |
| C26 | 8.53E−10 |
| C28 | 5.87E−10 |
| C30 | 5.82E−12 |
| C32 | −9.23E−11 |
| C34 | −2.19E−11 |
| C36 | 8.17E−13 |
| C37 | −2.62E−14 |
| C39 | 3.06E−13 |
| C41 | −9.52E−13 |
| C43 | −1.01E−13 |
| C45 | −4.09E−14 |
| C47 | 2.19E−16 |
| C49 | 8.76E−15 |
| C51 | 7.08E−16 |
| C53 | 4.17E−15 |
| C55 | −4.84E−17 |
| C56 | 2.42E−18 |
| C58 | 1.10E−17 |
| C60 | 7.91E−17 |
| C62 | 4.93E−17 |
| C64 | 3.72E−17 |
| C66 | 2.16E−18 |

DMD Size
Dot size: 7.56 um (WUXGA)
Lateral length: 14.5152 mm
Vertical length: 9.072 mm
Distance from the optical axis to the center of the device: 5.91 mm The following table 25 shows the position coordinates of the reflecting plane mirror 5 and the free curved surface concave surface mirror 6 from a vertex in the focusing state in which a projection image by the lens nearest to the reflecting surface is maximum. The rotation is indicated with an angle between a surface normal and the optical axis.

TABLE 25

| | Y axis | Z axis | α |
|---|---|---|---|
| 30th surface | 0.00 | 52.54 | −45.00 |
| 31th surface | 69.19 | 65.84 | −98.88 |

FIG. 54 illustrates spot positions (wavelength: 550 nm) of respective angles of view on a screen with a long projection distance (80 inches) of the projector apparatus according to the fifth embodiment. FIG. 55 illustrates spot positions (wavelength: 550 nm) of respective angles of view on a screen with a medium projection distance (60 inches). FIG. 56 illustrates spot positions (wavelength: 550 nm) of respective angles of view on a screen with a short projection distance (48 inches). According to FIGS. 54 to 56, the refractive optical system 141 provided in the projector apparatus of the fifth embodiment can project a projection image having small distortion, regarding each zoom and each projection distance.

FIG. 57 illustrates spot positions (wavelength: 550 nm) of respective angles of view on a screen with a long projection distance (80 inches). FIG. 58 illustrates spot positions (wavelength: 550 nm) of respective angles of view on a screen with a medium projection distance (60 inches). FIG. 59 illustrates spot positions (wavelength: 550 nm) of respective angles of view on a screen with a short projection distance (48 inches). According to FIGS. 57 to 59, the refractive optical system 141 provided in the projector apparatus of the fifth embodiment can project a projection image having small distortion, regarding each zoom and each projection distance.

FIGS. 60 to 62 illustrate spot diagrams. In the spot diagrams of FIGS. 60 to 62, the image forming characteristics (mm) on the screen surface are illustrated with respect to a wavelength of 625 nm (red), a wavelength of 550 nm (green), and a wavelength of 425 nm (blue). The field position of each spot is indicated by coordinates (x, y) on the image forming unit 2.

In such a projector device of the fifth embodiment, it is possible to use a high-resolution image forming unit as the image forming unit 2 such as a DMD. Therefore, it is possible to project a high-solution image on the screen, etc. and achieve the same effects as in the embodiments described above.

CONCLUSION

Finally, the table 26 shows values of parameters corresponding to the above-mentioned Conditional Expressions 1, 2, 5, and 7, 9, and 10 in the projection optical systems 7, 50, 80, 110, 140 of the projector apparatuses of the embodiments described above.

TABLE 26

| | First embodiment | Second embodiment | Third embodiment | Fourth embodiment | Fifth embodiment |
|---|---|---|---|---|---|
| Expression 1 | 0.669 | 0.691 | 0.727 | 0.798 | 0.607 |
| Expression 2 | 4.448 | 3.965 | 3.828 | 3.055 | 5.635 |

TABLE 26-continued

|  | First embodiment | Second embodiment | Third embodiment | Fourth embodiment | Fifth embodiment |
|---|---|---|---|---|---|
| Expression 5 | 6.868 | 6.633 | 6.831 | 6.474 | 7.654 |
| Expression 7 | 0.648 | 0.598 | 0.560 | 0.472 | 0.736 |
| Expression 9 | 4.448 | 3.965 | 3.828 | 3.055 | 5.635 |
| Expression 10 | 0.648 | 0.598 | 0.560 | 0.472 | 0.736 |

"Did": the maximum paraxial image height of an intermediate image in a focusing state in which a projection image is maximum "D": the maximum value of a distance between an optical axis and an intersection of a paraxial image surface and a light beam passing the center of a stop of the refractive optical system 4

"F": the focal length of the refractive optical system 4 in a focusing state in which a projection image is maximum "0.6<D/Did<0.8 (Conditional Expression 1)"

"2.5<Did/F<5 (Conditional Expression 2)"

"β": the paraxial lateral magnification of the refractive optical system 4 when a projection image is maximum "5<β<8 (Conditional Expression 5)"

"Y": the maximum value of a distance between an optical axis and an end of the image forming unit 2

"0.4<Y/F<0.7 (Conditional Expression 7)"

"2.5<Did/F<6 (Conditional Expression 9)"

"0.4<Y/F<0.75 (Conditional Expression 10)"

According to Table 26, the values of the parameters of the projection optical systems 7, 50, 80, 110, 140 of the projector apparatuses of the embodiments are within a range defined by Conditional Expressions 1, 2, 5, 7, 9, and 10. Thus, in the projector apparatuses of the embodiments, the size and the distortion amount of the intermediate image can be made as appropriate. Therefore, the reduction of the size of the concave surface mirror 6, for example, can remarkably downsize the projector apparatus. Moreover, in the projector apparatuses of the embodiments, the distortion of the intermediate image is corrected with the free curved surface concave surface mirror 6, and the corrected intermediate image is projected. Therefore, it is possible to obtain a high-quality projection image.

Table 27 shows one example of the sizes (unit: mm) of the projection optical systems 7, 50, 80, 110, 140 in the embodiments.

TABLE 27

|  | First embodiment | Second embodiment | Third embodiment | Fourth embodiment | Fifth embodiment |
|---|---|---|---|---|---|
| Height | 165.6 | 165.5 | 167.7 | 168.6 | 177.8 |
| Depth | 94.7 | 95.3 | 106.5 | 119.1 | 100.2 |
| Width | 88.1 | 88.1 | 91.5 | 90.3 | 102 |

Among intersections of the reflecting plane mirror 5 and the light beams, which are illustrated in FIG. 63, a maximum distance in the Z axis direction from the image forming unit 2 corresponds to the "height" shown in Table 27. A maximum value of the distance in the Y axis direction between the intersection of the reflecting plane mirror 5 and the light beam and the intersection of the free curved surface concave surface mirror 6 and the light beam, which are illustrated in FIG. 63, corresponds to the "depth" shown in Table 27. A maximum value of the distance in the X axis direction between the intersections of the free curved surface concave surface mirror 6 and the light beam, which are illustrated in FIG. 64, corresponds to the "width" shown in Table 27.

As shown in Table 27, the projector apparatuses of the embodiments can be downsized remarkably. Moreover, the distortion of the intermediate image is corrected with the free curved surface concave surface mirror 6, and the corrected intermediate image is projected. Therefore, it is possible to obtain a high-quality projection image.

The invention exerts the effect of providing a small-sized high-performance projection optical system and a projector apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection optical system comprising in this order:
    an image forming unit that forms an image;
    a refractive optical system including a plurality of lenses that enlarges and projects the image on a screen; and
    a reflecting surface, wherein
    an intermediate image is formed between the refractive optical system and the reflecting surface, and
    the projection optical system satisfies conditions of "0.6<D/Did<0.8" and "2.5<Did/F<6", where
    "Did" represents a maximum paraxial image height of the intermediate image in a focusing state in which a projection image is maximum,
    "D" represents a maximum value of a distance between an optical axis and an intersection of a paraxial image surface and a light beam passing center of an aperture stop of the refractive optical system, and
    "F" represents a focal length of the refractive optical system in a focusing state in which the projection image is maximum.

2. The projection optical system according to claim 1, wherein
    the projection optical system satisfies a condition of "5<β<8", where "β" represents a paraxial magnification of the refractive optical system in the focusing state in which the projection image is maximum.

3. The projection optical system according to claim 1, wherein
    the projection optical system satisfies a condition of "0.4<Y/F<0.75", where "Y" represents a maximum value of a distance between the optical axis and an end of the image forming unit.

4. The projection optical system according to claim 1, wherein
    the stop is fixed relative to the image forming unit in the focusing state.

5. The projection optical system according to claim 1, wherein
    the reflecting surface is a concave surface mirror positioned at a most magnification side.

6. The projection optical system according to claim 5, wherein
    the concave surface mirror includes a free curved surface.

7. The projection optical system according to claim 1, wherein
    the refractive optical system includes at least one aspheric surface lens.

8. The projection optical system according to claim 1, further comprises a reflecting mirror that is arranged between the refractive optical system and the reflecting surface.

9. A projector apparatus comprising a projection optical system, wherein the projection optical system comprises in this order:
- an image forming unit that forms an image;
- a refractive optical system including a plurality of lenses that enlarges and projects the image on a screen; and
- a reflecting surface, wherein
- an intermediate image is formed between the refractive optical system and the reflecting surface, and
- the projection optical system satisfies conditions of "0.6<D/Did<0.8" and "2.5<Did/F<6", where
- "Did" represents a maximum paraxial image height of the intermediate image in a focusing state in which a projection image is maximum,
- "D" represents a maximum value of a distance between an optical axis and an intersection of a paraxial image surface and a light beam passing center of an aperture stop of the refractive optical system, and
- "F" represents a focal length of the refractive optical system in a focusing state in which the projection image is maximum.

* * * * *